(12) United States Patent
Burshtain et al.

(10) Patent No.: US 10,454,104 B2
(45) Date of Patent: Oct. 22, 2019

(54) METHODS FOR PREPARING ANODES FROM ANODE ACTIVE MATERIAL PARTICLES WITH LITHIUM BORATES AND PHOSPHATES COATINGS

(71) Applicant: STOREDOT LTD., Herzeliya (IL)

(72) Inventors: Doron Burshtain, Herzliya (IL); Nir Kedem, Haifa (IL); Daniel Aronov, Netanya (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 16/243,193

(22) Filed: Jan. 9, 2019

(65) Prior Publication Data

US 2019/0148722 A1    May 16, 2019

Related U.S. Application Data

(63) Continuation of application No. 15/480,922, filed on Apr. 6, 2017, and a continuation-in-part of
(Continued)

(51) Int. Cl.
*H01M 4/13* (2010.01)
*H01M 4/36* (2006.01)
(Continued)

(52) U.S. Cl.
CPC ........... *H01M 4/366* (2013.01); *H01M 4/134* (2013.01); *H01M 4/1395* (2013.01);
(Continued)

(58) Field of Classification Search
CPC .... H01M 4/366; H01M 4/134; H01M 4/1395; H01M 4/385; H01M 4/384; H01M 4/624; H01M 10/0525; H01M 2004/021
See application file for complete search history.

(56) References Cited

U.S. PATENT DOCUMENTS 3,778,254 A    12/1973 Cole et al.
6,051,340 A    4/2000 Kawakami
(Continued)

FOREIGN PATENT DOCUMENTS

CA    2161076    4/1996
CA    2258026    12/1997
(Continued)

OTHER PUBLICATIONS

International Search Report of PCT Application No. PCT/IL2017/050424, dated Jul. 13, 2017.
(Continued)

*Primary Examiner* — Jane J Rhee
(74) *Attorney, Agent, or Firm* — Pearl Cohen Zedek Latzer Baratz LLP

(57) ABSTRACT

Improved anodes and cells are provided, which enable fast charging rates with enhanced safety due to much reduced probability of metallization of lithium on the anode, preventing dendrite growth and related risks of fire or explosion. Anodes and/or electrolytes have buffering zones for partly reducing and gradually introducing lithium ions into the anode for lithiation, to prevent lithium ion accumulation at the anode electrolyte interface and consequent metallization and dendrite growth. Various anode active materials and combinations, modifications through nanoparticles and a range of coatings which implement the improved anodes are provided.

19 Claims, 31 Drawing Sheets

Related U.S. Application Data application No. 15/414,655, filed on Jan. 25, 2017, and a continuation-in-part of application No. 15/447,889, filed on Mar. 2, 2017, now Pat. No. 10,096,859, which is a continuation-in-part of application No. 15/447,784, filed on Mar. 2, 2017.

(60) Provisional application No. 62/319,341, filed on Apr. 7, 2016, provisional application No. 62/337,416, filed on May 17, 2016, provisional application No. 62/371,874, filed on Aug. 8, 2016, provisional application No. 62/401,214, filed on Sep. 29, 2016, provisional application No. 62/401,635, filed on Sep. 29, 2016, provisional application No. 62/421,290, filed on Nov. 13, 2016, provisional application No. 62/426,625, filed on Nov. 28, 2016, provisional application No. 62/427,856, filed on Nov. 30, 2016, provisional application No. 62/435,783, filed on Dec. 18, 2016, provisional application No. 62/441,458, filed on Jan. 2, 2017, provisional application No. 62/481,752, filed on Apr. 5, 2017, provisional application No. 62/482,227, filed on Apr. 6, 2017.

(51) Int. Cl.
*H01M 4/134* (2010.01)
*H01M 4/1395* (2010.01)
*H01M 4/38* (2006.01)
*H01M 4/62* (2006.01)
*H01M 10/0525* (2010.01)
*H01M 4/02* (2006.01)

(52) U.S. Cl.
CPC ............ *H01M 4/386* (2013.01); *H01M 4/387* (2013.01); *H01M 4/624* (2013.01); *H01M 10/0525* (2013.01); *H01M 2004/021* (2013.01)

(56) References Cited

U.S. PATENT DOCUMENTS

| | | |
|---|---|---|
| 6,492,061 B1 | 12/2002 | Gauthier et al. |
| 6,541,156 B1 | 4/2003 | Fuse et al. |
| 6,558,438 B1 | 5/2003 | Satoh |
| 6,599,662 B1 | 7/2003 | Chiang et al. |
| 7,192,673 B1 | 3/2007 | Ikeda et al. |
| 7,906,238 B2 | 3/2011 | Le |
| 8,021,791 B1 | 9/2011 | Plichta et al. |
| 8,945,774 B2 | 2/2015 | Coowar et al. |
| 8,951,673 B2 | 10/2015 | Wessells et al. |
| 9,406,927 B1 | 2/2016 | Burshtain et al. |
| 9,472,804 B2 | 10/2016 | Burshtain et al. |
| 9,583,761 B2 | 2/2017 | Burshtain et al. |
| 9,728,776 B2 | 8/2017 | Burshtain et al. |
| 9,871,247 B2 | 1/2018 | Burshtain et al. |
| 10,096,859 B2 | 10/2018 | Burshtain et al. |
| 2002/0122980 A1 | 9/2002 | Fleischer et al. |
| 2002/0146623 A1 | 10/2002 | Suzuki et al. |
| 2003/0039889 A1 | 2/2003 | Park et al. |
| 2004/0033360 A1 | 2/2004 | Armand et al. |
| 2004/0219428 A1 | 11/2004 | Nagayama |
| 2005/0019659 A1 | 1/2005 | Shiozaki et al. |
| 2005/0093512 A1 | 5/2005 | Mader et al. |
| 2007/0003837 A1 | 4/2007 | Nishimura et al. |
| 2007/0281216 A1 | 12/2007 | Petrat et al. |
| 2007/0284159 A1 | 12/2007 | Takami et al. |
| 2008/0248386 A1 | 9/2008 | Obrovac et al. |
| 2009/0111020 A1 | 4/2009 | Yamaguchi et al. |
| 2009/0179181 A1 | 7/2009 | Zhang et al. |
| 2009/0317637 A1 | 12/2009 | Luhrs et al. |
| 2010/0159331 A1 | 6/2010 | Lee et al. |
| 2010/0190059 A1 | 7/2010 | Graetz et al. |
| 2011/0257001 A1 | 10/2011 | Negishi |
| 2012/0045696 A1 | 2/2012 | Herle |
| 2012/0088155 A1 | 4/2012 | Yushin et al. |
| 2012/0164531 A1 | 6/2012 | Chen et al. |
| 2013/0040226 A1 | 2/2013 | Yamauchi et al. |
| 2013/0059174 A1 | 3/2013 | Zhamu |
| 2013/0071731 A1 | 3/2013 | Tokuda et al. |
| 2013/0224594 A1 | 8/2013 | Yushin et al. |
| 2013/0260285 A1 | 10/2013 | Yamauchi et al. |
| 2013/0266875 A1 | 10/2013 | Matsumoto et al. |
| 2013/0337314 A1 | 12/2013 | Essaki et al. |
| 2014/0004426 A1 | 2/2014 | Kerlau et al. |
| 2014/0113202 A1 | 4/2014 | Sun et al. |
| 2014/0127588 A1 | 5/2014 | Kato et al. |
| 2014/0242461 A1 | 8/2014 | Hwang et al. |
| 2014/0295267 A1 | 10/2014 | Wang |
| 2015/0017515 A1 | 1/2015 | Jeon et al. |
| 2015/0046110 A1 | 2/2015 | Joe et al. |
| 2015/0221977 A1 | 8/2015 | Hallac et al. |
| 2015/0367747 A1 | 12/2015 | Decker et al. |
| 2016/0036045 A1 | 2/2016 | Burshtain et al. |
| 2016/0064773 A1 | 3/2016 | Choi et al. |
| 2016/0104882 A1 | 4/2016 | Yushin et al. |
| 2016/0149220 A1 | 5/2016 | Uhm et al. |
| 2016/0264124 A1 | 9/2016 | Hotta |
| 2016/0372753 A1 | 12/2016 | Fukasawa et al. |
| 2017/0012279 A1 | 1/2017 | Burshtain et al. |
| 2017/0207451 A1 | 7/2017 | Burshtain et al. |
| 2017/0288232 A1 | 10/2017 | Herle |
| 2017/0288271 A1 | 10/2017 | Le |
| 2017/0294643 A1 | 10/2017 | Burshtain et al. |
| 2017/0294644 A1 | 10/2017 | Burshtain et al. |
| 2017/0294648 A1 | 10/2017 | Burshtain et al. |
| 2017/0294680 A1 | 10/2017 | Burshtain et al. |
| 2017/0294687 A1 | 10/2017 | Burshtain et al. |
| 2017/0373513 A1 | 12/2017 | Aronov et al. |
| 2018/0050602 A1 | 2/2018 | Aronov |
| 2018/0108937 A1 | 4/2018 | Drach et al. |
| 2018/0175634 A1 | 6/2018 | Aronov |
| 2018/0212236 A1 | 7/2018 | Jacob et al. |
| 2018/0212239 A1 | 7/2018 | Jacob et al. |
| 2018/0212240 A1 | 7/2018 | Jacob et al. |
| 2018/0212439 A1 | 7/2018 | Aronov |
| 2018/0301757 A1 | 10/2018 | Burshtain et al. |

FOREIGN PATENT DOCUMENTS

| | | |
|---|---|---|
| CN | 101734675 | 6/2010 |
| CN | 104577081 | 4/2015 |
| EP | 1999818 | 10/2008 |
| EP | 2889097 | 1/2015 |
| JP | 2002/056891 | 2/2002 |
| JP | 2002087807 | 3/2002 |
| JP | 2006/216276 | 8/2006 |
| JP | 2007/323837 | 12/2007 |
| JP | 2008/053092 | 6/2008 |
| JP | 2012/131674 | 7/2012 |
| JP | 2012-131674 A | 7/2012 |
| JP | 2014-002834 | 1/2014 |
| KR | 2012/0121265 | 11/2012 |
| TW | 200616268 | 5/2006 |
| WO | WO 2013/040356 | 3/2013 |
| WO | WO 2014/068036 | 5/2014 |
| WO | WO 2015/016563 | 2/2015 |
| WO | WO 2015/114640 | 8/2015 |
| WO | WO 2015/145521 | 10/2015 |
| WO | WO 2016/031082 | 3/2016 |

OTHER PUBLICATIONS

Office Action for U.S. Appl. No. 15/480,919, dated Jul. 5, 2017.
Office Action for U.S. Appl. No. 15/447,889, dated Jul. 17, 2017.
Office Action for U.S. Appl. No. 15/447,784, dated Jun. 22, 2017.
Office Action for U.S. Appl. No. 15/414,655, dated May 9, 2017.
Office Action for U.S. Appl. No. 15/480,888, dated Oct. 1, 2018.
Office Action for U.S. Appl. No. 15/480,904, dated Oct. 29, 2018.
Office Action for U.S. Appl. No. 15/480,911, dated Nov. 8, 2018.
Office Action for U.S. Appl. No. 15/414,655, dated Aug. 14, 2017.
Office Action for U.S. Appl. No. 14/926,012, dated Apr. 21, 2016.
Office Action for U.S. Appl. No. 14/813,499, dated Mar. 10, 2017.

(56) References Cited

OTHER PUBLICATIONS

Office Action for U.S. Appl. No. 15/480,888, dated Jul. 5, 2017.
Office Action of U.S. Appl. No. 15/263,399, dated Nov. 14. 2016.
Office Action of U.S. Appl. No. 15/582,066 dated Aug. 21, 2017.
Office Action for U.S. Appl. No. 15/447,784 dated Oct. 19, 2017.
Office Action for U.S. Appl. No. 15/480,888 dated Sep. 13, 2017.
Office Action for U.S. Appl. No. 15/447,784, dated Dec. 28, 2017.
Office Action for U.S. Appl. No. 15/844,689, dated Jan. 31, 2018.
Office Action for U.S. Appl. No. 15/853,885, dated Feb. 23, 2018.
Office Action for U.S. Appl. No. 15/783,586, dated Apr. 6, 2018.
European Search Report for Application No. EP17206661.5, dated Apr. 16, 2018.
Office Action for U.S. Appl. No. 15/447,889, dated May 24, 2018.
Office Action for U.S. Appl. No. 15/480,922, dated Nov. 8, 2018.
Notice of Allowance for U.S. Appl. No. 15/783,586, dated Jan. 25, 2019.
Office Action for U.S. Appl. No. 15/853,885, dated Jan. 10, 2019.
Jankovski et al. "New boron based salts for lithium-ion batteries using conjugated ligands", Physical Chemistry Chemical Physics, May 19, 2016, vol. 18, pp. 16274-16280.
Chaudhuri et al. "Core/shell nanoparticles: classes, properties, synthesis mechanisms, characterization, and applications", Chemical Reviews, vol. 112, No. 4, pp. 2373-2433, 2012.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Wen et al. "Thermodynamic and Mass Transport Properties of "LiAl"", Solid-State Science and Technology, Dec. 1979, vol. 126, No. 12, pp. 2258-2266.
Qi et al. "Threefold Increase in the Young's Modulus of Graphite Negative Electrode during Lithium Intercalation", Journal of The Electrochemical Society, 2010, vol. 157, No. 5, pp. A558-A566.
Son et al. "Silicon carbide-free graphene growth on silicon for lithium-ion battery with high volumetric energy density", Nature Communications, Jun. 25, 2015, vol. 6, No. 7393. pp. 1-8.
Tow et al. "A Study of Highly Oriented Pyrolytic Graphite as a Model for the Graphite Anode in Li-Ion Batteries", Journal of The Electrochemical Society, 1999, vol. 146, No. 3, pp. 824-832.
Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.
Sun et al. "Silicon/Wolfram Carbide@Graphene composite: enhancing conductivity and structure stability in amorphous-silicon for high lithium storage performance", Electrochimica Acta. Jun. 25, 2016, vol. 191, pp. 462-472.
Guriparti et al. "Review on recent progress of nanostructured anode materials for Li-ion batteries", Journal of Power Sources, 2014, vol. 257, pp. 421-443.
Scott et al. "Ultrathin Coatings on Nano-LiCoO2 for Li-Ion Vehicular Applications", Nano Letters, 2011. vol. 11, pp. 414-418.
Cho et al. "Zero-Strain Intercalation Cathode for Rechargeable Li-Ion Cell", Angewandte Chemie, 2001, vol. 40, No. 18, pp. 3367-3369.
Ngo et al. "Mass-scalable synthesis of 3D porous germanium-carbon composite particles as an ultra-high rate anode for lithium ion batteries", Energy & Environmental Science, 2015, vol. 8, pp. 3577-3588.

Chen et al. "Conductive Rigid Skeleton Supported Silicon as High-Performance Li-Ion Battery Anodes", Nano Letters, 2012, vol. 12, pp. 4124-4130.
Kim et al. "Electrochemical properties of carbon-coated Si/B composite anode for lithium ion batteries", Journal of Power Sources, 2009. vol. 189, pp. 108-113.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of The Electrochemical Society, 1999, vol. 146, No. 3, pp. 857-861.
Doughty et al. "A General Discussion of Li Ion Battery Safety", The Electrochemical Society Interface, 2012, pp. 37-44.
Wang et al. "Boron-doped carbon nanotube-supported Pt nanoparticies with improved CO tolerance for methanol electro-oxidation", Phys. Chem. Chem. Phys., 2012, vol. 14, pp. 13910-13913.
Liu et al. "A pomegranate-inspired nanoscale design for large-volume-change lithium battery anodes", Nature Nanotechnology, Mar. 2014, vol. 9, pp. 187-192.
Tao et al. "Hollow core—shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
He et al. "Effect of solid electrolyte interface (SEI) film on cyclic performance of Li4Ti5O12 anodes for Li ion batteries", Journal of Power Sources, 2013, vol. 239, pp. 269-276.
Chung et al. "Electronically conductive phospho-olivines as lithium storage electrodes", nature materials, Oct. 22, 2002, vol. 1, pp. 123-128.
Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.
Wu et al. "Hydrogen Storage in Pillared Li-Dispersed Boron Carbide Nanotubes", J. Phys. Chem. C, 2008, vol. 112, No. 22, pp. 8458-8463.
Suzuki et al. "Silicon nitride thin film electrode for lithium-ion batteries", Journal of Power Sources, 2013, vol. 231, pp. 186-189.
Cui et al. "Carbon-Silicon Core-Shell Nanowires as High Capacity Electrode for Lithium Ion Batteries", Nano Letters, May 8, 2009, vol. 9, No. 9, pp. 3370-3374.
Wang et al. "The dimensionality of Sn anodes in Li-ion batteries", materialstoday, Dec. 2012, vol. 15, No. 12, pp. 544-552.
Bhandavat et al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.
Hu et al. "Silicon/graphene based nanocomposite anode: large-scale production and stable high capacity for lithium ion batteries", Journal of Materials Chemistry A, 2014, vol. 2, No. 9118, pp. 9118-9125.
Konno et al. "Application of Si—C—O glass-like compounds as negative electrode materials for lithium hybrid capacitors", Journal of Power Sources. 2009, vol. 191, pp. 623-627.
Bhandavat et al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.
Nowotny et al. "Investigations in the three systems: Molybdenum-Silicon-boron, tungsten-Silicon-boron and in which System: VS12—TaSi2", MB. Chem., 1956, vol. 88, No. 2, pp. 179-182.
Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.
Kasavajjula et al. "Nano- and bulk-silicon-based insertion anodes for lithium-ion secondary cells", Journal of Power Sources, 2007, Vo. 163, pp. 1003-1039.

(56) References Cited

OTHER PUBLICATIONS

Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.
Nitta et al. "High-Capacity Anode Materials for Lithium-Ion Batteries: Choice of Elements and Structures for Active Particles", Particle Systems Characterization, 2014, vol. 31, pp. 317-336.
Hwang et al. "Mesoporous Ge/GeO2/Carbon Lithium-Ion Battery Anodes with High Capacity and High Reversibility", ACS Nano, Apr. 13, 2015, vol. 9, No. 5, pp. 5299-5309.
Balomenos et al. "Exergy Analysis of Metal Oxide Carbothemic Reduction under Vacuum—Sustainability prospects", International Journal of Thermodynamics, Jun. 4, 2012. vol. 15, No. 3, pp. 141-148.
Barton et al. "The Reduction of Germanium Dioxide With Graphite at High Temperatures", Journal of the Less-Common Metals, 1970, vol. 22, pp. 11-17.
Billaud et al. "Synthesis and electrical resistivity of lithium-pyrographite intercalation compounds (stages I, II and III)", Materials Research Bulletin, Jul. 1979, vol. 14, No. 7, pp. 857-864.
Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.
Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.
Molino et al. "Hydrophobic conducting polymer films from post deposition thiol exposure", Synthetic Metals 162, 2012, pp. 1464-1470.
E. Mcrae and J.F. Mareche "Stage dependence of the electrical resistivity of graphite intercalation compounds" Journal of Physics C: Solid State Physics, vol. 18, No. 8, Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust info High-Performance Nanoflakes for Lithium-Ion Batteries" Sci Rep. 2017; 7: 42734. Published online Feb. 20, 2017.
Yongxin An et al. "Effects of VC-LiBOB binary additives on SEI formation in ionic liquid—organic composite electrolyte" RSC Advances, 2012, 2, Received Nov. 6, 2011, Accepted Feb. 21, 2012, pp. 4097-4102.
Aaron M. Chockla "Tin-Seeded Silicon Nanowires for High Capacity Li-Ion Batteries" Department of Chemical Engineering, Texas Materials Institute, Center for Nano- and Molecular Science and Technology, The University of Texas at Austin, Austin, Texas 78712-1062, United States, pp. 3738-3745, Published: Sep. 11, 2012.
Yong-Mao Lin et al. "High performance silicon nanoparticle anode in fluoroethylene carbonate-based electrolyte for Li-ion batteriesw" Chem. Commun., 2012, 48, Received Mar. 7, 2012, Accepted May 28, 2012, pp. 7268-7270.
Rosa Martel Danoary Tsirinomeny "Contribution to the Ultra-Fast Charging of Electric Vehicles: The Configurable Modular Multi-level Converter (CMMC)" Mots-clé de l'auteur: Ultra-fast : lithium-titanate ; UFCEV ; CMMC ; Flex-EV. Mar. 4, 2016.
Aldrich (Sigma-Aldrich MSDS Lithium hexafluorophosphate {http://www.sigmaaldrich.com/MSDS/MSDS/DisplayMSDSPage.do?country=US&language=en&productNumber=450227&brand=ALDRICH} Printed Dec. 19, 2017).
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF} date Nov. 4, 2014).
Lewandowski et al. "Ionic liquids as electrolytes for Li-ion batteries—An overview of electrochemical studies", Journal of Power Sources, vol. 194, 2009, pp. 601-609.
Buzzeo et al. "Non-Haloaluminate Room-Temperature Ionic Liquids in Electrochemistry—A Review", ChemPhysChem, 2004, vol. 5, pp. 1106-1120.
Moreno et al. "Ionic Liquid Electrolytes for Safer Lithium Batteries", Journal of The Electrochemical Society, vol. 164, No. 1, 2017, pp. A6026-A6031.
Aurbach et al. "A short review of failure mechanisms of lithium metal and lithiated graphite anodes in liquid electrolyte solutions", Solid State Ionics, 2002. vol. 148, pp. 406-416.
Xu et al. "Reversible Conversion of Conducting Polymer Films from Superhydrophobic to Superhydrophilic", Angewandte Chemie, 2005, vol. 44, pp. 6009-6012.
Byeon "Multifunctional metal-polymer nanoagglomerates from singlepass aerosol self-assembly", Scientific Reports, Aug. 10, 2016, pp. 1-8.
Qi et al. "Lithium Concentration Dependent Elastic Properties of Battery Electrode Materials from First Principles Calculations", Journal of The Electrochemical Society, 2014, vol. 161, No. 11, pp. F3010-F3018.
Secrist "Compound Formation in the Systems Lithium-Carbon and Lithium-Boron", Journal of the American Ceramic Society, Oct. 1967, vol. 50, No. 10, pp. 520-523.
Office Action for U.S. Appl. No. 16/254,644, dated Mar. 1, 2019.
Notice of Allowance for U.S. Appl. No. 16/258,728 dated Mar. 6, 2019.
Office Action for CN Application No. 2015800456854, dated Mar. 22, 2019.
Office Action for U.S. Appl. No. 16/268,527, dated Apr. 2, 2019.
Office Action for U.S. Appl. No. 16/243,190, dated Jun. 12, 2019.
Office Action for U.S. Appl. No. 15/853,885, dated May 1, 2019.
Extended European Search Report for EP Application No. EP17778800.7, dated Aug. 12, 2019.

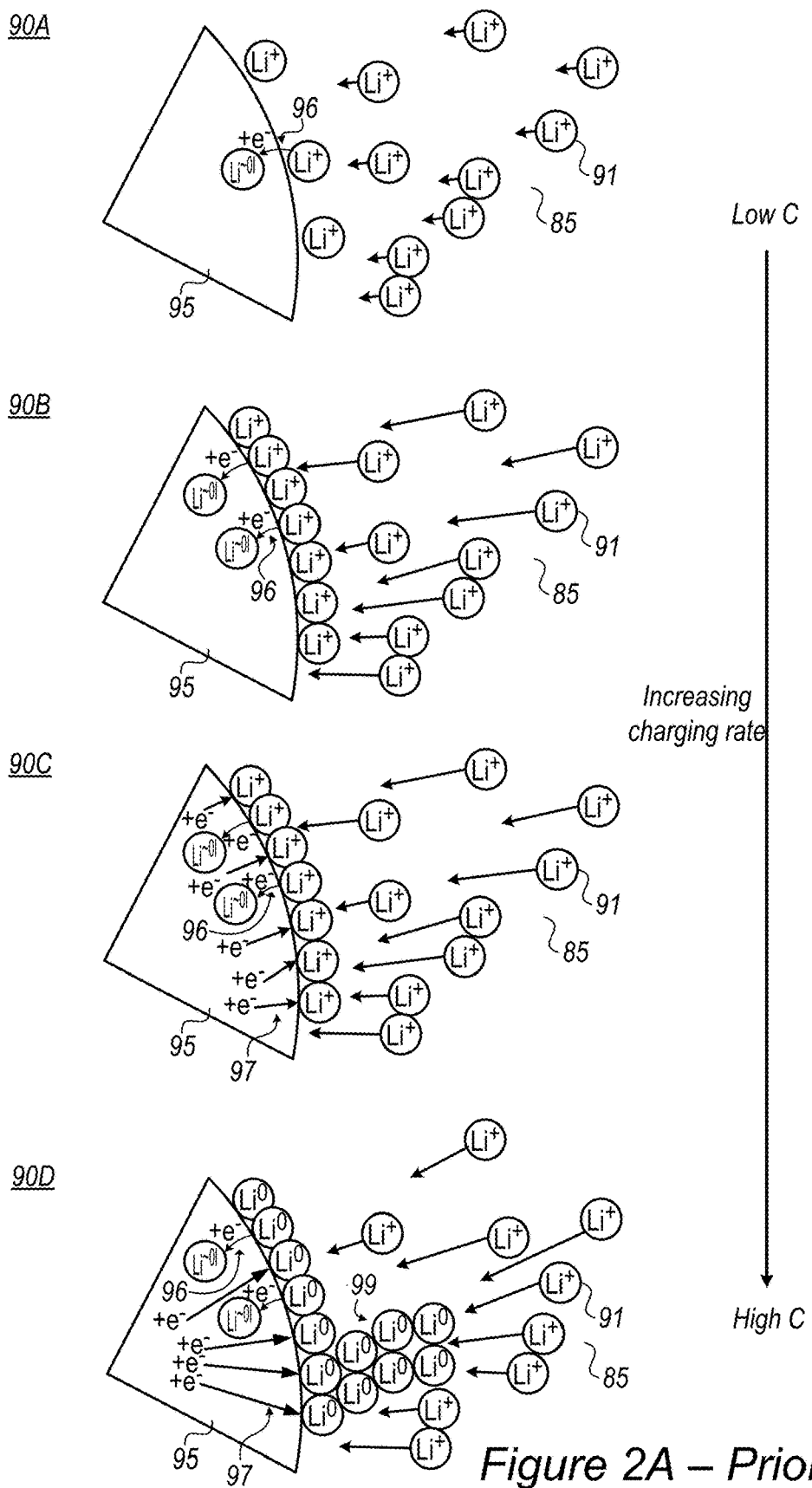
Figure 2A – Prior art

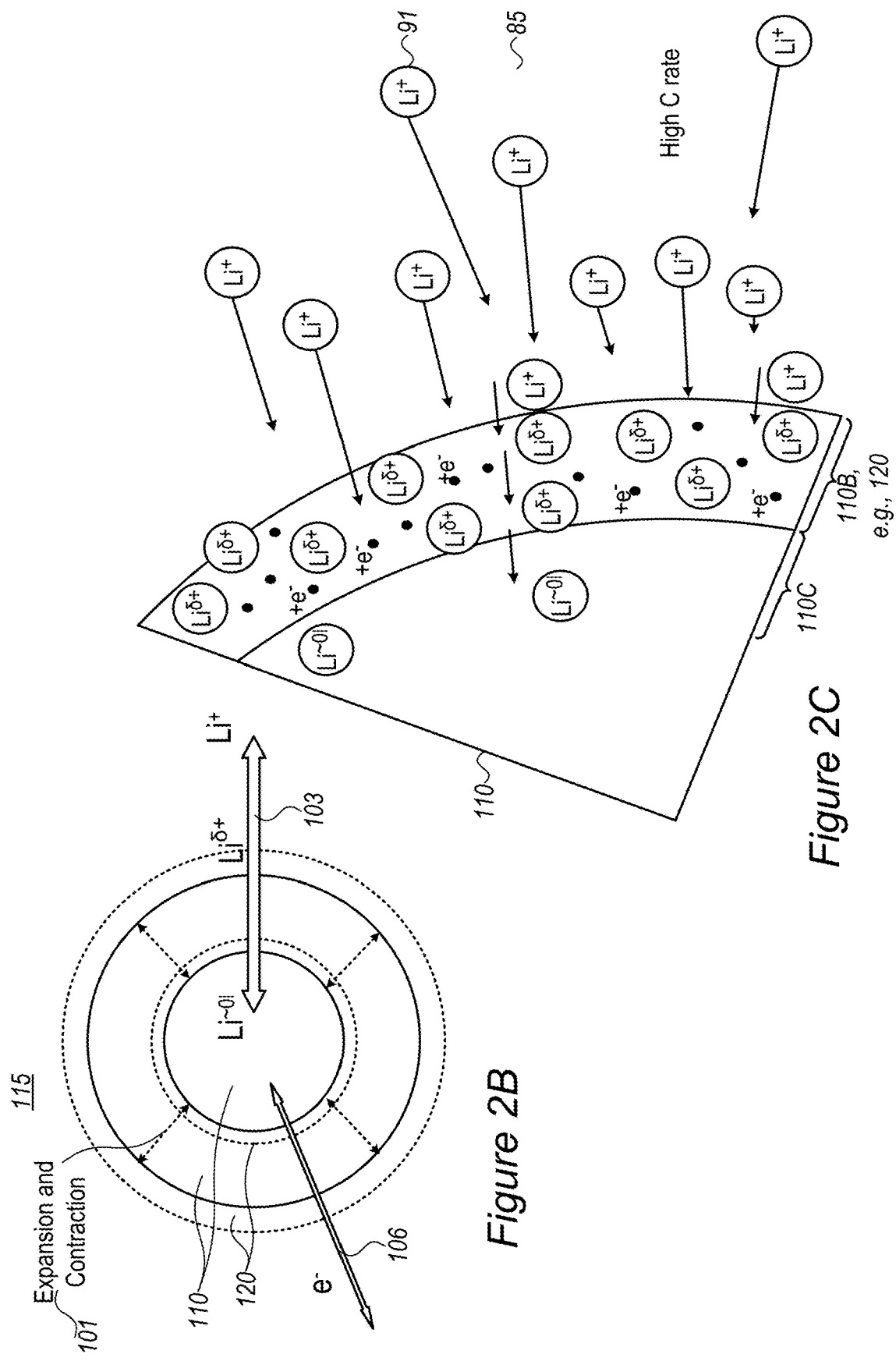

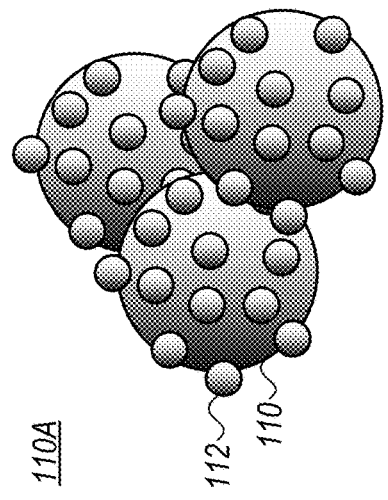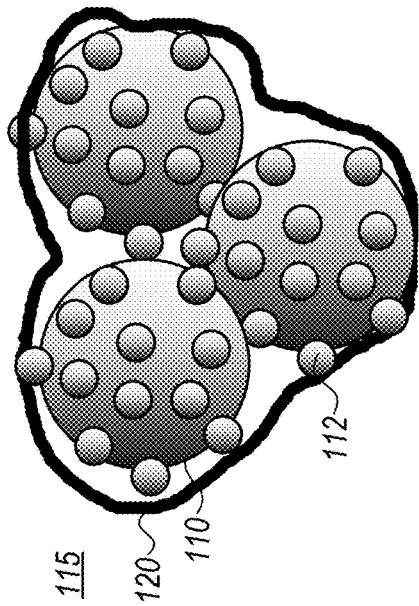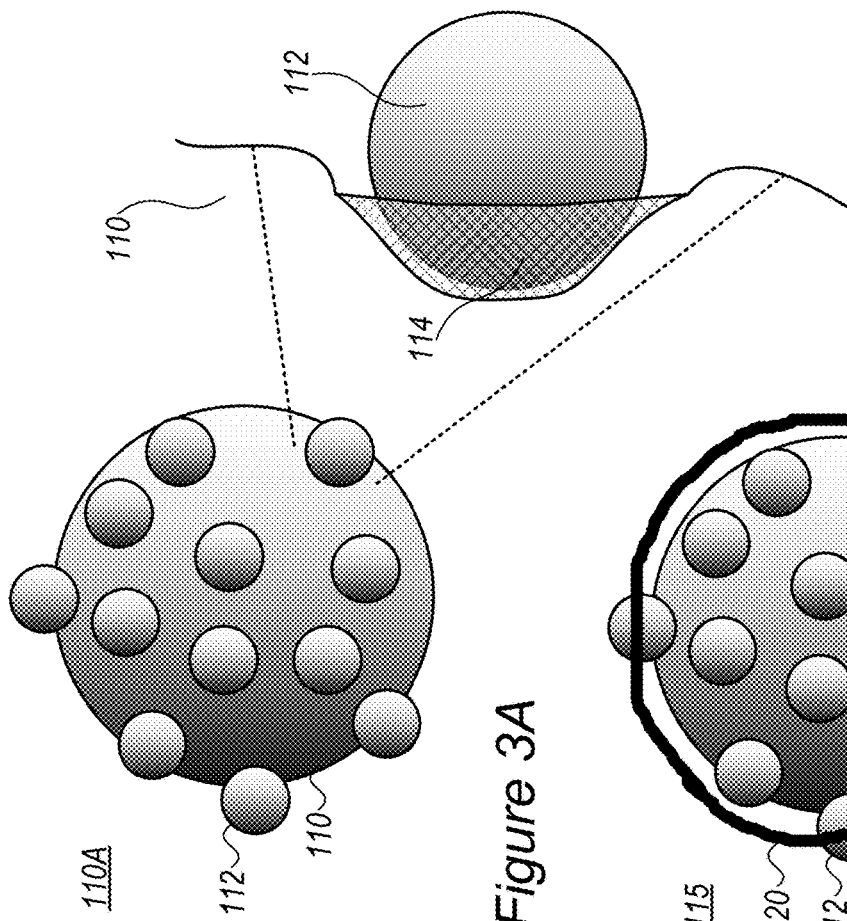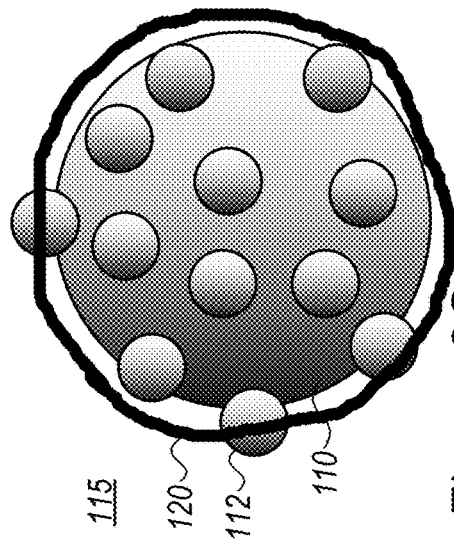
Figure 3A
Figure 3B
Figure 3C
Figure 3D

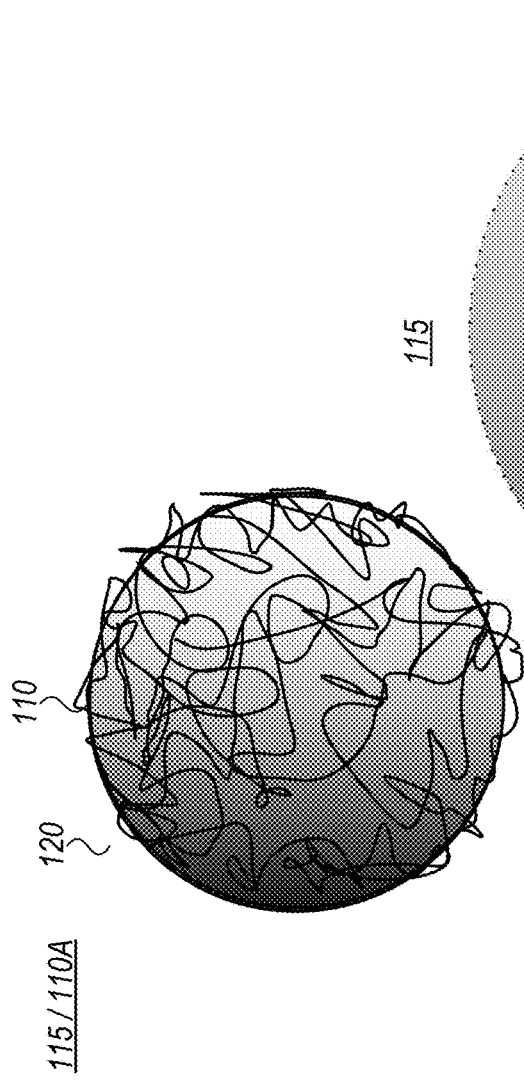
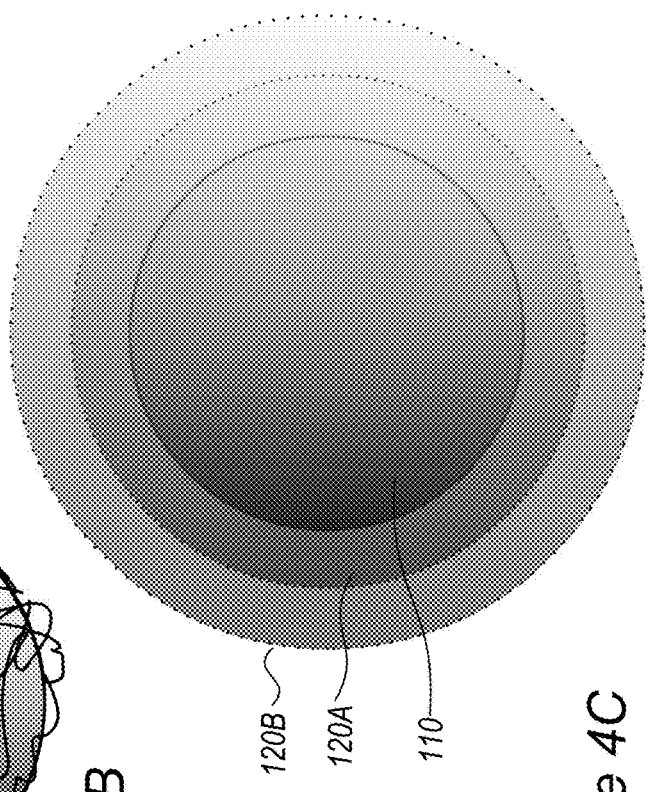
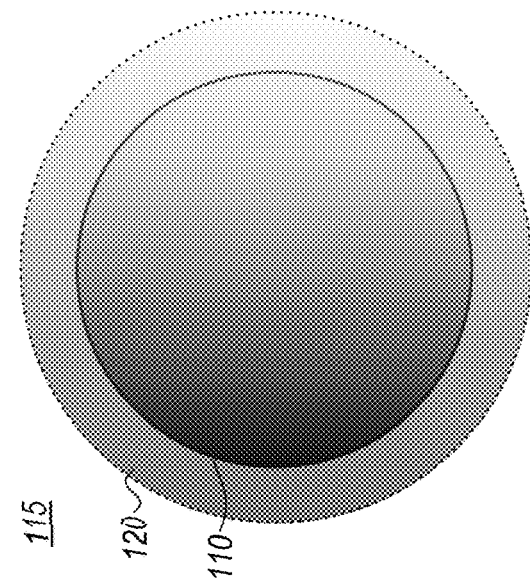
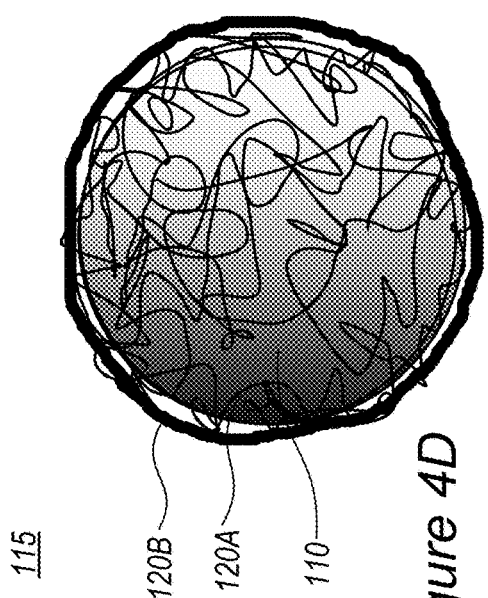
Figure 4A
Figure 4B
Figure 4C
Figure 4D

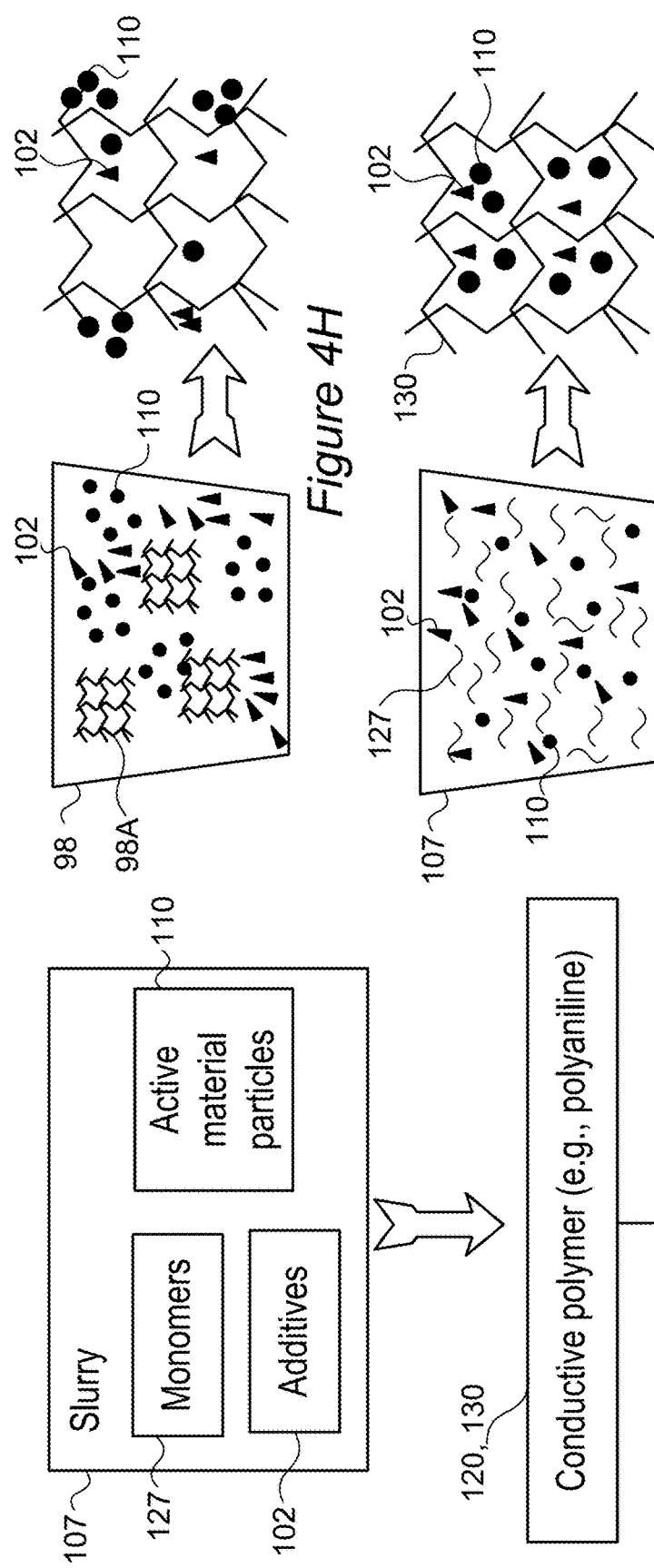
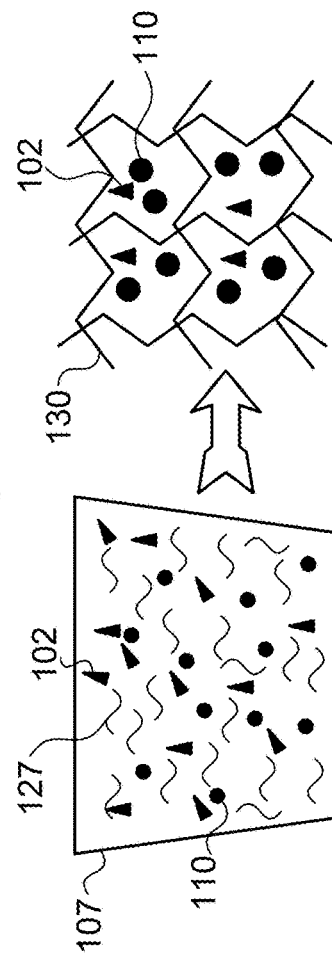
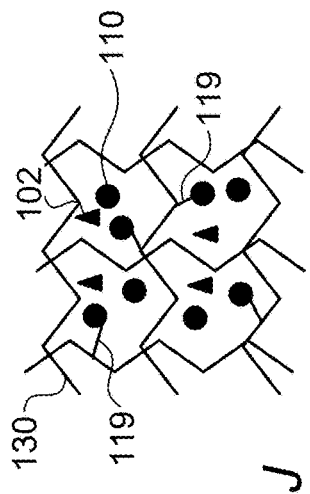
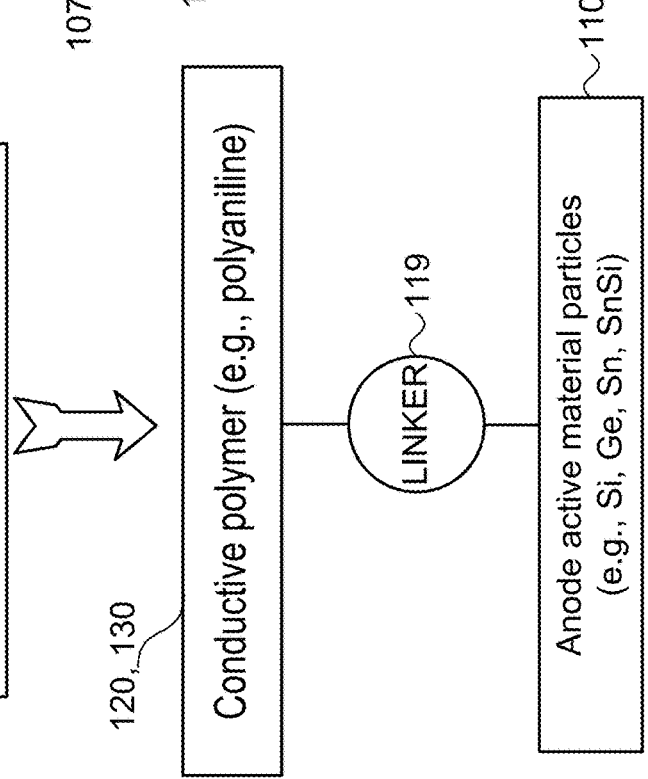
Figure 4H
Figure 4I
Figure 4J
Figure 4G

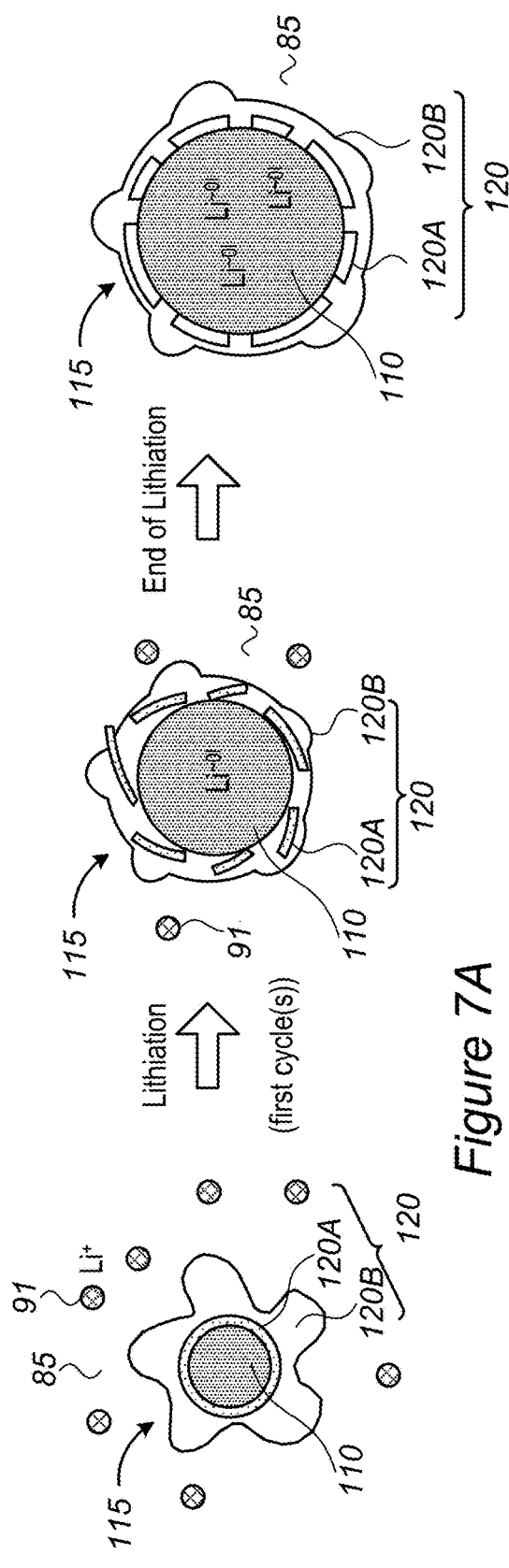
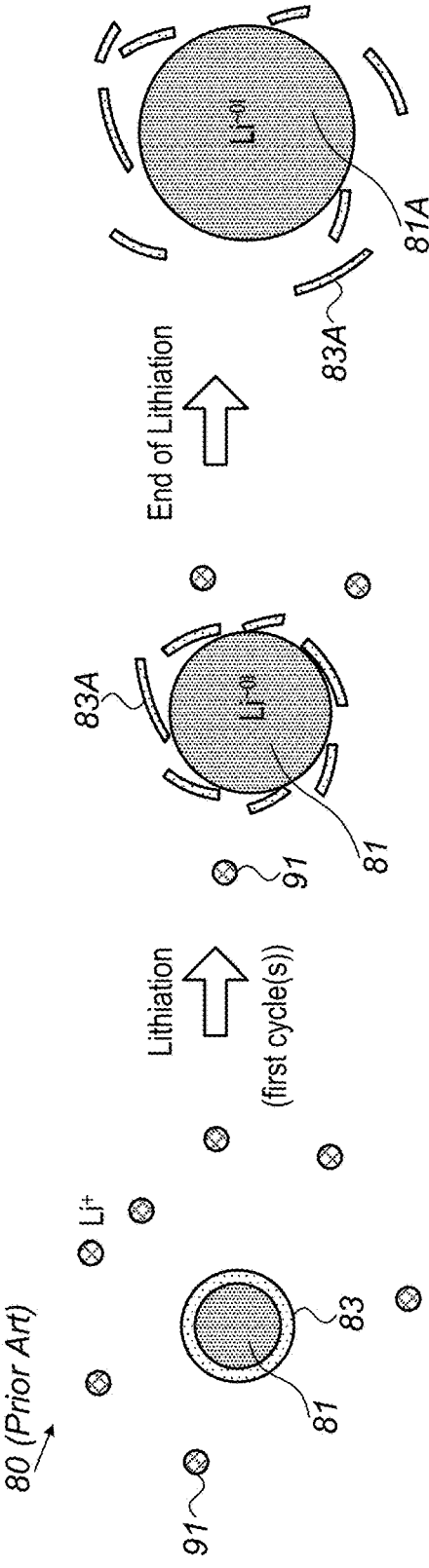
Figure 7A
Figure 7B

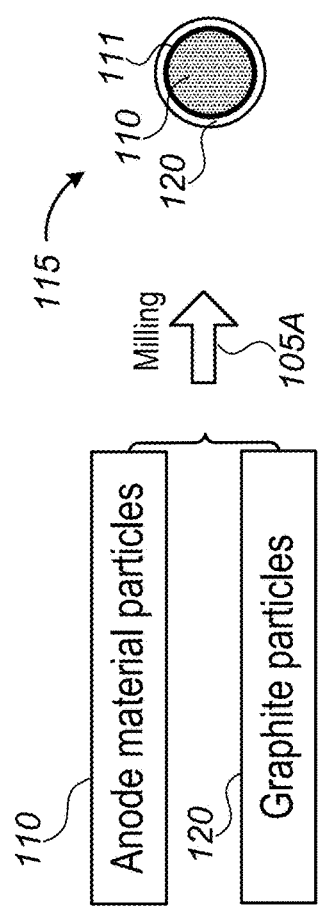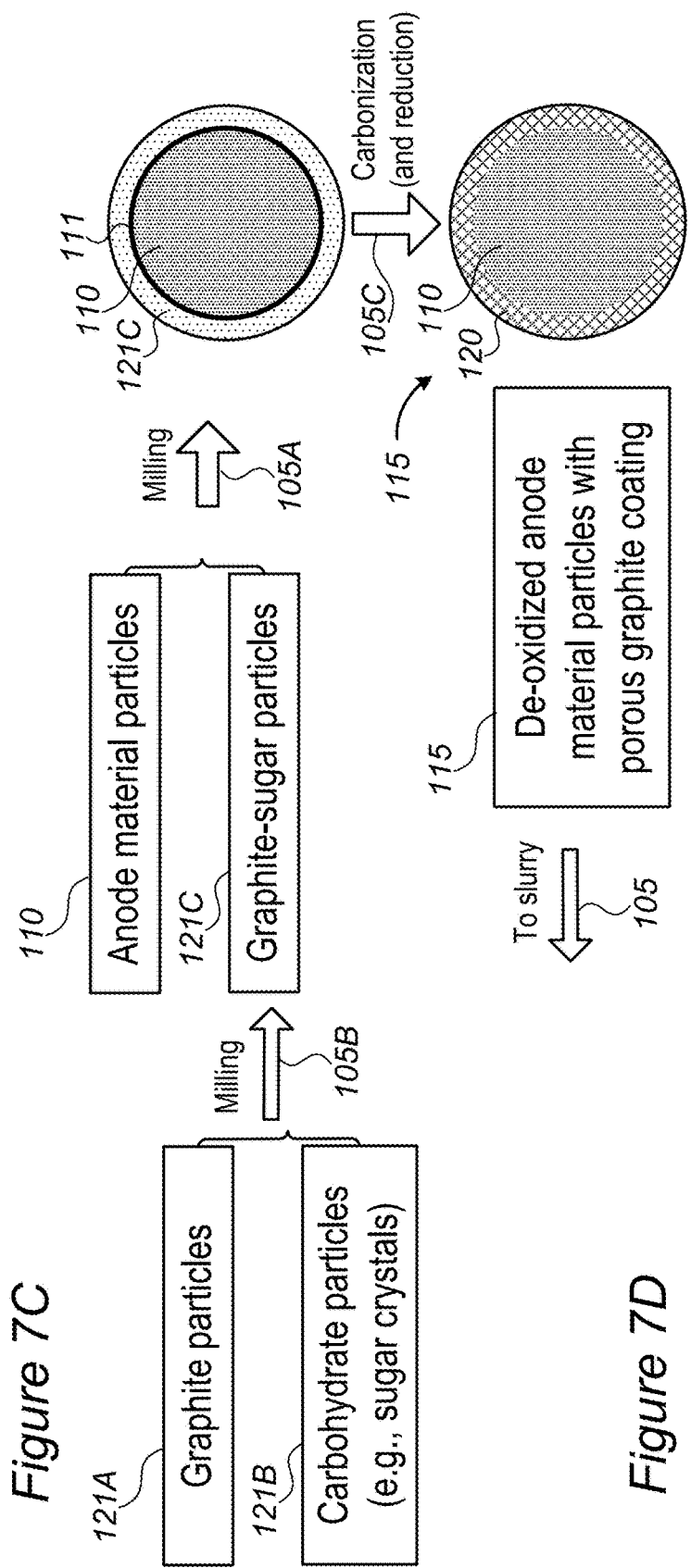
*Figure 7C*
*Figure 7D*

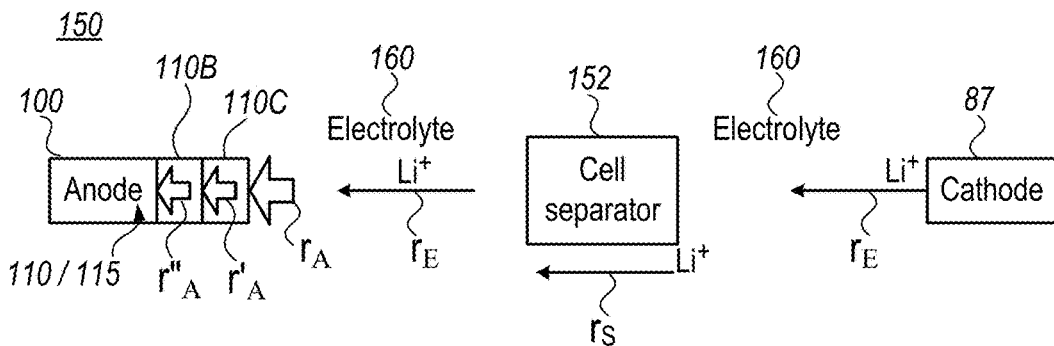
*Figure 9A*
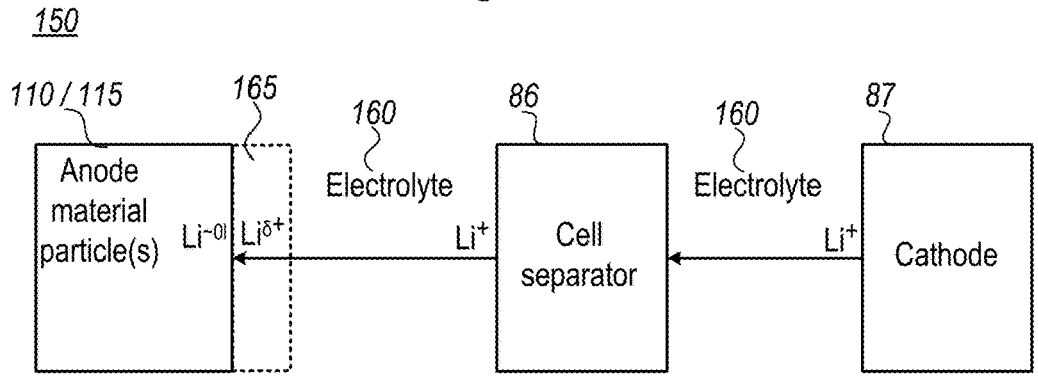
*Figure 9B*
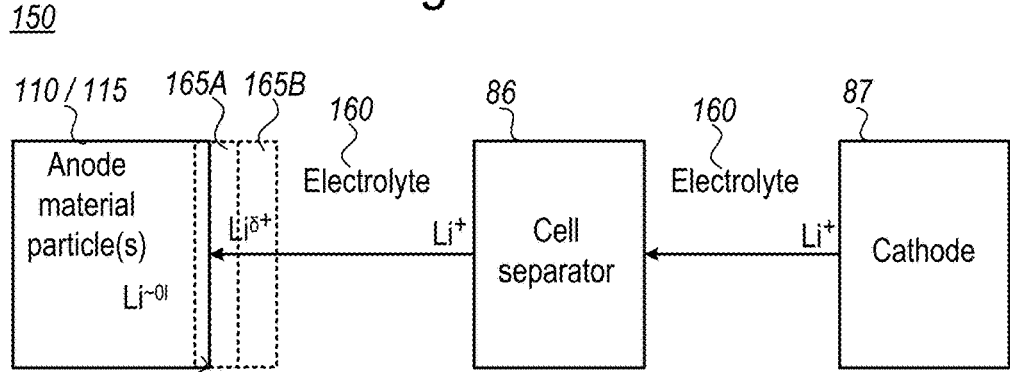
*Figure 9C*
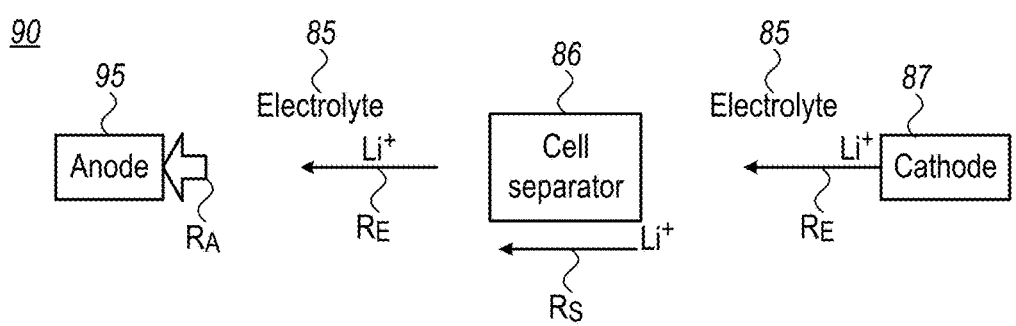
*Figure 9D - Prior art* lithium 4-methylbenzenesulfonate

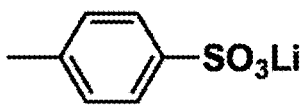

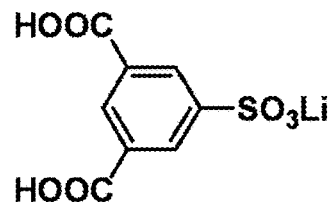

lithium 3,5-dicarboxybenzenesulfonate lithium sulfate    Lithium phosphate / lithium phosphate monobasic

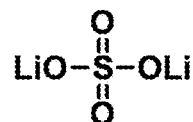  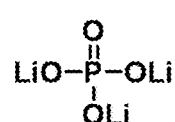  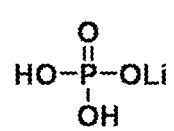

lithium 4-dodecylbenzenesulfonate    lithium propane-1-sulfonate

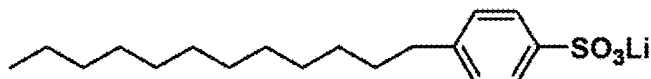  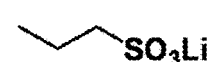

lithium 1,1,2,2,3,3,4,4,5,5,6,6,7,7,8,8,8-heptadecafluorooctane-1-sulfonate $CF_3CF_2CF_2CF_2CF_2CF_2CF_2CF_2SO_3Li$ lithium 2,6-dimethylbenzene-1,4-disulfonate

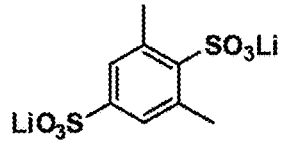

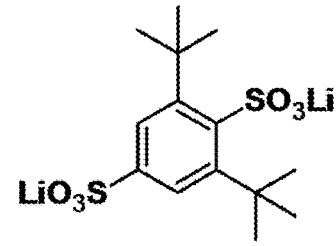

**lithium 2,6-di-*tert*-butylbenzene-1,4-disulfonate**

3,3'-((1,2-dithiane-4,5-diyl)bis(oxy))bis(*N*-hydroxypropanamide)

3,3'-((4-mercapto-1,2-phenylene)bis(oxy))bis(*N*-hydroxypropanamide)

Lithium aniline sulfonate
(The sulfonate can be p-; m-; o-)

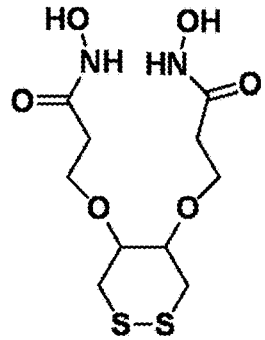  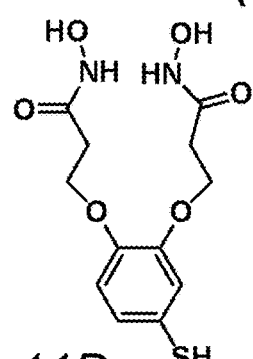  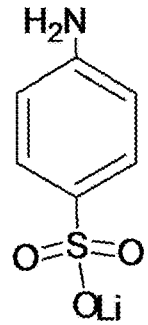  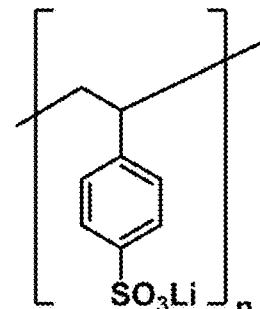

*Figure 11D*          Poly(lithium-4-styrenesulfonate)

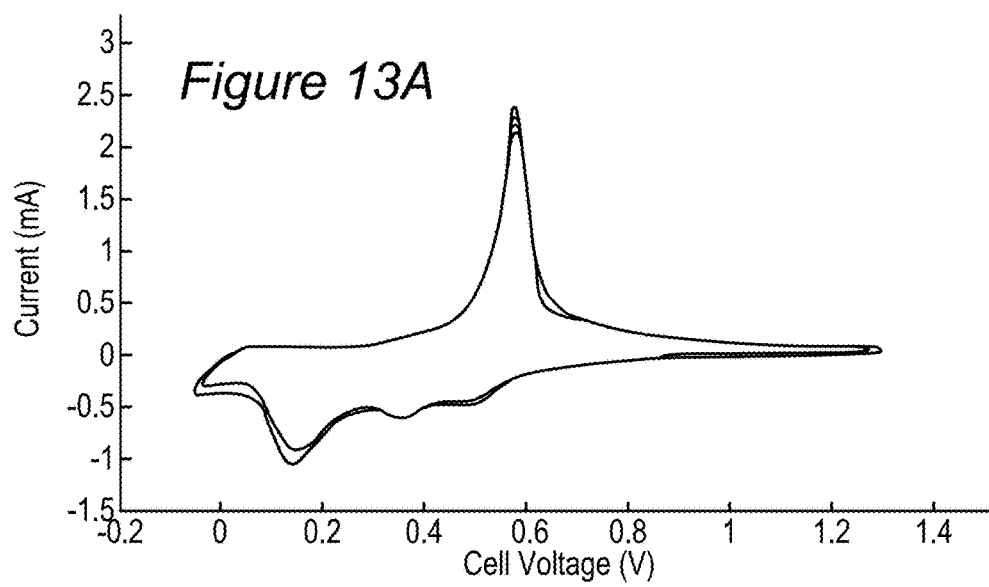
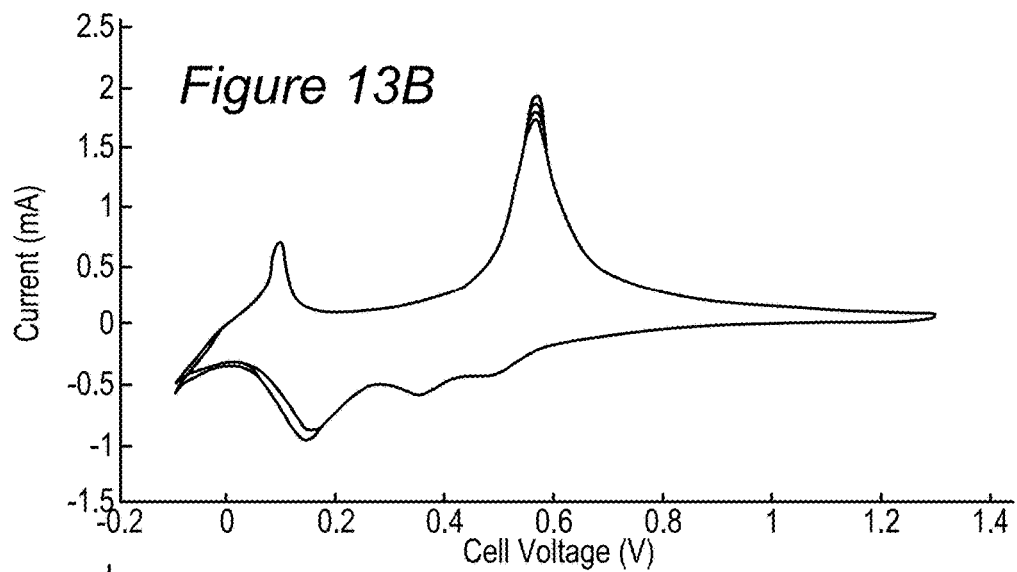
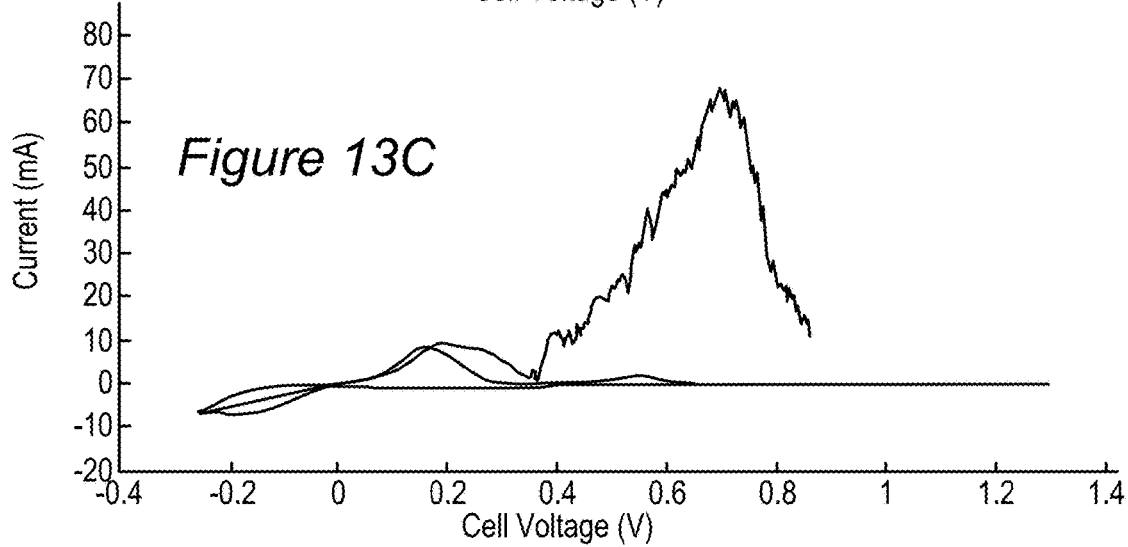

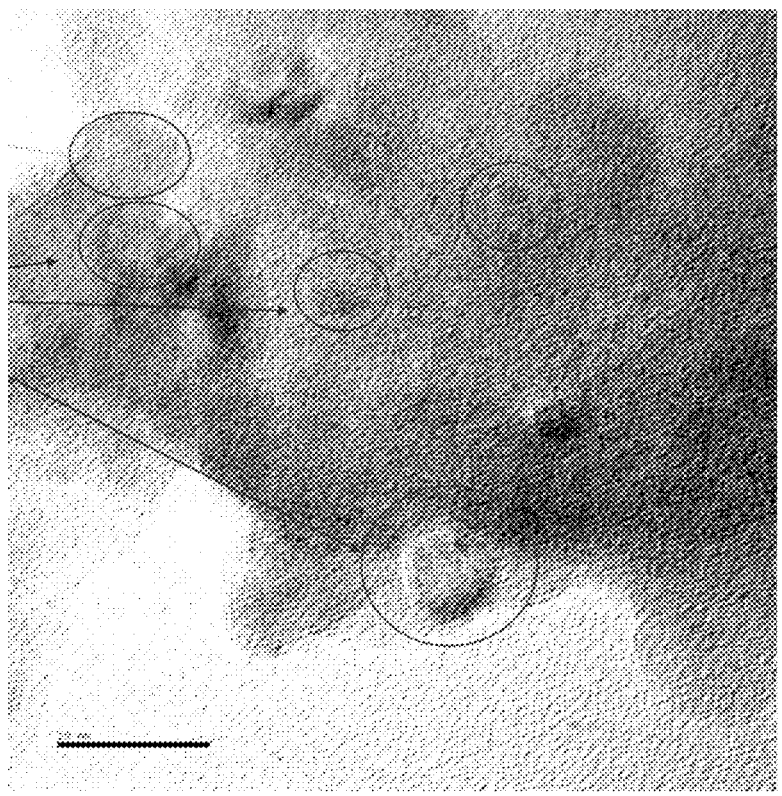
Figure 14K
Figure 15
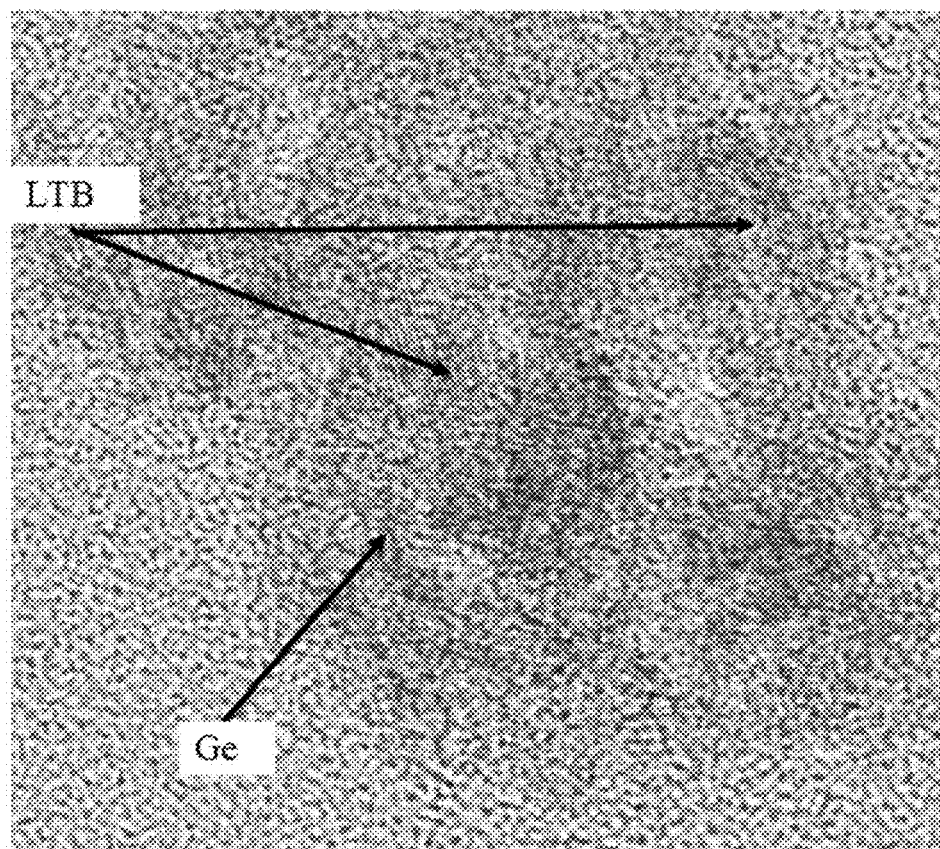

METHODS FOR PREPARING ANODES FROM ANODE ACTIVE MATERIAL PARTICLES WITH LITHIUM BORATES AND PHOSPHATES COATINGS

CROSS REFERENCE TO RELATED APPLICATIONS

This application is a continuation of U.S. patent application Ser. No. 15/480,922, filed on Apr. 6, 2017, which is continuation-in-part of U.S. patent application Ser. No. 15/414,655, filed Jan. 25, 2017 and a continuation-in-part of U.S. patent application Ser. No. 15/447,889, filed Mar. 2, 2017 and a continuation-in-part of U.S. patent application Ser. No. 15/447,784, filed Mar. 2, 2017; U.S. patent application Ser. Nos. 15/480,922 and 15/447,784 further claim the benefit of U.S. Provisional Patent Application Nos. 62/319,341, filed Apr. 7, 2016, 62/337,416, filed May 17, 2016, 62/371,874, filed Aug. 8, 2016, 62/401,214, filed Sep. 29, 2016, 62/401,635, filed Sep. 29, 2016, 62/421,290, filed Nov. 13, 2016, 62/426,625, filed Nov. 28, 2016, 62/427,856, filed Nov. 30, 2016, 62/435,783, filed Dec. 18, 2016, 62/441,458, filed Jan. 2, 2017; U.S. patent application Ser. No. 15/480,922 further claims the benefit of U.S. Provisional Patent Application Nos. 62/481,752, filed Apr. 5, 2017 and 62/482,227, filed Apr. 6, 2017, U.S. patent application Ser. No. 15/447,889 further claims the benefit of U.S. Provisional Patent Application Nos. 62/435,783, filed Dec. 18, 2016, and 62/441,458, filed Jan. 2, 2017, all of which are hereby incorporated by reference.

BACKGROUND OF THE INVENTION

1. Technical Field

The present invention relates to the field of energy storage devices, and more particularly, to fast charging lithium ion batteries.

2. Discussion of Related Art

A major barrier in battery technology concerns safety requirements, particularly when batteries are overheated or overcharged, resulting in thermal runaway, cell breakdown and possibly fire or explosion. Additionally, a short circuit or a design defect may also bring about battery failure resulting in fire and safety risks. Lithium ion batteries in particular, while having operational advantages, are potentially flammable due to their high reactivity, particular when in contact with humidity.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an anode comprising anode active material particles, wherein the anode active material particles have, at a surface thereof, a buffering zone configured to receive lithium ions from an interface of the anode active material particles with an electrolyte, partly mask a positive charge of the received lithium ions, and enable the partly masked lithium ions to move into an inner zone of the anode active material particles for lithiation therein, wherein the buffering zone comprises a plurality of electron donating groups interspaced between non-electron donating groups at a ratio of at least 1:2.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2A is a high-level schematic illustration of a metallization process in prior art lithium ion batteries, according to the prior art.

FIG. 2B is a high level schematic illustration of several processes which affect composite anode material particles during battery operation, according to some embodiments of the invention.

FIGS. 2C and 2D are high level schematic illustrations of configurations of anode material particles, according to some embodiments of the invention.

FIGS. 3A-3D are high level schematic illustrations of modified anode active material particles, according to some embodiments of the invention.

FIGS. 4A-4F are high level schematic illustrations of coatings in composite anode particles, according to some embodiments of the invention.

FIG. 4G-4J are high level schematic illustrations of in-situ polymerization of conductive polymers, according to some embodiments of the invention.

FIG. 7A is a high level schematic illustration of a core-shell particle with a composite shell in composite anode material and its advantages, according to some embodiments of the invention—with respect to prior art illustrated schematically in FIG. 7B.

FIG. 7C is a high level schematic illustration of composite anode material particles with graphite shells, according to some embodiments of the invention.

FIG. 7D is a high level schematic illustration of composite anode material particles with porous graphite shells, according to some embodiments of the invention.

FIG. 9A-9C are high level schematic illustrations of cell configurations, according to some embodiments of the invention, compared with prior art configurations illustrated in FIG. 9D.

FIG. 11D is a high level schematic illustration of non-limiting examples for bonding molecules, according to some embodiments of the invention.

FIGS. 13A-13C are examples for charging/discharging cycles of anodes with respect to lithium (half cells), according to some embodiments of the invention.

FIGS. 14G-14K are examples for modified anode active material particles, according to some embodiments of the invention.

FIG. 15 presents an example for formation of LTB (lithium tetraborate) in modified anode material particles, according to some embodiments of the invention.

DETAILED DESCRIPTION OF THE INVENTION

Figure 1A:
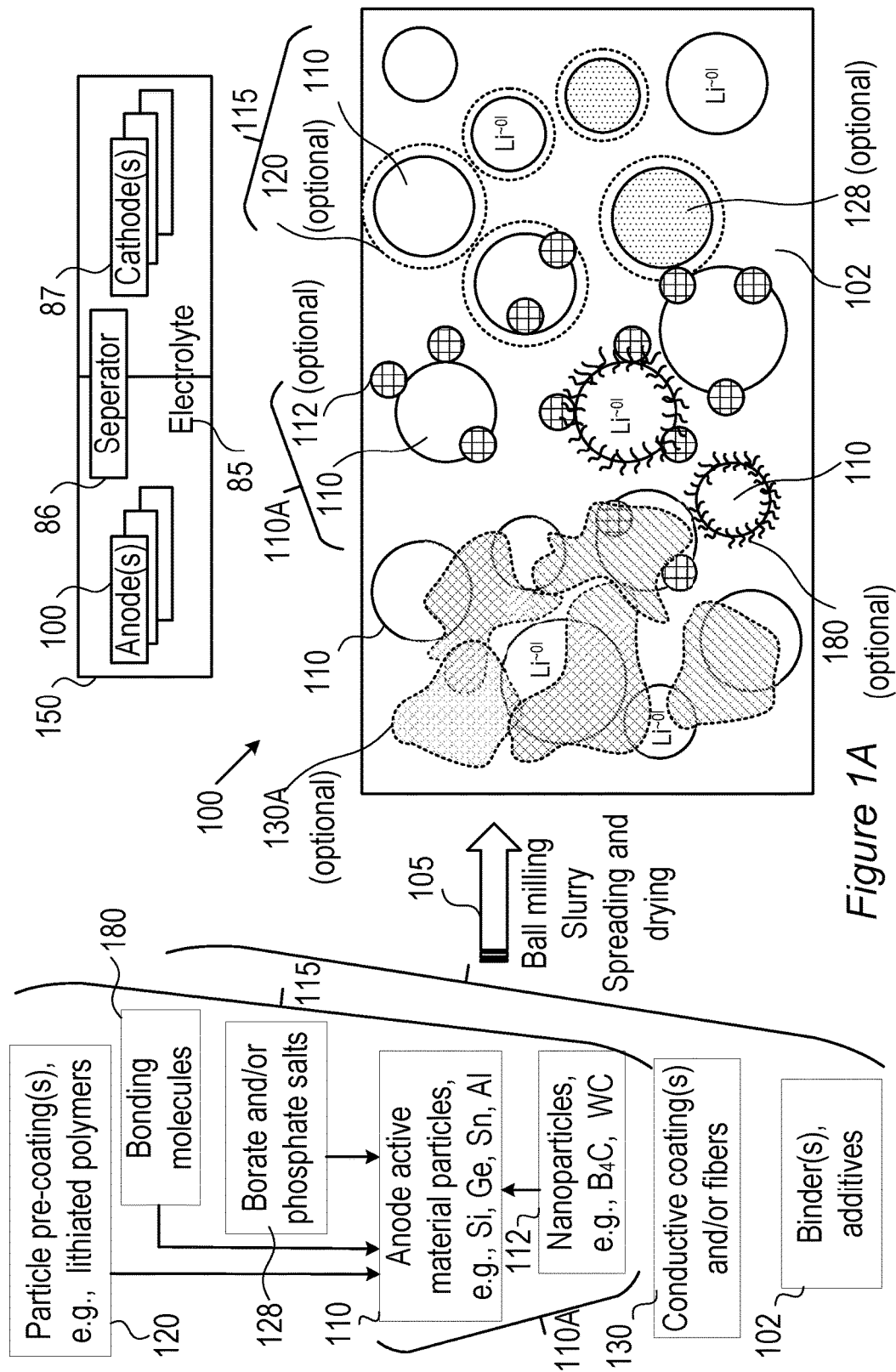
FIG. 1A is a high level schematic illustration of various anode configurations, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology.

Improved anodes and cells are provided, which enable fast charging rates with enhanced safety due to much reduced probability of metallization of lithium on the anode, preventing dendrite growth and related risks of fire or explosion. Anodes and/or electrolytes have buffering zones for partly reducing and gradually introducing lithium ions into the anode for lithiation, to prevent lithium ion accumulation at the anode electrolyte interface and consequent metallization and dendrite growth. Various anode active materials and combinations, modifications through nanoparticles and a range of coatings which implement the improved anodes are provided.

FIG. 1A is a high level schematic illustration of various anode configurations, according to some embodiments of the invention. FIG. 1A illustrates schematically, in a non-limiting manner, a surface of anode 100, which may comprise anode active material particles 110 (e.g., particles of metalloids such as silicon, germanium and/or tin, and/or possibly particles of aluminum, lead and/or zinc, and see below for more details and possibilities; anode active material particles 110 may also possibly comprise composite particles 115 disclosed below in more detail) at different sizes (e.g., in the order of magnitude of 100 nm, and/or possibly in the order of magnitude of 10 nm or 1μ)—for receiving lithiated lithium during charging and releasing lithium ions during discharging. Anodes 100 may further comprise binder(s) and additive(s) 102 as well as optionally coatings 130 (e.g., conductive polymers, lithium polymers, etc., see below). Active material particles 110 may be pre-coated by one or more coatings 120 (e.g., by conductive polymers, lithium polymers, etc.), have borate and/or phosphate salt(s) 128 bond to their surface (possibly forming e.g., $B_2O_3$, $P_2O_5$ etc., see below), bonding molecules 180 (illustrated schematically) which may interact with electrolyte 85 (and/or ionic liquid additives thereto, see below) and/or various nanoparticles 112 (e.g., $B_4C$, WC, VC, TiN see below), may be attached thereto in anode preparation processes 105 such as ball milling (see, e.g., U.S. Pat. No. 9,406,927, which is incorporated herein by reference in its entirety), slurry formation, spreading of the slurry and drying the spread slurry. For example, anode preparation processes 105 may comprise mixing additive(s) 102 such as e.g., binder(s) (e.g., polyvinylidene fluoride, PVDF, styrene butadiene rubber, SBR, or any other binder), plasticizer(s) and/or conductive filler(s) with a solvent such as water or organic solvent(s) (in which the anode materials have limited solubility) to make an anode slurry which is then dried, consolidated and is positioned in contact with a current collector (e.g., a metal, such as aluminum or copper). Details for some of these possible configurations are disclosed below.

It is explicitly noted that in certain embodiments, cathodes may be prepared according to disclosed embodiments, and the use of the term anode is not limiting the scope of the invention. Any mention of the term anode may be replaced in some embodiments with the terms electrode and/or cathode, and corresponding cell elements may be provided in certain embodiments. For example, in cells 150 configured to provide both fast charging and fast discharging, one or both electrodes 100, 87 may be prepared according to embodiments of the disclosed invention.

Certain embodiments comprise composite anode material particles 115 which may be configured as core shell particles, as disclosed below. The different configurations are illustrated schematically in different regions of the anode surface, yet embodiments may comprise any combinations of these configurations as well as any extent of anode surface with any of the disclosed configurations. Anode(s) 100 may then be integrated in cells 150 which may be part of lithium ion batteries, together with corresponding cathode(s) 87, electrolyte 85 and separator 86, as well as other battery components (e.g., current collectors, electrolyte additives—see below, battery pouch, contacts, and so forth).

Anode material particles 110, 110A, 115, anodes 100 and cells 150 may be configured according to the disclosed principles to enable high charging and/or discharging rates (C-rate), ranging from 3-10 C-rate, 10-100 C-rate or even above 100C, e.g., 5C, 10C, 15C, 30C or more. It is noted that the term C-rate is a measure of charging and/or discharging of cell/battery capacity, e.g., with 1C denoting charging and/or discharging the cell in an hour, and XC (e.g., 5C, 10C, 50C etc.) denoting charging and/or discharging the cell in 1/X of an hour—with respect to a given capacity of the cell.

Figure 1B:
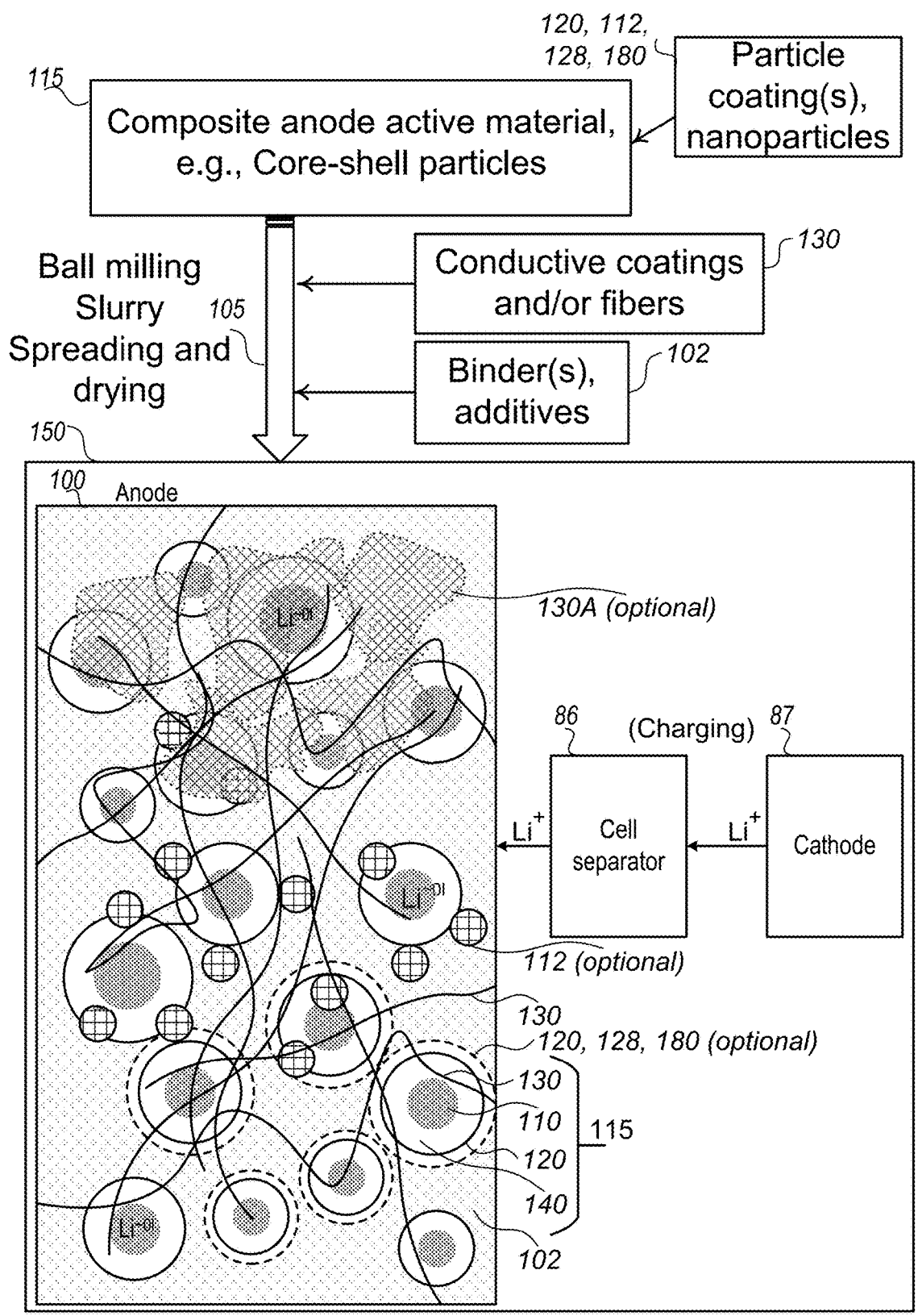
FIG. 1B is a high level schematic illustration of various anode components in a preparation process, and various anode configurations in the lithium ion cell, according to some embodiments of the invention.

FIG. 1B is a high level schematic illustration of various anode components in a preparation process 105, and various anode configurations in lithium ion cell 150, according to some embodiments of the invention. FIG. 1B illustrates schematically, in a non-limiting manner, a surface of anode 100, which may comprise anode active material particles 110 (e.g., shell-core particles 115 with cores 110 being particles of metalloids such as silicon, germanium and/or tin, and/or of aluminum, or cores made of other materials, listed below) at different sizes (e.g., in the order of magnitude of 100 nm, and/or possible in the order of magnitude of 10 nm or 1 μm), binder(s) 102 (for binding particles 110 and/or 115 in the anode material to each other and to the current collector, not shown) and additive(s) 102 as well as optionally coating(s) 130A and/or conductive fiber(s) 130 (e.g., conductive polymers, lithium polymers, carbon fibers etc. and see details below). Active material particles 110 may be pre-coated 120 (in one or more layers 120, e.g., by conductive polymers, lithium polymers, etc., $B_2O_3$, $P_2O_5$, etc., see details below) and/or various nanoparticles (e.g., $B_4C$, WC etc., see details below) 112, may be attached thereto in preparation processes 105 such as ball milling (see, e.g., U.S. Pat. No. 9,406,927, which is incorporated herein by reference in its entirety), slurry formation, spreading of the slurry and drying the spread slurry. Details for some of these possible configurations are disclosed in the patent documents which were listed herein. The different configurations are illustrated schematically in different regions of the anode surface, yet embodiments may comprise any combinations of these configurations as well as any extent of anode surface with any of the disclosed configurations.

In the illustrated configurations, conductive fibers 130 are shown to extend throughout anode 100, interconnect cores 110 and interconnected among themselves. Electronic conductivity may be enhanced by any of the following: binder and additives 102, coatings 130A, conductive fibers 130, nanoparticles 112 and pre-coatings 120, which may be in contact with an electronic conductive material (e.g., fibers) 130. Lithium ion cell 150 comprises anode 100 (in any of its configurations disclosed herein) comprising anode material with composite anode material such as core-shell particles 115, electrolyte 85 and at least cathode 87 delivering lithium ions during charging through cell separator 86 to anode 100. Lithium ions ($Li^+$) are lithiated (to $Li^{-01}$, indicating substantially non-charged lithium, in lithiation state) when penetrating the anode material, e.g., into anode active material cores 110 of core-shell particles 115. Any of the configurations of composite anode material and core-shell particles 115 presented below may be used in anode 100, as particles 115 are illustrated in a generic, non-limiting way. In core-shell particle configurations 115, the shell may at least partly be provided by coating(s) 120, and may be configured to provide a gap 140 for anode active material 110 to expand 101 upon lithiation. In some embodiments, gap 140 may be implemented by an elastic or plastic filling material and/or by the flexibility of coating(s) 120 which may extend as anode active material cores 110 expand (101) and thereby effectively provide room for expansion 101, indicated in FIG. 1B schematically, in a non-limiting manner as gap 140. Examples for both types of gaps 140 are provided below, and may be combined, e.g., by providing small gap 140 and enabling further place for expansion by the coating flexibility.

Examples for electrolyte 85 may comprise liquid electrolytes such as ethylene carbonate, diethyl carbonate, propylene carbonate, fluoroethylene carbonate (FEC), EMC (ethyl methyl carbonate), DMC (dimethyl carbonate), VC (vinylene carbonate) and combinations thereof and/or solid electrolytes such as polymeric electrolytes such as polyethylene oxide, fluorine-containing polymers and copolymers (e.g., polytetrafluoroethylene), and combinations thereof. Electrolyte 85 may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$, tris(trimethylsilyl)phosphite (TMSP) and combinations thereof. Ionic liquid(s) may be added to electrolyte 85 as disclosed below.

In certain embodiments, cathode(s) 87 may comprise materials based on layered, spinel and/or olivine frameworks, and comprise various compositions, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) LFP formulations (based on $LiFePO_4$), lithium rich cathodes, and/or combinations thereof. Separator(s) 86 may comprise various materials, such as polyethylene (PE), polypropylene (PP) or other appropriate materials. Possible compositions of anode(s) 100 are disclosed below in detail.

Buffering Zone

FIG. 2A is a high-level schematic illustration of a metallization process in lithium ion batteries according to the prior art. Typical lithium ion batteries use graphite anode material 95 which receives lithium ions 91 (from an electrolyte 85) in an intercalation process between graphite layers. The maximal capacity of the graphite is limited to approximately one lithium ion for every ca. six carbon atoms and is influenced by the solid-electrolyte interface (SEI) formed between anode material 95 and electrolyte 85, typically on the intercalation basal planes (e.g., layers in the graphite material between which the lithium ions intercalate). Such lithium ion batteries typically have low charging and discharging rates due to limiting charge transfer rates and limiting lithium ions diffusion rate into the graphite anode. As shown schematically in illustration 90A in FIG. 2A, under low charging rates, the intercalation rate is higher than the lithium ion accumulation rate, resulting in proper intercalation 96 of lithium ions Li$^+$ into graphite anode material 95 as Li$^{\sim01}$, denoting approximately neutral lithium atoms which receive electrons e$^-$ from the graphite and are intercalated in anode material 95. The intercalation rate is limited by the Li$^+$ supply rate. As the charging rate increases (schematic illustrations 90B, 90C, 90D represent increasing charging rate with respect to illustration 90A), the rate of incoming lithium ions increases, and lithium ions accumulate on the surface (of anode material 95 or particles thereof, at the solid-electrolyte interface) as illustrated in 90B, with an accumulation rate that exceeds the intercalation rate of the lithium ions. As a result, reduction 97 of the lithium ions is carried out on the interface in addition to the intercalated lithium ions, as illustrated in 90C, which shows schematically the increasing flow of electrons to the interface without lithium ion intercalation in anode material 95. Finally, as lithium ion accumulation and reduction at the interface increase (as illustrated in 90D), lithium metallization at the interface and dendrite growth 99 commence and damage the cell. Additional considerations include volume changes of the graphite electrode material, influences of anode additives, characteristics of the SEI and details of the charging and discharging cycles.

Embodiments of the present invention provide electrode and cell configurations which enable fast charging rates with enhanced safety due to much reduced probability of metallization of lithium on the anode, preventing dendrite growth and related risks of fire or explosion. Anode material particles have buffering zones for partly reducing and gradually introducing lithium ions into the anode for lithiation, to prevent lithium ion accumulation at the anode electrolyte interface and consequent metallization and dendrite growth. The electrolyte in the cell may be chosen to further reduce the accumulation rate of lithium ions at the interface, and the cell may be designed to have lithiation in the anode material as the rate limiting factor, thereby avoiding lithium ion accumulation at the anode material particles' surface.

FIG. 2B is a high level schematic illustration of several process which affect composite anode material particles 115 during battery operation, according to some embodiments of the invention. In many of the disclosed embodiments, the inventors allow for expansion and contraction 101 of anode material particles 110 during charging and discharging of the battery (respectively), in order to be able to utilize materials having high capacity for absorbing lithium (such as Si, Ge, Sn, Al, Pb, Zn, their alloys and mixtures, as well as other materials) for energy storage. It is noted that many of the disclosed embodiments are likewise applicable to graphite anode material and/or modified graphite anode material, with respect to the lithiation process being lithium ion intercalation in the graphite.

Moreover, in many of the disclosed embodiments, the inventors succeed in maintaining required electronic (e$^-$) and ionic (Li$^+$) conductivity, schematically denoted 106 and 103, respectively, which enable fast charging and/or fast discharging the battery, while maintaining the mechanical stability of anode material particles 110 and composite anode particles 115, e.g., through the use of a range of coatings 120 and added nanoparticles, as disclosed herein. The notation Li$^{\delta+}$ indicates partially reduced lithium ions, as an intermediate stage between lithium ions Li$^+$ and lithium L$^{\sim01}$ in lithiated anode material. The partial reduction of Li$^{\delta+}$ may result from adjacent negative charges which partially reduce the positive charge of Li$^+$. Various anode material configurations which enable partial reduction of the lithium ions and resulting advantages are described below in detail. Examples for mechanical stability of anode material particles 110 include reduction or lack of cracking of particles 110, e.g., after a certain number (e.g., 50, 100, 500 etc.) of charge/discharge cycles, possibly at fast charge/discharge rate (e.g., 5C, 10C, 50C, etc.).

Figure 2E:
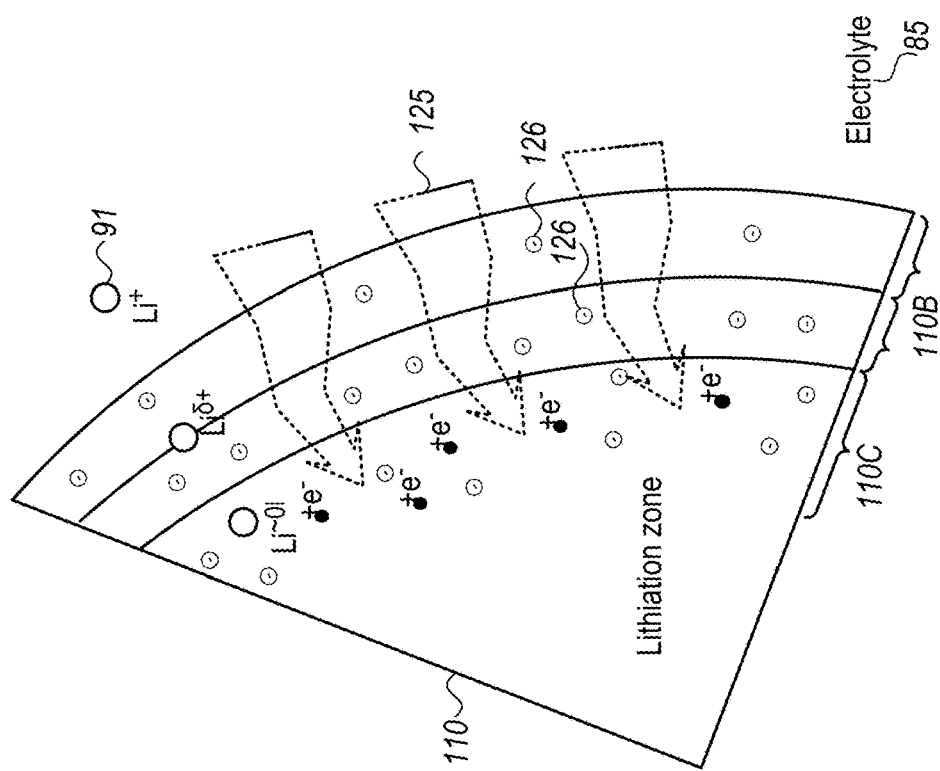
FIGS. 2E-2G schematically illustrate buffering zones configured to provide a mobility gradient of anions and/or electron donating groups, according to some embodiments of the invention.
Figure 2D:
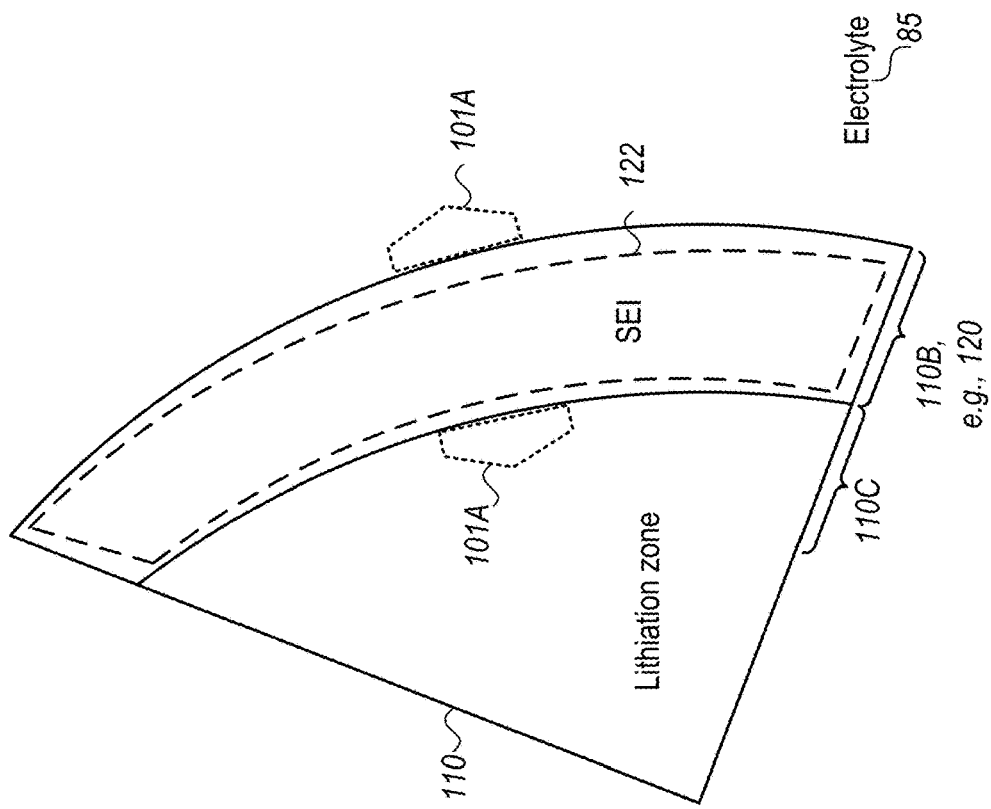

FIGS. 2C and 2D are high level schematic illustrations of configurations of anode material particles 110, according to some embodiments of the invention. The illustrated configurations may likewise be applicable to composite anode material particles 115. The illustrated configurations may be implemented in corresponding cells 150 of energy storage devices (e.g., lithium ion batteries) to provide safe cells having high charging and/or discharging rates, e.g., 5C, 10C, 15C or more.

Anode material particles 110 may be designed to handle the ion accumulation at the interface between the anode active material and electrolyte 85 at high charging rates by regulating lithium ion accumulation as well as by regulating the reduction mechanism of the lithium ion at the interface to reduce the probability of on-surface metallization and dendrite growth. Such designs may increase safety by reducing the probability of surface lithium metallization. Without intending to be bound by theory, anode material particles 110 may implement, by various active material surface modifications, a lowering of the surface energy, and a buffering in the interface for the reduction mechanism of Li$^+$ to Li$^0$. These mechanisms reduce the lithium ion accumulation at the interface and the reduction of the lithium ions at the interface which were illustrated schematically in FIG. 2A and which lead to surface metallization and dendrite growth.

FIG. 2C schematically illustrates at least one buffering zone 110B (e.g., at least a partial coating 120 or at least part of coating 120) on the surface of anode material particle 110—which separates electrolyte 85 from an internal anode material particle region 110C, according to some embodiments of the invention. Buffering zone(s) 110B may be configured to accumulate lithium atoms with partial charge (denoted by Li$^{\delta+}$), an accumulation which dramatically reduces the probability of surface lithium metallization. Buffering zone(s) 110B may be further configured to enable faster and smoother transition of the lithium ions Li$^+$ via the partly charge state Li$^{\delta+}$ to the lithiated state Li$^{\sim01}$ in the active material in zone(s) 110C. In disclosed anode configurations, buffering zone(s) 110B may be configured to absorb the fast diffusion of incoming lithium ions at high charging rates and thus prevent surface accumulation, metallization and dendrite growth of lithium. The dimensions and parameters of buffering zone(s) 110B may be configured to buffer an expected amount of lithium ions that is derived from parameters and operation conditions of the battery.

For example, materials in buffering zone(s) 110B may be selected to provide electrons (e$^-$, illustrated schematically by the black dots) at sufficient proximity to the lithium ions to reduce their +1 charge to partial charge δ+ without creating chemical bonds between material of buffering zone(s) 110B and lithium ions Li$^{\delta+}$—in order to enable their further movement into anode material 110 and being lithiated therein and prevent reduction and metallization of them in buffering zone(s) 110B. Examples for materials in buffering zone(s) 110B are ionic conductors which are medium electronic conductors, such as inorganic borates, phosphates or polyphosphates and organic polymers such as polypyrrole and polyaniline—the particle size of which and thickness of buffering zone(s) 110B may be determined according to specified performance requirements. More examples for material that may constitute buffering zone(s) 110B are presented below as various coatings 120, which may at least partly be configured to generate buffering zone(s) 110B. For example, various conductive polymers, possibly lithiated polymers and/or lithiated conductive polymers, may be used as coatings 120.

FIG. 2D schematically illustrates at least one buffering zone 110B on the surface of anode material particle 110 as support for a SEI 122, according to some embodiments of the invention. In certain embodiments, at least one of buffering zone(s) 110B may be configured to provide a flexible skeleton for the formation of SEI 122 (which is typically brittle), to improve the stability of SEI 122 during mechanical expansion and contraction 101 (SEI deformation illustrated schematically by arrows 101A, and see FIG. 2B) of anode material particle 110. The flexibility of buffering zone(s) 110B, possibly achieved by flexible materials such as inorganic structures and/or organic polymers disclosed below as coating(s) 120 may be configured to prevent damage to SEI 122 undergoing mechanical deformations 101A due to expansion and contraction 101 of anode material particle 110 in its operation. For example, at least some of the anions in buffering zone(s) 110B may be immobile or at least less mobile than the respective cations in buffering zone(s) 110B in order to provide a higher electron concentration that provides the partial charge $Li^{\delta+}$ to lithium ions entering buffering zone(s) 110B.

Figure 2G:
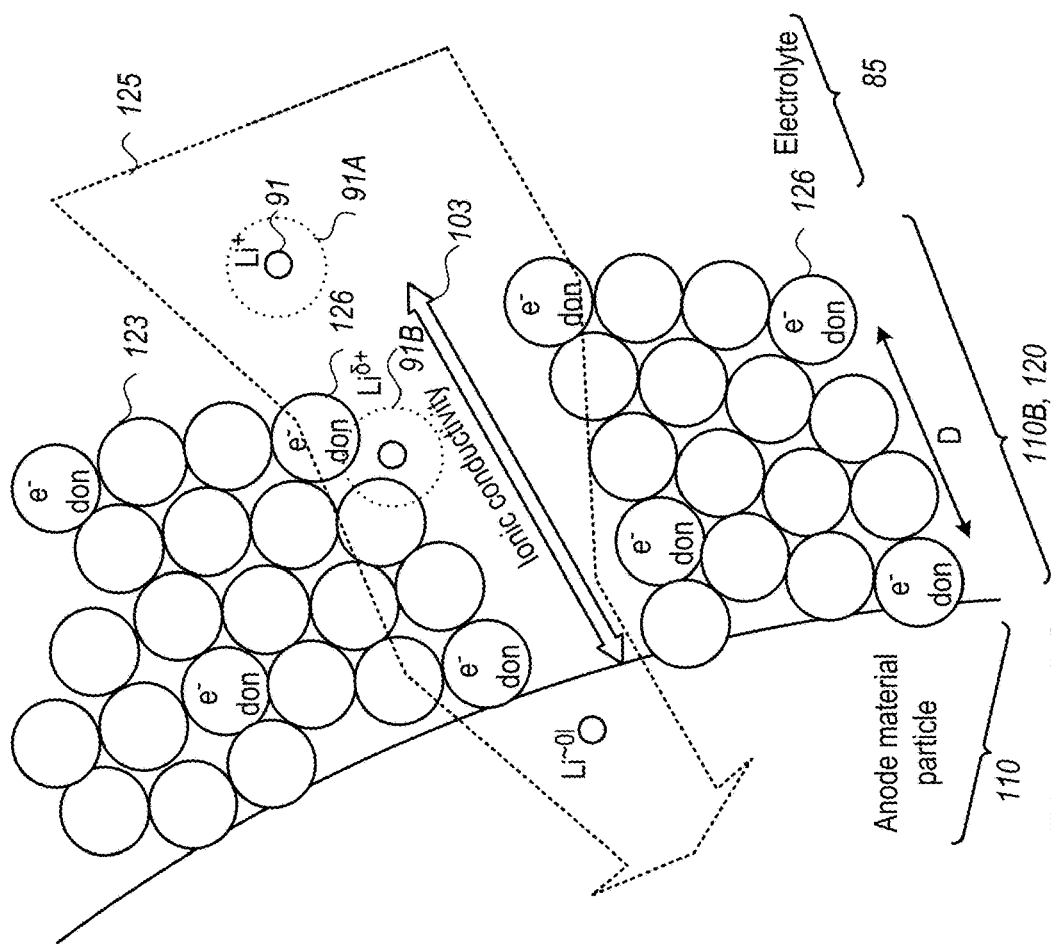
Figure 2F:
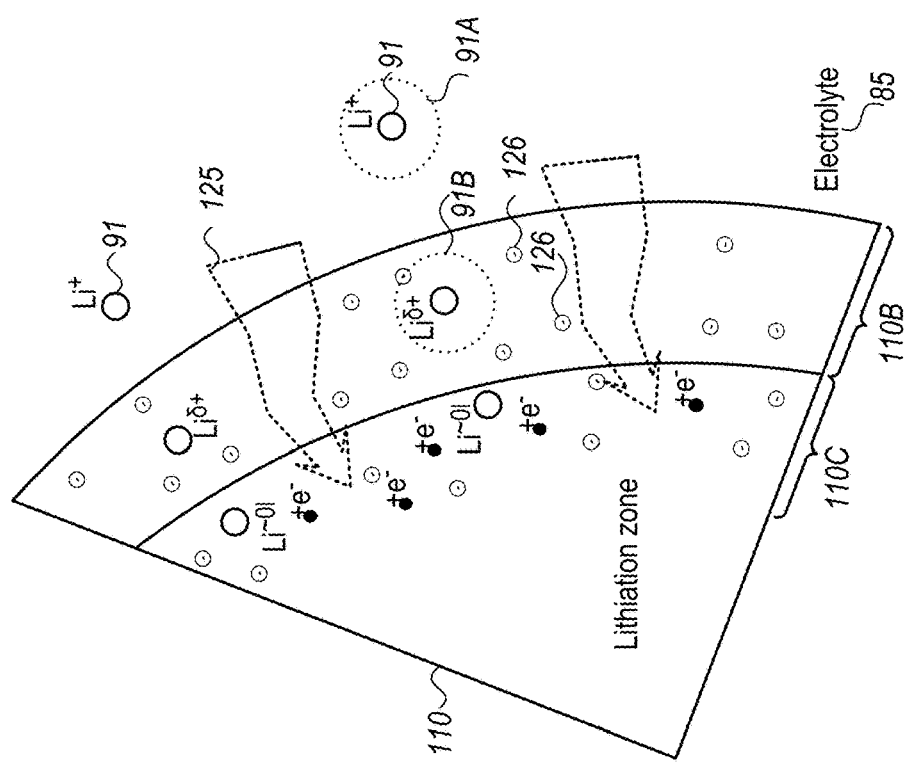

FIGS. 2E-2G schematically illustrate buffering zones 110B configured to provide a mobility gradient 125 of anions and/or electron donating groups 126, according to some embodiments of the invention. In certain embodiments, buffering zone(s) 110B may be configured to provide a mobility gradient 125 (indicated schematically by the tapered arrow) of anions and/or electron donating groups 126 (illustrated schematically as providing negative charges) which in turn provides a charge gradient that reduces lithium ions 91 entering buffering zones 110B from electrolyte 85 in a gradual manner (indicated schematically by $Li^{\delta+}$ expressing the partial screening of the positive charge of $Li^+$ in buffering zones 110B) until they reach lithiation in anode material particle 110. Gradient 125 may be configured to enable modification of the interface between anode material particle 110 and electrolyte 85 (the area where two immiscible phase surfaces are coming in contact with each other) into an interphase region having a gradual change of parameters which gradually reduces the activation energy of the reduction reaction of the lithium ions, and further prevents metallization of lithium and dendrite growth. Coating(s) 120 disclosed below may be configured to facilitate and support the interphase region and thereby regulate lithium ion flow into and out from anode material particle 110, especially during fast charging and/or discharging at rates of several C-rate, several tens of C-rate and possible even a few hundred C-rate.

Buffering zone(s) 110B may be configured to form a barrier which reduces the speed of lithium ions 91 and locally increases the resistance of buffering zone(s) 110B to lithium ions 91 to prevent or attenuate reduction of lithium ions 91 (see $r'_A$ in FIG. 9A below). Coating(s) 120 disclosed below may be configured to provide the required local resistance.

As illustrated schematically in FIG. 2F, buffering zone 110B may be configured to provide negative electric charge at predefined density to replace a solvation shell 91A of $Li^+$ 91 in electrolyte 85 by an equivalent environment 91B within solid buffering zone 110B, which may e.g., comprise coating 120 such as a polymer coating, possibly a conductive polymer coating. For example, coating 120 may comprise electron donating groups 126 (e.g., atoms such as N or O, having a lone pair of electrons, aromatic groups and/or conjugated systems as disclosed below etc.) at specified densities, which form environment 91B which partly screens the positive charge of $Li^+$ passing through buffering zone 110B (denoted schematically as $Li^{\delta+}$). In contrast to prior art SEI's, which impede the entering of lithium ions into the anode material particles by the required removal of solvation shell 91A upon entering the SEI from the electrolyte, advantageously disclosed buffering zone(s) 110B and coating(s) 120, by providing equivalent environment 91B increase ionic conductivity 103 and enable high charging rates with reduced or avoided risk for lithium metallization due the prior art SEI impediments. In certain embodiments, buffering zone(s) 110B and coating(s) 120 may be configured to provide environment 91B that provides enough negative charge to incoming lithium ions to make de-solvation (of the lithium ions from the electrolyte) not the rate limiting step in the lithiation (charging) process. Without being bound by theory, by relieving the rate limitation of the de-solvation process, buffering zone 110B may prevent prior art metallization of lithium on the anode particles' surface (see e.g., FIG. 2A, in which de-solvation may be considered the rate limiting step in the prior art).

FIG. 2G illustrates in a high level schematic fashion a possible spatial arrangement of electron donating groups 126 and non-electron donating groups 123 (e.g., groups which do not have free or conjugated electrons) in buffering zone 110B. Only a few groups and a two dimensional structure are presented for illustration purposes, clearly real buffering zone(s) 110B comprise a large number of interconnected groups in a three dimensional structure. The distance between electron donating groups 126 (indicated schematically as D) may be selected (with respect to the statistical properties of coating 120 and other polymer parameters) to increase ionic conductivity 103 and provide environment 91B to a sufficient extent that provides required fast charging and safety parameters. For example, electron donating groups 126 may be separated by 2-5 non-electron donating groups 123 (e.g., D=2-5 non-electron donating groups 123) in in the structure of buffering zone 110B. The composition and structure of buffering zone 110B may be configured to enhance ionic conductivity 103 while maintain electronic conductivity at a level which does not cause metallization of the lithium ions in buffering zone 110B and encourages lithiation of lithium in anode material 110. For example, buffering zone 110B may be configured to have ionic conductivity 103 in the order of magnitude of 0.01-10 S/cm or any subrange thereof. Gradient 125 in buffering zone 110B may be formed by configuration of coating(s) 120 which provide solid environment 91B which is equivalent to solvation shell 91B in electrolyte 85, partly mask the positive charge of the lithium ions moving therethrough (to $Li^{\delta+}$) and maintain high ionic conductivity 103 to deliver the lithium ions to lithiation in anode material 110.

Anode Material

In the following, various material combination embodiments for the active anode material are presented. It is emphasized that elements from different embodiments may be combined to form additional embodiments, and that any of the anode active material embodiments may be combined with various coating embodiments and anode embodiments disclosed herein.

Silicon Active Material

In some embodiments, anode active material particles 110 may comprise any of Si (silicon), B (boron) and W (tungsten) and/or combinations thereof as mixtures and/or alloys. In some embodiments, anode active material particles 110 may comprise Si at 4-35 weight % of the total weight of the anode material, e.g., anode active material particles 110 may comprise 4-35 weight % Si and/or 4-35% of anode active material particles 110 may comprise Si, and/or anode 100 may comprise any combination thereof. In certain embodiments, B and/or W may be included in anode active material particles 110 as dopant(s) and/or as attached particles or nanoparticles.

In some embodiments, anode active material particles 110 may comprise B at 2-20 weight % of the total weight of the anode material. In some embodiments, anode active material particles 110 may comprise W at 5-20 weight % of the total weight of the anode material. In some embodiments, anode active material particles 110 may comprise C (carbon) at 5-60 weight % of the total weight of the anode material, e.g., as any of spherical carbon particles, CNTs (carbon nanotubes) and graphene particles. In certain embodiments, anode active material particles 110 may comprise CNTs at 0.05-0.5 weight % of the total weight of the anode material. CNTs may be used as part of modified anode active material particles 110A, as part of composite anode particles 115 and/or in anode 100, as disclosed herein.

In certain embodiments, Si may be used at 2-25 weight % of the total weight of the anode material and B may be used at 5-18 weight % of the total weight of the anode material and/or W may be used at 7-13 weight % of the total weight of the anode material. Conductive materials may be added to the anode material, e.g., at 0.01-15 weight % of the total weight of the anode material.

In certain embodiments, Si may be used at 5-47 weight % of the total weight of the anode material and B may be used at 3-25 weight % of the total weight of the anode material and/or W may be used at 6-25 weight % of the total weight of the anode material. Conductive materials may be added to the anode material, e.g., at 0.01-15 weight % of the total weight of the anode material.

In certain embodiments, Si may be used at 4-35 weight % of the total weight of the anode material and B may be used at 2.5-25.6 weight % of the total weight of the anode material and/or WC may be used at 7-14 weight % of the total weight of the anode material. Possibly, conductive materials such as carbon may be added to the anode material, e.g., at 5-60 weight % of the total weight of the anode material.

The weight % disclosed herein may be with respect to the total material of any of anode active material particles 110, modified anode active material particles 110A (see below, e.g., B may be at least partly used as $B_4C$, W may be at least partly used as WC), composite anode particles 115 (e.g., the total weight including coating 120), and/or all anode material of anode 100. Components of any of the disclosed embodiments may be combined in various embodiments.

Binders 102 may be added at 0.1-15 weight % of the total weight of the anode material of anode 100.

Germanium Active Material

In some embodiments, anode active material particles 110 may comprise any of Ge (germanium), B and W and/or combinations thereof as mixtures and/or alloys. In some embodiments, anode active material particles 110 may comprise Ge at 5-80 weight % of the total weight of the anode material, e.g., anode active material particles 110 may comprise 5-80 weight % Ge and/or 5-80% of anode active material particles 110 may comprise Ge, and/or anode 100 may comprise any combination thereof. In certain embodiments, B and/or W may be included in anode active material particles 110 as dopant(s) and/or as attached particles or nanoparticles.

In some embodiments, anode active material particles 110 may comprise B at 2-20 weight % of the total weight of the anode material. In some embodiments, anode active material particles 110 may comprise W at 5-20 weight % of the total weight of the anode material. In some embodiments, anode active material particles 110 may comprise C (carbon) at 0.5-5, or possibly up to 10 weight % of the total weight of the anode material, e.g., as any of spherical carbon particles, CNTs (carbon nanotubes) and graphene particles. In certain embodiments, anode active material particles 110 may comprise CNTs at 0.05-0.5 weight % of the total weight of the anode material. CNTs may be used as part of modified anode active material particles 110A, as part of composite anode particles 115 and/or in anode 100, as disclosed herein.

In some embodiments, Si may be used to at least partly complement Ge, e.g., at weight ratios of at least 4:1 (Ge:Si). In certain embodiments, other anode active materials disclosed herein may be used to complement Ge, e.g., Sn, Al or other materials. For example, Sn may be used to replace Ge at least partly in the compositions disclosed above. In case Sn, Ge and Si are used for anode material, Si may be used at weight ratios of at least 4:1 (Sn+Ge):Si.

In certain embodiments, Ge may be used at 60-75 weight % of the total weight of the anode material and B may be used at 3-6 weight % of the total weight of the anode material and/or W may be used at 7-11 weight % of the total weight of the anode material. Conductive materials may be added to the anode material, e.g., at 0.01-5 weight % of the total weight of the anode material.

The weight % disclosed herein may be with respect to the total material of any of anode active material particles 110, modified anode active material particles 110A (see below, e.g., B may be at least partly used as $B_4C$, W may be at least partly used as WC), composite anode particles 115 (e.g., the total weight including coating 120), and/or all anode material of anode 100. Components of any of the disclosed embodiments may be combined in various embodiments.

Binders 102 may be added at 0.1-15 weight % of the total weight of the anode material of anode 100.

Tin Active Material

In some embodiments, anode active material particles 110 may comprise any of Sn (tin), Sn and Si, Sn and B, Sn and W and/or combinations thereof as mixtures and/or alloys. For example, Sn may be used at 5-80 weight % of the total weight of the anode material, e.g., anode active material particles 110 may comprise 5-80 weight % Sn and/or 5-80% of anode active material particles 110 may comprise Sn, and/or anode 100 may comprise any combination thereof. Si and/or B may be used for the rest of the anode material in any of the above combinations. In certain embodiments, B and/or W may be included in anode active material particles 110 as dopant(s) and/or as attached particles or nanoparticles.

In some embodiments, B may be used at 2-20 weight % of the total weight of the anode material. In some embodiments, W may be used at 5-20 weight % of the total weight of the anode material. In certain embodiments, carbon may be used at 0.5-5 weight % of the total weight of the anode material, e.g., in $B_4C$ and/or WC nanoparticles 112 and/or as conductive material 130.

In some embodiments, Si may be used to at least partly complement Sn, e.g., at weight ratios of at least 4:1 (Sn:Si). In certain embodiments, other anode active materials disclosed herein may be used to complement Sn, e.g., Ge, Al or other materials. For example, Ge may be used to replace Sn at least partly in the compositions disclosed above. In case Sn, Ge and Si are used for anode material, Si may be used at weight ratios of at least 4:1 (Sn+Ge):Si.

In certain embodiments, Sn may be used at 60-75 weight % of the total weight of the anode material and B may be used at 3-6 weight % of the total weight of the anode material and/or W may be used at 7-11 weight % of the total weight of the anode material. Conductive materials may be added to the anode material, e.g., at 0.01-5 weight % of the total weight of the anode material.

In certain embodiments, Sn may be used at 6.5-94 weight % of the total weight of the anode material and B may be used at 1.5-15 weight % of the total weight of the anode material and/or W may be used at 6-25 weight % of the total weight of the anode material.

The weight % disclosed herein may be with respect to the total material of any of anode active material particles 110, modified anode active material particles 110A (see below, e.g., B may be at least partly used as $B_4C$, W may be at least partly used as WC,) and/or composite anode particles 115 (e.g., the total weight including coating 120). Components of any of the disclosed embodiments may be combined in various embodiments.

Non-limiting examples for preparation procedures of tin-containing anode active material particles 110 include ball milling of a specified ratio of Sn and Si (as non-limiting examples, any of 1:1, 1:2, 4:1 or intermediate ratios) at a specified milling speed (as non-limiting examples, any of 200, 300, 400 rpm, or intermediate speeds) for between 6 and 12 hours. In certain embodiments, additional milling was performed after adding 1-20% w/w graphite. The additional milling process was performed at a same or different specified milling speed (as non-limiting examples, any of 200, 300, 400 rpm, or intermediate speeds) for between 6 and 12 hours.

Aluminum Active Material

In some embodiments, anode active material particles 110 may comprise treated aluminum particles, from which a native surface oxide may be removed and a lithium-containing surface layer may be applied.

Formation of anode 100 from anode active material particles 110 comprising aluminum particles may be carried out by consolidating treated aluminum particles 110 with one or more additives, while preventing the formation of an oxidation layer on particles 110. The additives may comprise, e.g., binders and additives 102 such as particulate conductive filler(s), plasticizer(s), and/or other binder(s); and possibly pre-coating(s) 120, nanoparticles 112 and/or coating(s) 130.

In certain embodiments, the applied lithium-containing surface layer may be applied as pre-coating 120, e.g., using lithium polymer(s) such as lithium polyphosphate, lithium poly(acrylic acid), lithium carboxyl methyl cellulose and/or lithium alginate (see below). In certain embodiments, lithium-containing surface pre-coating 120 may comprise lithium-aluminum compound(s) having the formula $Li_xAl_y$, e.g., $Li_9Al_4$.

In certain embodiments, $B_2O_3$ may be applied as either pre-coating 120 and/or nanoparticles 112 onto the treated aluminum particles, from which the native oxide has been removed, in addition or in place of the lithium-containing surface layer.

In certain embodiments, Zn, Cd and/or Pb may be added to any one of the disclosed embodiments to further increase the lithium capacity of anode active material particles 110.

Nanoparticles and Modifications

FIGS. 3A-3D are high level schematic illustrations of modified anode active material particles 110A, according to some embodiments of the invention. Anode active material particles 110 may be modified by attachment or embedment of smaller nanoparticles 112, as illustrated schematically in FIGS. 3A-3D. Embodiments comprise single modified anode active material particles 110A (FIGS. 3A, 3C) or aggregates thereof (FIGS. 3B, 3D) which may be used together or separately to prepare anode 100. Coatings 120 may be applied on modified anode active material particles 110A and/or aggregates thereof to form composite particles 115 (FIGS. 3C, 3D respectively), which may be used together or separately to prepare anode 100. The optional embedding of nanoparticles 112 in anode active material particles 110 may form an interface layer 114 having alloy-like characteristics, shown schematically in FIG. 3A.

In some embodiments, anode active material particles 110 may have a particle size at a range of 30-500 nm, and further comprise nanoparticles 112 (e.g., $B_4C$, boron carbide, and/or WC, tungsten carbide, nanoparticles) at a range of 10-50 nm on a surface of anode active material particles 110 to yield modified anode active material particles 110A. Nanoparticles 112 may be configured to reinforce anode active material particles 110, e.g., with respect to mechanical forces of expansion and contraction 101 upon lithiation and de-lithiation of lithium ions (respectively), providing increased mechanical stability during repeated fast-charging/discharging cycles. Alternatively or complementarily, nanoparticles 112 may be configured to regulate (e.g., reduce) the surface energy of modified anode active material particles 110A to improve lithium ion conductivity 103, e.g., via providing better contact with electrolyte 85; to improve the dispersion of modified anode active material particles 110A throughout the anode slurry and the spreading thereof throughout anode 100; and/or to enhance the consolidation of modified anode active material particles 110A with conductive filler 102 on the current collector.

In certain embodiments, nanoparticles 112 may comprise, additionally or in place of $B_4C$ and/or WC, VC (vanadium carbide), TiN (titanium nitride) and/or equivalent compounds. Nanoparticles 112 may have various effects such as partial reduction of lithium ions which may structurally stabilize modified anode active material particles 110A during lithiation and de-lithiation, improve the electrochemical behavior of modified anode active material particles 110A with respect to partial reduction of $Li^+$ to $Li^{\delta+}$ and prevention of metallization.

In certain embodiments, anode active material particles 110 may comprise any of Sn, Pb, Ge, Si, their alloys and mixtures thereof, having a particle size in a range of 30-500 nm and $B_4C$ nanoparticles 112 having a particle size range of 10-50 nm, embedded (114) on the surface of anode active material particles 110. The particle size of anode active material particles 110 may be in any of the ranges 30-50 nm, 50-100 nm, 30-100 nm, 50-200 nm, 100-500 nm or in sub-ranges thereof. Anode active material particles 110 may comprise an oxide layer or parts thereof. Alternatively or complementarily, the oxide layer, parts thereof, and/or the thickness of the oxide layer may be modified during preparation, e.g., by oxidation, heat, reduction and/or combinations thereof, as described herein in various embodiments. Full or partial de-oxidation may be applied in any of the embodiments of anode active material particles 110, e.g., in which Si, Ge, Sn, Al, Pb or other elements are used as the anode active material.

In certain embodiments, the particle size of nanoparticles 112 (e.g., the $B_4C$ nanoparticles) may be at least one order of magnitude smaller than the particle size of anode active material (e.g., metalloid) particles 110. In certain embodiments, the amount of nanoparticles 112 (e.g., $B_4C$ nanoparticles) may be in the range of 5 to 25 weight percent of anode active material particles 110. Interface layer 114 may comprise a transition metal oxide layer on the surface of active material particles 110, which has e.g., a thickness of 1-10 nm.

In certain embodiments, anode active material particles 110 may have an average diameter of e.g., 100 nm, 200 nm, 250 nm, 300 nm, 400 nm or 500 nm and some, most or all of anode active material particles 110 may comprise nanoparticles 112, attached thereto and/or embedded therein (depending e.g., on the energy involved in preparation processes 105). Nanoparticles 112 may at least partly cover and/or be embedded in anode active material particles 110, with respect to at least a part of the surface area of anode active material particles 110. For example, ball milling may yield a powder of anode active material particles 110 with nanoparticles 112 (illustrated schematically in FIG. 3A) and/or of aggregated anode active material particles 110 (illustrated schematically in FIG. 3B)—to form modified anode active material particles 110A.

In certain embodiments, at least some of $B_4C$ nanoparticles 112 may interact with metal oxides on the surface of anode active material particles 110 to form $Li_2B_4O_7$ (lithium tetra-borate salt) and/or related materials as interface layer 114 (see e.g., FIG. 3A) and/or as at least part of nanoparticles 112, to further reduce the surface potential of modified anode active material particles 110A and possibly leave the surface thereof partly charged (implementing e.g., buffering zone 110B in FIGS. 2C, 2E). Partly charged modified anode active material particles 110A may then partly reduce lithium ions during charging ($Li^+ \rightarrow Li^{\delta+}$) and enhance the battery safety by preventing lithium metallization on the surface of modified anode active material particles 110A, as explained herein.

In certain embodiments, any of coatings 120 disclosed herein may be applied onto modified anode active material particles 110A and/or their aggregates to form composite particles 115, for example coatings 120 may comprise amorphous carbon, graphene and/or graphite, covering at least partly (or fully) modified anode active material particles 110A. For example, coatings 120 may comprise a layer. In certain embodiments, coatings 120 may comprise lithium polymer(s) chemically bonded to the surface of modified anode active material particles 110A.

Without being bound by theory, the inventors have found out that nanoparticles 112 and processes 105 for their attachment to anode active material particles 110 may be optimized to achieve any of the following effects, improving the operation of anodes 100 in lithium ion batteries and especially in fast charging lithium ion batteries. Nanoparticles 112 and processes 105 may be selected and/or configured to increase the mechanical stability of anode active material particles 110 by providing an external and/or internal backbone to modified anode material particles 110A, especially during expansion and contraction 101 thereof upon lithiation and de-lithiation, respectively. The SEI that may be formed on the surfaces of particles 110 may be more stable and less brittle due to the presence of nanoparticles 112. Nanoparticles 112 may be selected from hard materials (such as $B_4C$, WC, VC, TiN) and may moderate expansion and contraction 101, prevent cracking, reduce the amount of agglomeration during multiple charging and discharging cycles and/or prevent oxidation as described below.

Nanoparticles 112 and processes 105 may be selected and/or configured to provide any of the following effects. During expansion and contraction 101, nanoparticles 112 may be pushed further into modified anode material particles 110A, to provide internal mechanical stabilization. Positioned mainly on the surface of modified anode material particles 110A, nanoparticles 112 may be selected to lower the surface potential of modified anode material particles 110A and reduce the rate modified anode material particles 110A merge and agglomerate. Reduction of surface potential may also provide better contact with electrolyte 85, improving ionic conductivity of the lithium ions into and out of modified anode material particles 110A. Moreover, reducing agglomeration also increases the surface area of modified anode material particles 110A which is available to lithium ions movements into and out of modified anode material particles 110A, and thereby increases the ionic conductivity and speed of charging and discharging.

In certain embodiments, nanoparticles 112 attached onto anode active material particles 110 may form at least a partial shell structure which allows expansion and contraction 101 of modified anode material particles 110A, as illustrated below concerning composite anode material particles 115.

In certain embodiments, nanoparticles 112 and processes 105 may be selected and/or configured to reduce or remove oxides of the anode active material which may be present and/or may evolve in anode 100, by forming instead compounds such as $Li_2B_4O_7$ (lithium tetra-borate salt, e.g., via a reaction such as $4Li+7MeO+2B_4C \rightarrow 2Li_2B_4O_7+C+7Me$, reaction not balanced with respect to C and O, with Me denoting active material such as Si, Ge, Sn etc. and carbon originating from additives) or equivalent compounds selected from e.g., WC, VC, TiN, which have higher affinity to oxygen than the anode active material. Preventing oxidation not only increases the available active material surface area for lithiation but also helps prevent metallization of lithium on the surface of modified active material particles 110A.

In certain embodiments, coatings 120, such as illustrated e.g., in FIGS. 3C, 3D, may further enhance electronic and/or ionic conductivity. For example, thin films (e.g., 1-50 nm, or 2-10 nm thick) of carbon (e.g., amorphous carbon, graphite, graphene, etc.) and/or transition metal oxide(s) (e.g., $Al_2O_3$, $B_2O_3$, $TiO_2$, $ZrO_2$, MnO etc.) may be added to modified anode material particles 110A and/or their aggregates to form composite active material particles 115, as disclosed in additional examples below. Any of coatings 120 disclosed below may be applied onto modified anode material particles 110A comprising nanoparticles 112.

In certain embodiments, coating(s) 120 may be configured to provide gaps 140 for expansion and contraction 101 and/or may be flexible to allow for expansion and contraction 101, as disclosed below (see e.g., FIGS. 8A, 8D).

In certain embodiments, coating(s) 120 may be configured to support and stabilize a SEI (as illustrated schematically, e.g. in FIG. 2D), preventing cracks therein and preventing particles from merging into one another, thereby maintaining a large active material surface area.

In certain embodiments, nanoparticles 112 and processes 105 may be selected and/or configured to reduce potential decomposition of electrolyte solvent by carbon coating(s) 120, through the close proximity of nanoparticles 112 and coating 120, which decreases its surface potential and the carbon's reactivity towards the electrolyte solvent.

Coating(s) 120 of transition metal oxide(s) (e.g., $Al_2O_3$, $B_2O_3$, $TiO_2$, $ZrO_2$, MnO etc.) may further enhance mechanical stability of modified active material particles 110A, and may be combined with other coating(s) 120 disclosed below to form composite active material particles 115. Transition metal oxide coating(s) 120 may be further configured to provide buffering zone 110B and prevent lithium metallization as described above, and possibly increase ionic conductivity of composite active material particles 115.

In certain embodiments, nanoparticles 112 and processes 105 may be selected and/or configured to prevent prior art disadvantages of using transition metal oxide coating(s) 120, by stabilizing the SEI and preventing crack formation. Combining nanoparticles 112 and transition metal oxide coating(s) 120 may provide an improved mechanical skeleton for composite active material particles 115 (e.g., a stable shell structure, as shown below) which provides sufficient mechanical support and maintains anode performance at high C rates, e.g., 2C, 5C, 10C or possibly tens or even a few hundred C.

In certain embodiments, nanoparticles 112 may complement and/or replace doping of anode active material particles 110 with B and/or W and may achieve similar or complementary effects with respect to reduction of the surface potential and reactivity toward the electrolyte.

FIGS. 14A-14F presented below are examples for performance of anodes 100 made of modified anode active material particles 110A, according to some embodiments of the invention.

Coatings

In the following, various material combination embodiments for coatings are presented. For example, various conductive polymers, possibly lithiated polymers and/or lithiated conductive polymers, may be used as coatings 120. It is emphasized that elements from different embodiments may be combined to form additional embodiments, and that any of the coatings embodiments may be combined with various anode active material embodiments and anode embodiments disclosed herein. Some of the disclosed coatings may be applied as coatings 120 and/or as coatings 130, depending on the exact details of the applied processes.

FIGS. 4A-4F are high level schematic illustrations of coatings 120 in composite anode particles 115, according to some embodiments of the invention. Coatings 120 are illustrated in three different forms in the figures, namely as spherical coating 120 (e.g., in FIGS. 4A, 4C, 4E), as wriggly lines indicating coating 120 (e.g., in FIGS. 4B, 4C, 4E, 4F), and as a thicker line indicating a surface layer coating 120 (e.g., in FIGS. 4D, as well as 3C, 3D). These illustrations are used to illustrate coating(s) schematically, and in certain embodiments may represent equivalent and/or complementary coatings 120. Any of coatings 120 disclosed below may be understood and partial or full coating of different thickness. Coating 120 may comprise multiple coating layers 120A, 120B, which are not limited to the illustrated two layered coatings. Any of disclosed coatings 120 may be applied to one or more coating layers, each of which may be partial or full coating with respect to the surface of anode active material particles 110.

Figure 4F:
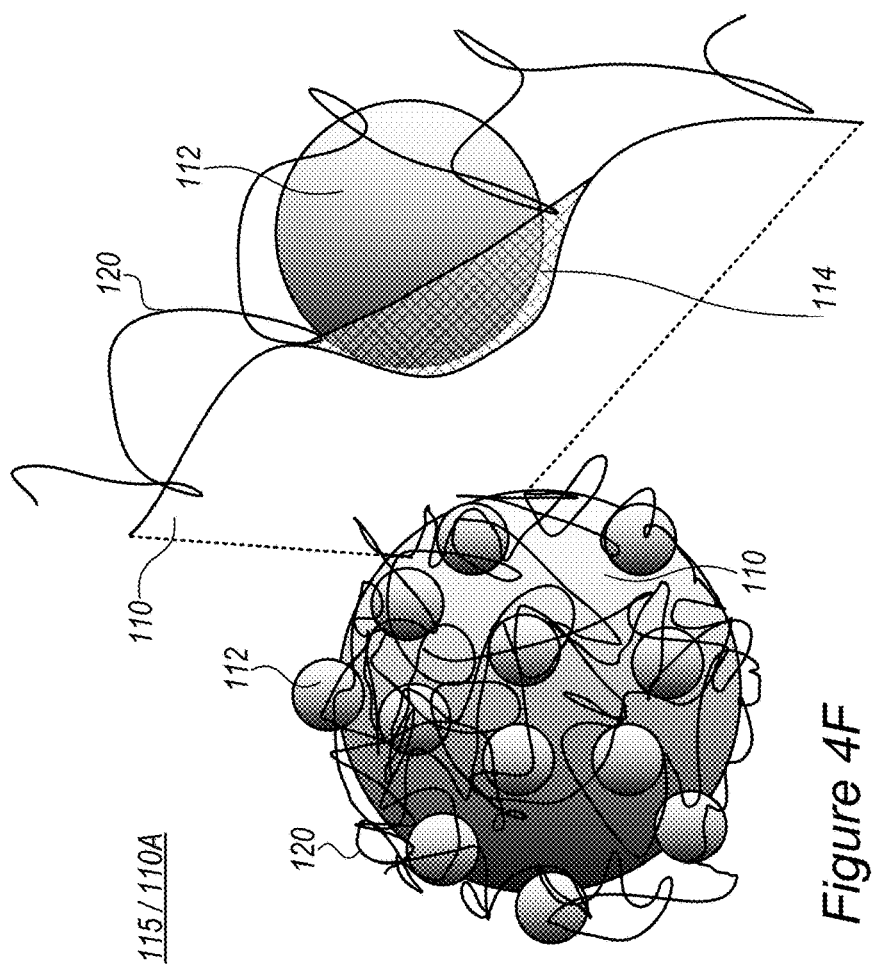
Figure 4E:
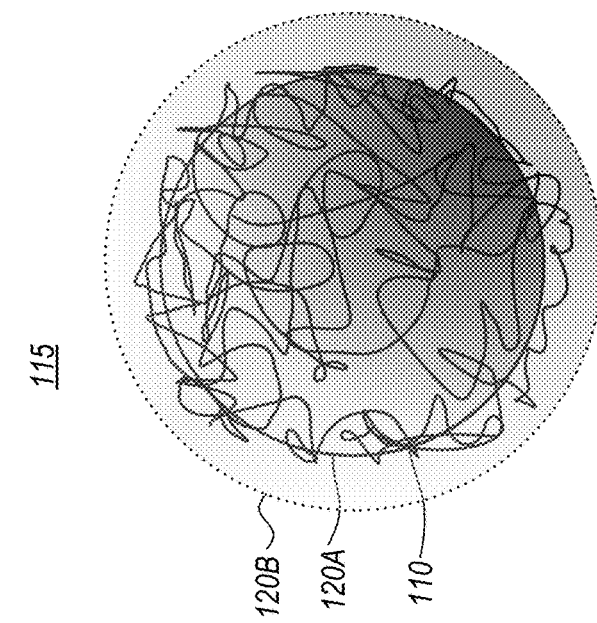

It is emphasized that any of disclosed coatings 120 may be applied to either or both anode active material particles 110 and modified anode active material particles 110A (the latter illustrated explicitly in FIG. 4F). Moreover, in case of very partial coatings 120 (sparse coatings 120) coated particles may be understood as modified anode active material particles 110A rather than as composite anode particles 115, as indicated e.g., in FIGS. 4B, 4F.

In some embodiments, coating(s) 120 may build one or more shell(s) 120 with respect to cores of anode active material particles 110 and/or modified anode active material particles 110A. In this respect, composite anode particles 115 may form core-shell particles 115, with coating 120 providing at least part of the shell structure and the anode material providing at least part of the core structure.

Conductive Coatings

FIG. 4G-4J are high level schematic illustrations of in-situ polymerization of conductive polymers, according to some embodiments of the invention.

Conductive coatings 120, as well as conductive polymer coatings and/or matrix 130 may be used to improve anode conductivity, as well as to improve structural and mechanical properties of anode 100. Disclosed coatings 120, 130, such as coatings with conductive polymers, may be applied to any of the disclosed anode active materials, such as any of Si, Sn and Ge, their mixtures (in various ratios), combinations and alloys, as well as other anode active materials disclosed herein. Non-limiting examples are Si:Sn anode active materials mixed at ratios of at 1:1, 2:1, or other ratios, as well as mixtures thereof with Ge.

FIG. 4G is a high level schematic illustration of in-situ polymerization of conductive polymers, according to some embodiments of the invention. A slurry 107 may comprise monomers 127 (or possibly at least partly oligomers), active material particles 110 and possibly additives 102 and be used (105) to form anode 100. The conductive polymers resulting from the polymerization of monomers 127 may form particle coatings 120 and/or matrix 130 in which particles 110 are embedded. In certain embodiments, linker(s) 119 may be added to bind at least some of anode material particles 110 to the conductive polymer.

FIG. 4I is a high level schematic illustration of additional benefits of using monomers 127 (or possibly oligomers) in slurry 107 according to some embodiments of the invention, with respect to an approach, illustrated in FIG. 4H, in which polymers 98A are used in slurry 98. In the latter approach (FIG. 4H) dispersion of anode material particles 110 and additives 102 is non-uniform and requires using a surfactant to achieve more even dispersion. Surprisingly, the inventors have found out that using monomers 127 (or possibly oligomers) in slurry 107 contributes to dispersion of anode material particles 110 and/or additives 102 (illustrated schematically in FIG. 4I) and results in a more uniform distribution thereof in polymerized matrix 130. The dispersion of anode material particles 110 was observed visually as transparent slurry when using monomers 127 with respect to using polymer 98A in slurry 98 which resulted in turbid slurry due to agglomeration of anode material particles 110.

FIG. 4J is a high level schematic illustration of binding anode material particles 110 by linker molecules 119, according to some embodiments of the invention. Linker molecules 119 provide at least partial chemical attachment of anode material particles 110 to matrix 130, which may be stronger and more stable than physical attachment achieved in the milling process. The resulting stabilization may contribute to higher level of uniformity of anode 100 and its better mechanical handling of expansion and contraction stresses (101) during lithiation and de-lithiation.

In certain embodiments, polymer coatings may be polymerized in situ, in anode 100, in the presence of anode active material—to create coating 120 and/or matrix 130 of the conductive polymer surrounding active material particles 110. Polymerization may be configured to yield coatings 120 and/or coatings 130 (coatings 130 may function as matrix 130 and/or as anode coatings, as explained below), and may be configured to provide multiple contributions to the structure of anode 100, such as holding together active material particles 110, 110A and/or 115, complementing or possibly replacing binder(s) 102—e.g., to improve cycle life; and/or increasing anode conductivity as conductive additive 102 and/or 130, as polyaniline in the emeraldine form has high electrical conductivity—e.g., to improve the rate capability at high currents. In certain embodiments, other conductive polymers may be used in addition or in place of polyaniline.

Certain embodiments comprise a method of forming anode material for Li-ion batteries comprising adding an acidic solution to anode active material particles 110; adding aniline; stirring the acidic solution (e.g., for at least one hour); and adding a basic solution (e.g., NaOH, KOH, LiOH or any other base) to the stirred acidic solution until a specified basic pH (in embodiments, a pH of about 9) is achieved—to form polyaniline as coating 120 and/or as matrix 130. The method may further comprise separating polyaniline matrix 130 (including anode active material particles 110) from the solution and drying it to form anode 100.

In certain embodiments, aniline derivatives may be used, for example, some or all of the added aniline monomers may be substituted by one or more sulfonic functional groups. The sulfonic functional groups may be selected to improve the adhesion between the polyaniline and the active material by chemically binding the active material. In some embodiments the aniline may be replaced, partly or completely, by monomers of other conducting polymers.

In some embodiments, the acidic solution may be a strong acid such as HCl, $HNO_3$, $H_3PO_4$ and other phosphate or polyphosphate acids and/or equivalent acids. Phosphate and polyphosphate acids, being slightly bulky, may increase capacity and electric conductivity. In certain embodiments, phosphate and/or polyphosphate acids may be used as polymer dopants.

In certain embodiments, $NH_4S_2O_8$ (or possibly equivalent salts or peroxides) may be added to the acidic solution with the aniline monomers, to promote polymerization.

In certain embodiments, polymerization may be performed, alternatively or complementarily, by oxidative polymerization, polycondensation, electrochemical polymerization or any other polymerization.

In certain embodiments, linkers 119 may be used to bind the polyaniline to anode active material particles 110, as illustrated schematically in FIG. 4G. FIG. 4G schematically illustrates a linker 119 binding a polymer as coating 120 and/or 130 to anode active material particle(s) 110, according to some embodiments of the invention. In some embodiments, linker molecules 119 may be added after the polymerization is completed, e.g., after conductive polymer (e.g., polyaniline) matrix 130 is separated and dried. Linkers 119 may have carboxylic groups which chemically bind to the oxides of active material particles 110 and to conductive polymer matrix 130, e.g., to the lone electron pair on a nitrogen of the aniline monomers in polyaniline. Linker molecules 119 may also have sulfonate groups, or other groups, which may also bind to the active material oxides. Due to the chemical binding, linkers 119 may increase conductivity and stability and provide flexibility to the electrode matrix, e.g., stability when the expansion of the active material occurs during cycling. Linker molecules 119 may comprise 5-sulfoisophthalic acid or its derivatives, succinic acid or other dicarboxylic acids. In some embodiments, dried slurry 107 may be mixed with linker molecules 119 in the presence of a solvent (e.g., water).

Anodes 100 may be formed of various active materials, e.g., Si, Si:Sn at various ratios, e.g., 1:1 and 2:1 ratios, possibly mixed with Ge, and for various ratios of aniline to active material. Certain embodiments comprise addition of $MoS_2$, e.g., as additives 102, to increase the capacity of anode 100 (possibly due to an increase in ionic conductivity). Certain embodiments comprise addition of carbon nanotubes (CNTs), e.g., as additives 102, to improve the electronic and ionic conductivity. Certain embodiments comprise pre-lithiation by replacing NaOH in the procedure with LiOH in order to add Li ions to anode 100. Certain embodiments comprise adding 5-sulfoisophthalic acid and/or adding sulfonic functional group(s) on the aniline to improve the adhesion between the polyaniline and the active material.

Advantageously, methods and anodes are provided in which matrix 130 of a conductive polymer surrounding the active material is created—independently as coating 130 and/or in relation to anode material coatings 120. The polymerization process may be performed in-situ, in the presence of the active material. Advantageously, matrix 130 may be configured to both hold together active material particles 110, 110A and/or 115, which may cooperate with and/or replace binder 102, and also act as a conductive additive to the electrode, such as anode 100. The binding quality of the polymer helps hold the electrode together while cycling thus improving cycle life. The conductivity improves the rate capability even at high currents. Polyaniline may be in emeraldine form which contributes to the high electrical conductivity.

Figure 16B:
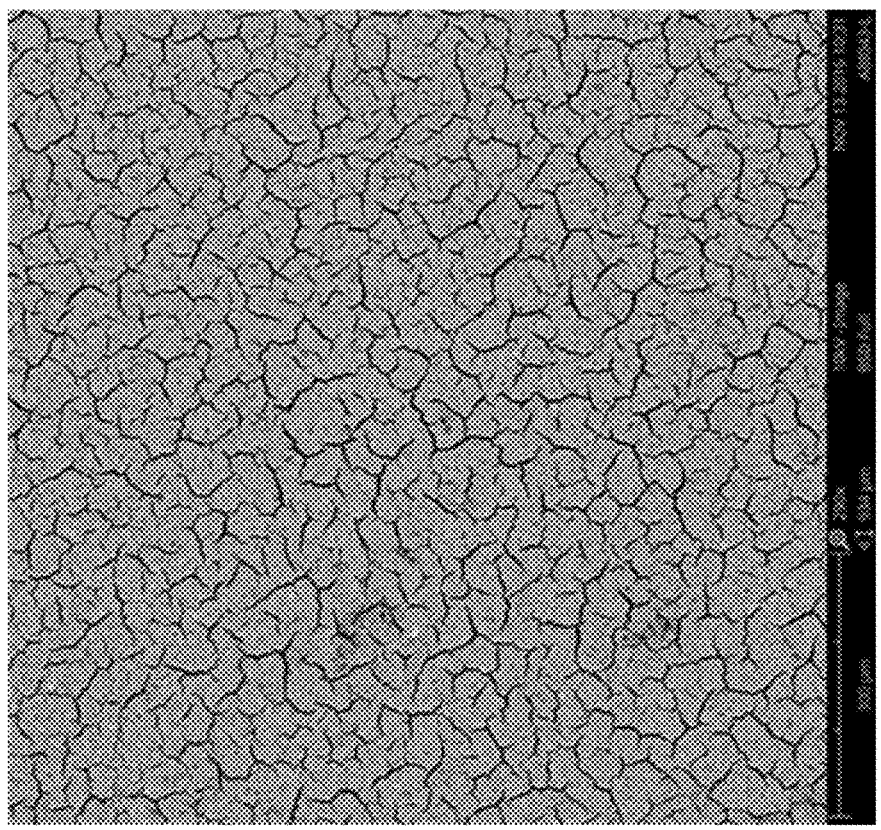
FIG. 16A is an example for the surface of an anode produced with in situ polyaniline polymerization disclosed herein, compared to FIG. 16B showing an example of a cracked anode surface prepared under similar conditions without polyaniline.
Figure 16A:
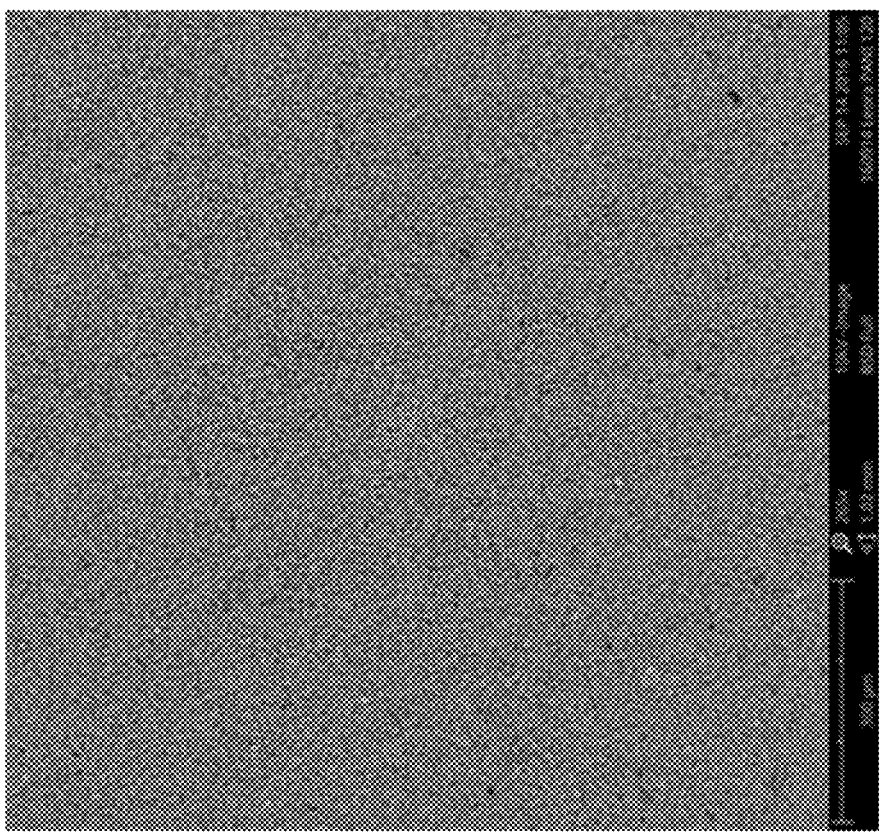

Advantageously, provided matrices 130 were found to overcome cracking and adhesion problems in prior art examples, with polyaniline reducing the amount of cracking drastically—as illustrated in FIG. 16A with respect to prior art FIG. 16B (see images below).

Lithium Polymers and Prelithiation

In certain embodiments, coating 120 may comprise lithium-containing polymer(s) bonded to the surface of anode active material particles 110 (and/or modified anode active material particles 110A). In certain embodiments, anode active material particles 110 may be pre-lithiated by introducing lithium ions into anode active material particles 110 and coating them by hydrophobic polymer layer 120 which conducts electrons and ions, and enables applying anode preparation processes 105 in spite of the high reactivity of the lithium ions. Anode 100 may then be prepared from a slurry comprising the coated anode material particles 110, coating 120 preventing the lithium ions from chemically reacting with water molecules in the slurry. Any of the disclosed anode active material particles 110 may be coated as disclosed below, e.g., Si, SnSi, Ge and Ge with $B_4C$ anode materials disclosed herein.

Figure 5C:
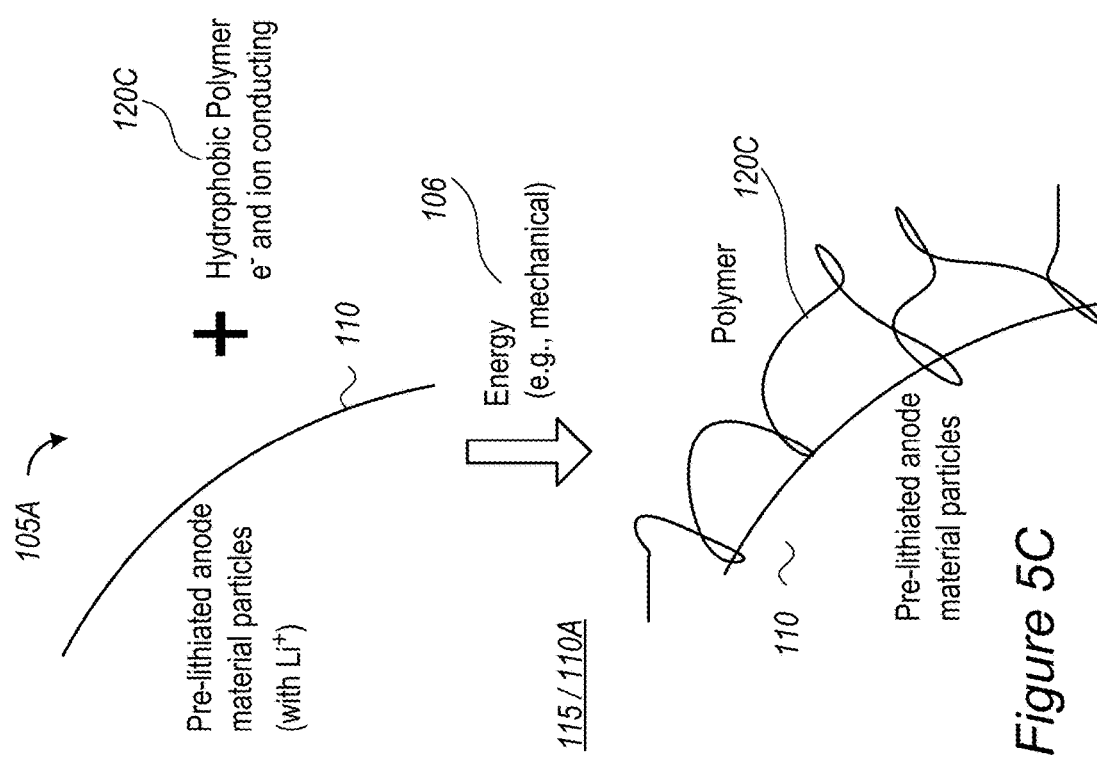
FIG. 5C is a high level schematic illustration of a hydrophobic polymer coating applied to pre-lithiated anode active material particles, according to some embodiments of the invention.
Figure 5A:
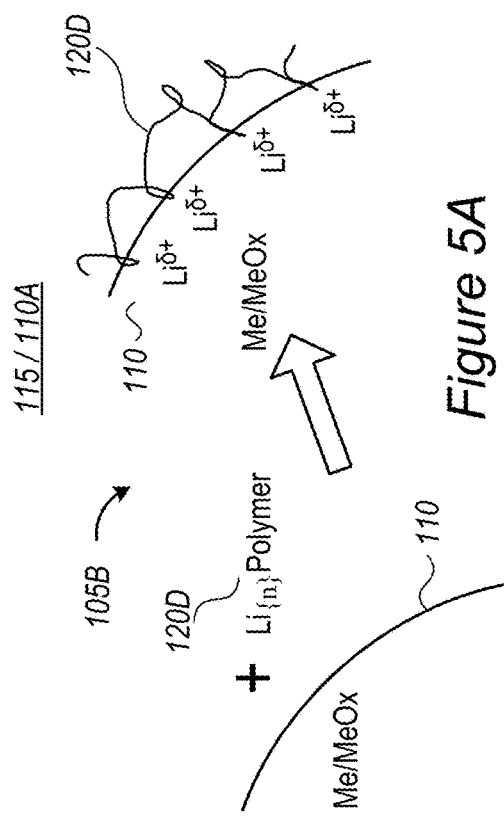
FIGS. 5A and 5B are high level schematic illustrations of lithium polymer coatings applied to anode active material particles, according to some embodiments of the invention.
Figure 5B:
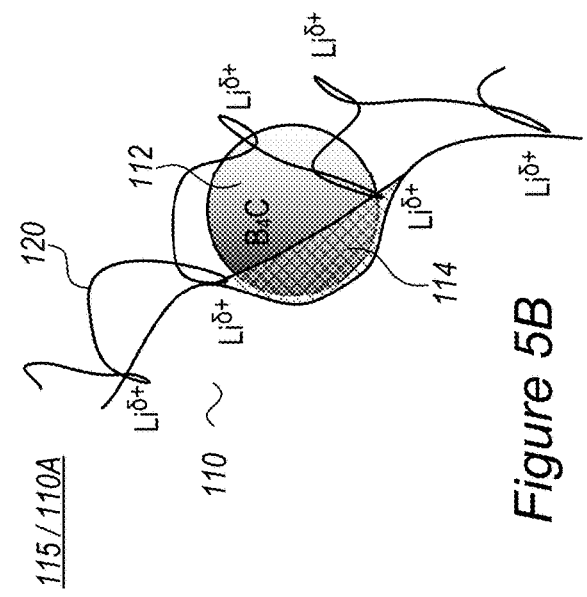

FIGS. 5A and 5B are high level schematic illustrations of lithium polymer coatings 120 applied to anode active material particles 110, according to some embodiments of the invention. FIG. 5C is a high level schematic illustration of hydrophobic polymer coating 120 applied to pre-lithiated anode active material particles 110, according to some embodiments of the invention.

Lithium Polymers

In certain embodiments, the lithium-containing polymer may comprise negatively charged group(s) bonded to the surface of anode active material particles 110 and lithium groups on the polymer having a partial positive charge. For example, as illustrated schematically in FIGS. 5A and 5B with anode active material as metalloid (such as Si, Ge, Sn, combinations and/or alloys thereof, and in certain embodiments also Pb, Al, Zn, combinations and/or alloys thereof), an interfacial reaction may chemically bind lithium polymer 120 to the surface of anode active material particles 110. The interfacial reaction may be carried out e.g., in dry conditions inside a ball miller using lithium polymer with many lithium salt sites, alternatively or complementarily, using physical vapor deposition or equivalent processes.

For example, the lithium-containing polymer may comprise any of lithium polyphosphate ($Li_{(n)}PP$ or LiPP), lithium poly-acrylic acid ($Li_{(n)}PAA$ or LiPAA), lithium carboxyl methyl cellulose ($Li_{(n)}CMC$ or LiCMC), lithium alginate ($Li_{(n)}Alg$ or LiAlg) and combinations thereof, with (n) denoting multiple attached Li.

In some embodiments, a positively charged lithium ($Li^+$) of the lithium polymer salt may be used to bind the polymer to the active material, reacting on the alloy material surface to bind the negatively charged anion of the polymer, leaving a partly charged entity (denoted $Li^{\delta+}$ to express partial screening of the positive charge of $Li^+$ by anions and/or electron donating groups; and see also FIG. 2C as embodiment of buffering zone 110B; and FIGS. 2E-2G disclosing gradient 125 with polymer anions and/or electron donating groups which provide negative charge 126) chemically bound to the surface, coating anode active material particles 110. As illustrated schematically in FIG. 2C, an ionic nature of the SEI/polymer interface may decrease the surface energy by leaving the interfacial lithium ions with positive or partly positive charge to form gradient 125 (e.g., an intermediate stage between ionic and covalent bond and/or an intermediate stabilized species in between fully charged ($Li^+$) and neutral ($Li^0$) states of lithium). Gradient 125 may reduce or prevent lithium metallization and dendrites formation, especially during fast charge where the anode surface is likely to face under-potential (see e.g., FIGS. 13A-C and the related explanations).

In certain embodiments, lithium polymer coating 120 may have a direct chemical and/or partial chemical bonding to the active material. In certain embodiments, Li-polymer coating 120 bonded to the surface of anode active material particles 110 may be configured to serve as a backbone for the SEI growth which provides flexibility and stability to the fragile SEI 122, as illustrated schematically in FIG. 2D. Moreover, coating 120 (and its preparation process 105) may be configured to leave some of the lithium ions sites on the polymer without binding to the surface, to enable fast ionic transport between electrolyte 85 and anode active material particles 110. Polymeric coating 120 may further be able to support an increased material load and thickening of anode 100 (e.g., due to SEI formation of SEI 122), possibly even up to 3 $mg/cm^2$ or above, without losing performance.

In some embodiments, a physical evidence for the effectiveness of lithium polymeric coating 120 for surface protection of anode active material particles 110 was seen while monitoring the viscosity stability of the active material in the electrode slurry (e.g., water-based slurry for example) during anode preparation process 105. For example, without polymeric coating the slurry's viscosity was stable for approximately 1 hour. However, after coating anode active material particles 110 with Li-polymer coating 120, the slurry did not change its viscosity even a week after the preparation.

In certain embodiments, illustrated schematically e.g., in FIGS. 4C and 4D, lithium-containing polymer(s) coating 120A may be further coated with a layer 120B of carbon and/or transition metal oxide, e.g., a thin layer thereof. Alternatively or complementarily, in certain embodiments, layer(s) 120A of carbon and/or transition metal oxide may be further coated by lithium-containing polymer(s) coating 120A. In some embodiments, coating 120 may comprise lithium-containing polymers with additional coating elements, e.g., any of carbon, transition metal oxide and/or borate or phosphate salts, as disclosed below.

Direct Pre-Lithiation

Pre-lithiated anodes 100 and methods of pre-lithiating anodes 100 are provided, in which anode active material particles 110 are coated by hydrophobic polymer layer 120 which is electron and ion conductive. Hydrophobic polymer layer 120 is configured to prevent the lithium ions from chemically reacting with water molecules in the slurry and/or humidity, to provide pre-lithiated anodes 100 which improve the operation of lithium ion cells 150 by preventing accumulation of lithium ions (from cathode 87) in anode 100. Anode active material particles 110 may further comprise alloyed boron carbide nanoparticles 112 or lithium tetraborate, and may possibly be coated by a graphene-like layer 120B to reduce reactivity toward electrolyte 85. Coating 120 of anode material particles 110 by hydrophobic polymer coating 120 may be carried out mechanically, e.g., by dry ball milling.

Certain embodiments comprise coating lithium-doped anode active material particles 110 comprising e.g., any of Si, Ge, Sn, Al, Pb, Zn, Cd, and mixtures and alloys thereof, with coating 120 comprising hydrophobic polymer layer(s) bonded thereto.

In certain embodiments, hydrophobic polymer layer(s) coating 120A may be further coated with a layer 120B of carbon and/or transition metal oxide, e.g., a thin layer thereof (e.g., a 1-10 nm carbon layer). The hydrophobic polymer(s) may be bonded to the lithium ions in anode active material particles 110 and at least partly protect them from contacting water in the anode slurry and/or water vapor in the air. In certain embodiments the hydrophobic polymer(s) contains conjugated aromatic groups and is electron-conducting and/or ion-conducting.

FIG. 5C is a high level schematic illustration of hydrophobic polymer coating 120C applied to pre-lithiated anode active material particles 110, according to some embodiments of the invention.

Pre-lithiated anode material particles 110 which contain lithium ions $Li^+$, e.g., as $Si_xLi_y$, $Al_zLi_n$, etc., may be coated by hydrophobic polymer layer 120C configured to prevent the lithium ions from chemically reacting with water molecules surrounding anode material particles 110 and/or with humidity, and to conduct electrons ($e^-$) and ions, e.g., $Li^+$. It is noted that coated anode material particles 115 (or 110A) may also be used in dry environment, low humidity environment and/or in non-aqueous slurry. It is also noted that the degree of pre-lithiation of anode material particles 110 may vary, e.g., be full or partial pre-lithiation.

Attaching hydrophobic polymer 120C onto anode material particles 110 may be carried out by providing an appropriate amount of energy which forms multiple bonds therebetween, e.g., multiple relatively weak bonds which together maintain polymer 120 attached to anode material particles 110. For example the bonds may be oxide bonds between polymer molecules and the anode material, possibly involving lithium ions (Li$^+$) of the pre-lithiated anode material and/or lithium ions (Li$^+$) attached to the polymer. Hydrophobic polymer layer 120C may comprise lithium ions which are bonded to hydrophobic polymer 120. For example, for a case in which the monomers are bonded to lithium ions, the anode material may favor the lithium ions in the polymer salt, which lithiate the surface leaving the lithium ions partly charged on the anode material particles' surface, and hence chemically bond the anionic part of the polymer directly to the metalloid surface of anode material particles 110.

Attaching of polymer 120 onto anode material 110 may be carried out by solid phase interfacial reaction due to favorable Li$^+$ to metalloid/metal oxide interaction. For example, dry ball milling may be used for the attaching, configured to provide sufficient energy for creating the bonds, while being carried out at energy that maintains anode material particles 110 and the polymer's monomer intact (e.g., not reduced in size and maintaining the molecular structure, respectively). The inventors note that solid phase reactions may in certain embodiments be implemented for the attaching of polymers to provide coatings 120.

In certain embodiments, the attaching may be carried out thermally, e.g., by providing the required energy thermally.

Advantageously, as illustrated in FIG. 5C by coated anode material particles 115, the attaching provides polymer 120 as a stable backbone for the SEI (Solid-Electrolyte Interface) formation in the operating cell with disclosed anodes, enabling fast ionic transport, flexibility and SEI stability during many cycles in the operating cell (as illustrated schematically in FIGS. 2C-2G). The inventors expect that coated anode material particles 115 have a TEM (transmission electron microscopy) image indicating a uniform coating of anode material particles 110 by polymer 120.

Anode active material particles 110 may comprise metalloids such as silicon, germanium, tin, lead, zinc and cadmium. In certain embodiments, anode material particles 110 may comprise any of silicon, germanium, tin as well as oxides and/or alloys thereof. In certain embodiments, anode active material particles 110 may comprise any of various metal oxides.

Hydrophobic polymer layer 120C may be prepared from hydrophobic polymers comprising e.g., conjugated aromatic groups, such as polypyrroles, polyanilines and other hydrophobic, electron and ion conducting polymers and/or polymers comprising electron and ion conducting substituents. It is emphasized that hydrophobic polymer layer 120C may be free of lithium, particularly when anode material particles 110 are fully pre-lithiated.

Advantageously, coating anode material particles 110 by hydrophobic polymer layer 120 enables pre-lithiating anode material in spite of the high reactivity of lithium ions to water in slurries used to manufacture the anode. The hydrophobic protection enables production of anodes under less strict dryness conditions than those required when handling lithium directly, and thereby simplifies the production process of pre-lithiated anodes while providing the benefits as cell anodes which include higher performance and longer operation efficiency.

In certain embodiments, pre-lithiation may be applied to any of anode material particles 110 disclosed herein. For example, pre-lithiation may be applied to anode active material particles 110 in the range of 30-50 nm, 30-100 nm, 50-200 nm, 100-500 nm and/or 500-1000 nm (pre-lithiation may enable and/or require using particles in the larger range) and be at least partially covered (e.g., coated, doped) with B$_4$C (boron carbide) nanoparticles 112 of smaller scale (e.g., one order of magnitude smaller than the metalloid particle), for example, 10-50 nm, as described above. B$_4$C nanoparticles 112 may be at least partially embedded on the surface of anode material particles 110, as illustrated schematically in FIG. 5B. Polymer coating 120 may be applied on anode material particles 110 and cover B$_4$C nanoparticles 112 as well. B$_4$C nanoparticles 112 may be alloyed to anode material particles 110 (illustrated schematically by region 114 where B$_4$C nanoparticle 112 contacts anode material particle 110), thereby further lowering the surface energy of particles 115 and preventing metallization and/or enhancing polymer binding by keeping the lithium ions on the surface partly positive.

Certain embodiments comprise multi-layered coated anode material particles 115 having an additional graphene-like coating 120B (see e.g., FIG. 4E, made of e.g., amorphous carbon, graphite, graphene etc.) which may be applied on top of polymer 120, e.g., by mechanical grinding of graphite to form a multi-layered graphene-like coating on top of polymer 120. Graphene-like coating 120B may be applied on top of polymer layer 120 (optionally when applied to anode material particles 110A with embedded B$_4$C nanoparticles 112) to further reduce the surface potential of particles 115 and make them less reactive to electrolyte 85, thereby reducing the probability for catalytic reaction with the electrolyte and increasing the lifetime of cell 150 and energy storage devices (such as batteries) produced therefrom.

Borates and/or Phosphates

In certain embodiments, coating 120 may comprise any of boron oxide(s), phosphorus oxide(s), borate(s), phosphate(s) and combinations thereof. For example, coating 120 may have a thickness between 2-200 nm, and be applied onto anode active material particles 110 (and/or modified anode active material particles 110A) having a diameter in the range between 20-500 nm (thicker coatings 120 generally apply to larger particles 110). For example, coating 120 may comprise borate salt crystals and/or phosphate salt(s) applied onto anode active material particles 110 made of any of Si, Sn, Ge, Pb, Al, mixtures thereof, and alloys thereof.

In certain embodiments, boron and/or phosphorous containing coating 120A may comprise borate and/or phosphate salt(s) 128 disclosed below. In certain embodiments, boron and/or phosphorous containing coating 120A may be further coated with a layer 120B of carbon and/or transition metal oxide, e.g., a thin layer thereof. In certain embodiments, any of the disclosed borate/phosphate coatings may be combined with any of the disclosed polymer coatings, as illustrated schematically in FIG. 6 below.

In certain embodiments, borate and/or phosphate salt(s) 128 may comprise borate salts such as lithium bis(oxalato) borate (LiBOB, LiB(C$_2$O$_4$)$_2$), lithium bis(malonato)borate (LiBMB), lithium bis(trifluoromethanesulfonylimide) (LiTFSI). lithium difluoro(oxalato)borate (LiFOB, LiBF$_2$(C$_2$O$_4$)), lithium tetraborate (LiB$_4$O$_7$) or any other compound which may lead to formation of borate oxides (B$_2$O$_3$) (or related salts) on anode active material particles 110, including in certain embodiments B$_4$C nanoparticles 102.

In certain embodiments, borate and/or phosphate salt(s) 102A may comprise phosphate salts such as lithium phosphate (LiPO$_4$), lithium pyrophosphate (LiP$_2$O$_7$), lithium tripolyphosphate (LiP$_3$O$_{10}$) or any other compound which may lead to formation of phosphate oxides (P$_2$O$_5$) (or related salts) on anode active material particles 110.

The diameter of anode active material particles 110 may be e.g., between 20-500 nm, for example having an average particle size of 50 nm, 100 nm, 200 nm, 250 nm, 300 nm, 400 nm or more. The thickness of layer 120 of borate and/or phosphate salt(s) 102A and/or of borate oxides ($B_2O_3$, and/or related salts) and/or phosphate oxides ($P_2O_5$, and/or related salts) formed therefrom of the surface of anode active material particles 110 may be between 2-200 nm, e.g., having an average particle size of 2 nm, 5 nm, 10 nm, 20 nm, 50 nm, 100 nm, 200 nm, which may be uniform or non-uniform with respect to anode active material particles 110 in anode 100 and not necessarily corresponding to the size of anode active material particles 110 which carry layer 120. Layer 120 of borate and/or phosphate salt(s) 102A and/or of borate oxides ($B_2O_3$, and/or related salts) and/or phosphate oxides ($P_2O_5$, and/or related salts) formed therefrom of the surface of anode active material particles 110 may be continuous or discontinuous (e.g., small $B_2O_3$ and/or $P_2O_5$ crystals in the latter case) and may be coated by additional coating(s) 120B—see e.g., FIG. 4C, with coating 120A possible indicating layer 120 of borate and/or phosphate salt(s) 102A and/or of borate oxides ($B_2O_3$, and/or related salts) and/or phosphate oxides ($P_2O_5$, and/or related salts).

In certain embodiments, borate and/or phosphate salt(s) 102A and/or of borate oxides ($B_2O_3$, and/or related salts) and/or phosphate oxides ($P_2O_5$, and/or related salts) may be used to form modified anode active material particles 110A and configured to reduce or prevent aggregation of modified anode active material particles 110A, possibly utilizing similar mechanical effects as $B_4C$ nanoparticles 112 described above.

Without being bound by theory, understood as part of modified anode active material particles 110A, borate and/or phosphate salt(s) 102A and processes 105 may be selected and/or configured to provide any of the following effects. During expansion and contraction 101, formed borate oxides ($B_2O_3$, and/or related salts), LTB (lithium tetraborate) and/or phosphate oxides ($P_2O_5$, and/or related salts) may be pushed further into modified anode material particles 110A, to provide internal mechanical stabilization. Positioned mainly on the surface of modified anode material particles 110A, borate and/or phosphate salt(s) 102A may be selected to lower the surface potential of modified anode material particles 110A and reduce the rate modified anode material particles 110A merge and agglomerate. Reduction of surface potential may also provide better contact with electrolyte 85, improving ionic conductivity of the lithium ions into and out of modified anode material particles 110A. Moreover, reducing agglomeration also increases the surface area of modified anode material particles 110A which is available to lithium ions movements into and out of modified anode material particles 110A, and thereby increases the ionic conductivity and speed of charging and discharging.

In certain embodiments, borate and/or phosphate salt(s) 102A attached onto anode active material particles 110 may form at least a partial shell structure which allows expansion and contraction 101 of modified anode material particles 110A, as illustrated below concerning composite anode material particles 115.

In certain embodiments, borate and/or phosphate salt(s) 102A and processes 105 may be selected and/or configured to reduce or remove oxides of the anode active material which may be present and/or may evolve in anode 100 by forming compounds such as $Li_2B_4O_7$ (lithium tetra-borate salt, e.g., via the reaction $4Li+7MeO+2B_2O_3 \rightarrow 2Li_2B_4O_7+C+7Me$ (not balanced with respect to C and O, carbon originating from additives), with Me denoting active material such as Si, Ge, Sn, Al etc.), which have higher affinity to oxygen than the anode active material. Preventing oxidation not only increases the available active material surface area for lithiation but also helps prevent metallization of lithium on the surface of modified active material particles 110A (see above).

In certain embodiments, coatings 120, such as illustrated e.g., in FIGS. 3C and 3D, may further enhance electronic and/or ionic conductivity. For example, thin films (e.g., 1-50 nm, or 2-10 nm thick) of carbon (e.g., amorphous carbon, graphite, graphene, etc.) and/or transition metal oxide(s) (e.g., $Al_2O_3$, $B_2O_3$, $TiO_2$, $ZrO_2$, MnO etc.) may be added to modified anode material particles 110A and/or their aggregates to form composite active material particles 115, as disclosed in additional examples below. Any of coatings 120 disclosed below may be applied onto modified anode material particles 110A comprising borate and/or phosphate salt(s) 102A.

In certain embodiments, coating(s) 120 may be configured to provide gaps 140 for expansion and contraction 101 and/or be flexible to allow for expansion and contraction 101, as disclosed below (see e.g., FIGS. 8A, 8D).

In certain embodiments, coating(s) 120 may be configured to support and stabilize a SEI (as illustrated schematically, e.g. in FIG. 2D), preventing cracks therein and preventing particles from merging into one another, thereby maintaining a large active material surface area.

In certain embodiments, borate and/or phosphate salt(s) 102A and processes 105 may be selected and/or configured to reduce potential decomposition of electrolyte solvent by carbon coating(s) 120, through the close proximity of borate and/or phosphate salt(s) 102A and coating 120, which decreases its surface potential and the carbon's reactivity towards the electrolyte solvent.

Coating(s) 120 of transition metal oxide(s) (e.g., $Al_2O_3$, $B_2O_3$, $TiO_2$, $ZrO_2$, MnO etc.) may further enhance mechanical stability of modified active material particles 110A, and may be combined with other coating(s) 120 disclosed below to form composite active material particles 115. Transition metal oxide coating(s) 120 may be further configured to provide buffering zone 110B and prevent lithium metallization as described above, and possibly increase ionic conductivity of composite active material particles 115.

In certain embodiments, borate and/or phosphate salt(s) 102A and processes 105 may be selected and/or configured to prevent prior art disadvantages of using transition metal oxide coating(s) 120, by stabilizing the SEI and preventing crack formation. Combining borate and/or phosphate salt(s) 102A and transition metal oxide coating(s) 120 may provide an improved mechanical skeleton for composite active material particles 115 (e.g., a stable shell structure, as shown below) which provides sufficient mechanical support and maintains anode performance at high C rates, e.g., 2C, 5C, 10C or possibly tens or even a few hundred C.

In certain embodiments, borate and/or phosphate salt(s) 102A may complement and/or replace doping of anode active material particles 110 with B and may achieve similar or complementary effects with respect to reduction of the surface potential and reactivity toward the electrolyte.

Some embodiments may include ball milling, under protective atmosphere, anode active material particles 110 with nanoparticles 102A comprising $B_2O_3$ and/or $P_2O_5$. For example, ball milling of oxo-borate salt with active material nanoparticles (e.g. $Li_2B_4O_7$ and Ge). In some embodiments, the ball milled active material nanoparticles include tin, silicon, germanium, lead and/or their alloys). The ball milling may enforce surface reaction and coating of the anode material with $P_2O_5$ and/or $B_2O_3$ layer 120 (102A)—to yield a powder of modified anode material particles 110A and/or aggregate thereof which are coated with $B_2O_3$ and/or $P_2O_5$. Modified anode material particles 110A may be between 20-500 nm (average diameter), and may be further milled in the presence of carbon (e.g., graphite, graphene and the like) to form carbon coating 120B and/or may be further milled in the presence of transition metal oxide (e.g., $Al_2O_3$, $TiO_2$, $ZrO_2$, MnO and the like) to form an oxide coating 120B of the surface of modified anode material particles 110A coated with $B_2O_3$ and/or $P_2O_5$ as layer 120A. Anode 100 may be formed therefrom by processes 105 discussed above.

Composite Organic-Inorganic Coatings

Figure 6:
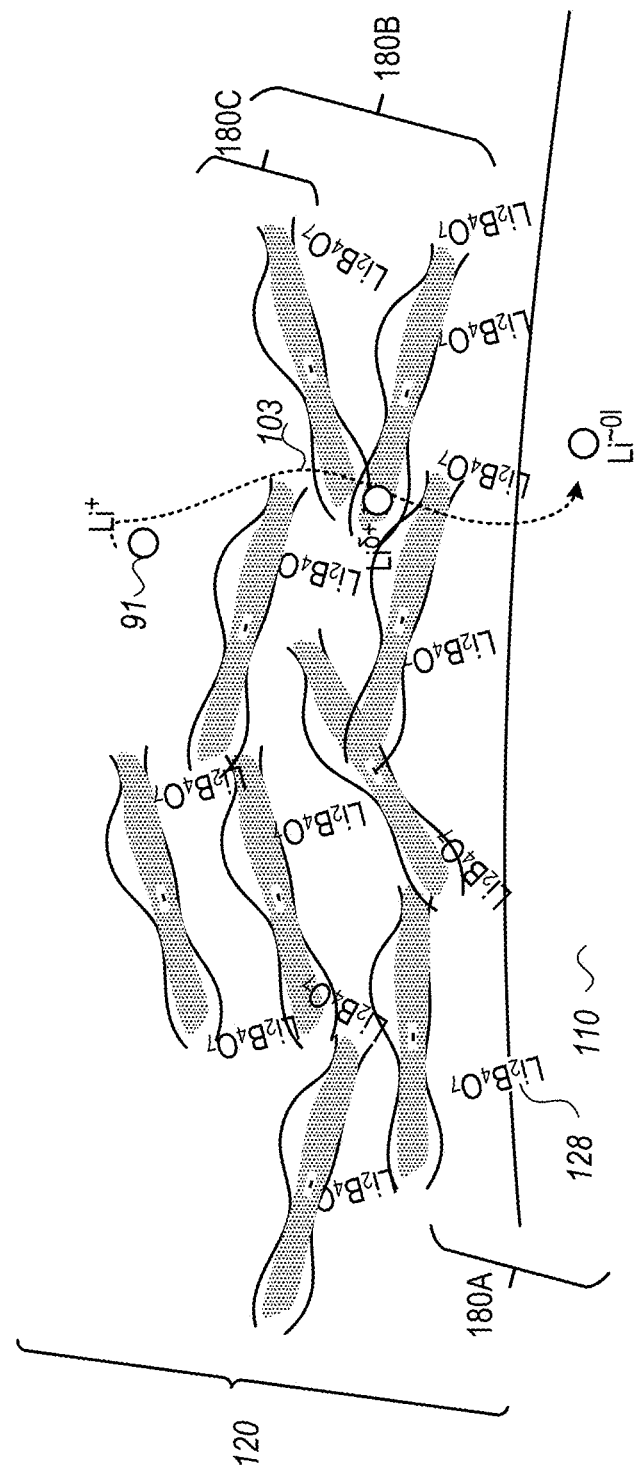
FIG. 6 is a high level schematic illustration of composite coating comprising interconnected organic and inorganic compounds, according to some embodiments of the invention.

FIG. 6 is a high level schematic illustration of composite coating 120 comprising interconnected organic and inorganic compounds, according to some embodiments of the invention. In the illustrated non-limiting example, coating 120 may comprise a combination of lithium borates (e.g., $Li_2B_4O_7$) which anchor (180A) coating layer 120 to anode active material 110, and polymer molecules (180B) having electron rich groups (e.g., conjugated bonds, acidic groups, etc.) which provide, together with lithium borates interconnecting the polymer molecules, ionic conductivity paths 103 through coating layer 120 and have an ionic conductivity which is much larger than electronic conductivity (e.g., by one or few orders of magnitude). It is noted that lithium borates and lithium phosphates 128 may in some embodiments be used similarly to $Li_2B_4O_7$, which is provided in FIG. 6 as a non-limiting example.

Either or both the lithium borate molecules (and/or borate and/or phosphate salts 128) and the polymer molecules may have electron rich groups and may be pre-lithiated. Surface molecules layer 120 may comprise multiple polymer layers interconnected by lithium borates. Surface molecules layer 120 may effectively protect anode active material 110 from reacting and decomposing the solvent of electrolyte 85. Surface molecules layer 120 may bond cations and/or anions of ionic liquid additive (see below) at its top layer 180C. In certain embodiments, coating layer 120 may comprise bonding molecules 180 (see below) comprising the lithium borates and/or the polymer molecules configured to bind electrolyte compound to provide electrolyte-buffering zone(s) during charging and discharging of cell 150, as described below in more detail. The lithium borates may be replaced by other inorganic compounds, such as lithium phosphates disclosed above such as any of lithium borates and/or phosphates 128 disclosed herein. The polymer molecules may comprise any of the polymers disclosed above, in operative configuration.

Composite Particles

FIG. 7A is a high level schematic illustration of core-shell particle 115 with composite shell 120 in composite anode material and its advantages, according to some embodiments of the invention—with respect to prior art 80 illustrated schematically in FIG. 7B. Core-shell particle 115 may be implemented as composite anode material particles 115 disclosed herein, with anode material particles 110 and/or 110A as cores and coating(s) 120 as shells.

As prior art brittle coating 83 of anode active material particles 81 cracks upon expansion of lithiated particles 81A due to the mechanical strain, active material particles 81 lose coatings 83A after the first charging cycles. In contrast, core-shell particle 115 with composite shells 120 made of brittle component 120A embedded in a flexible component 120B—maintain cracked brittle coating 120A (cracking may occur during or after at least one charging and discharging cycle) at the vicinity of lithiated cores 110 (lithiation indicated schematically by $Li^{+01}$) within flexible component 120B of shell 120. Moreover, brittle component 120A is retained at the vicinity of cores 110 during further cycles by flexible component 120B, and may at least partially adhere to cores 110.

Finally, brittle component 120A may be selected to be a good ionic conductor and thereby function as ionic conductive material 142 (illustrated in FIG. 8D below) to provide ion paths or gates among core-shell particle 115 in anode 100, while flexible component 120B may be selected to be a good electronic conductor and thereby function as electronic conductive material 144 (illustrated in FIG. 8D below), as schematically required in FIG. 2B. For example, lithium titanate oxide (LTO) may be used as ionic conductive brittle component 120A and polyaniline may be used as electronic conducting flexible component 120B, forming conducting elastic shell 120 with high electronic and ionic conductivity encapsulating anode active material particles 110 to form core-shell particles 115 as composite anode material. Flexible component 120B may be re-enforced with conductive fibers 130, at least some of which contact cores 110, as explained below.

In some embodiments, ionic conductive material 142 (FIG. 8D below) may be at least partly embodied in brittle component 120A embedded in a flexible component 120B (FIG. 7A). For example, metalloid nanoparticles (as cores 110, or possibly cores made of other materials, listed above) may be coated by a $TiO_2$ precursor to form an amorphous $TiO_2$ and/or possibly be calcined or annealed to form $TiO_2$ coating on the metalloid nanoparticles, such as cores 110. The $TiO_2$ may then then undergo lithiation with a lithium salt, followed by a second annealing (or calcination), e.g., in air or in an inert atmosphere, to form the lithium titanate oxide (LTO) coating 120A, which has fast anodic kinetics. The particles may be coated again by elastic and electronic conducting shell 120B which may comprise a layered material and/or an organic polymer. When used as an electrode material in lithium ion batteries, metalloid cores 110 expand, breaking up LTO layer 120A, fragments 120A of which becoming embedded in elastic shell 120B. As metalloid particle cores 110 expand, their surface presses up against LTO fragments 120A embedded in elastic shell 120B to form an ionic conducting bridge (as ionic conductive material 142) to encapsulated metalloid particle cores 110, while elastic shell 120B maintains the electronic connection (as electronic conductive material 144) to cores 110. Advantageously, the suggested procedure results in composite anode material with core-shell particles 115 that provide good ionic and electronic conductivity and is mechanically robust with respect to expansion and contraction 101 caused by lithiation and de-lithiation processes. It is noted that cores 110 may be metalloid and/or be made of other materials, listed above.

In a specific, non-limiting example, metalloid nanoparticles (as cores 110) were dispersed in ethanol solution. A metalorganic titanium precursor, e.g., titanium isopropoxide, was added as a precursor for $TiO_2$. The particles were coated in solution, using ammonium hydroxide as a catalyst. The product was calcined in air at 700° C. to form the $TiO_2$ coating. The particles were again dispersed in ethanol and $LiOH.2H_2O$ was added. The ethanol was evaporated and the particles were calcined again in air at 700° C. to form LTO-covered metalloid particles (having cores 110 and brittle component 120A). The particles were dispersed in a mixture of acidic water and ethanol along with aniline, and then an ammonium persulfate acidic solution was added. After polyaniline was formed a base was added until reaching pH of about 9. Particles 115 (having cores 110, brittle component 120A and the polyaniline as flexible component 120B) were then dried and used to prepare a slurry which was coated on a current collector and used as an anode (see process 105 in FIG. 1B). Alternatively or complementarily, polypyrrole-based flexible component 120B may be prepared, using pyrrole monomers instead or in addition to the aniline monomers, and adjusting the polymerization conditions. Elements from procedures for preparing conductive coatings may be incorporated in these embodiments as well.

In certain embodiments, with metalloid nanoparticles comprising Sn or any other material which may oxidize in the process disclosed above, formation of $TiO_2$ may be carried out at room temperature by dispersing the nanoparticles (e.g., Si—Sn nanoparticles) in deionized water (DI) and adding them to a mixture of boric acid and $(NH_4)_2TiF_6$, which after stirring and cleaning in DI, may be followed by lithiation and optionally annealing in argon atmosphere to avoid oxidation.

FIG. 7C is a high level schematic illustration of composite anode material particles 115 with graphite shell 120, according to some embodiments of the invention. Composite anode material particles 115 may be prepared by milling 105A of anode material particles 110 with graphite particles 120 to form graphite layer, or shell 120 over anode material particles 110. An oxide layer 111 may cover at least part of the surface of anode material particles 110, and/or oxide layer 111 may be at least partly removed, as taught in U.S. Pat. No. 9,406,927, which is incorporated herein by reference in its entirety. In a non-limiting example, Ge anode material particles 110 may be milled with 1-10% (of the overall weight) graphite particles 120, in a non-limiting example with 2-3% graphite particles 120 to yield graphite layer 120 1-5 nm thick over Ge anode material particles 110. Advantageously, graphite layer 120 may provide several benefits such as reduction of agglomeration of composite anode material particles 115 and reduction or prevention of contact between the electrolyte solvent and the anode material.

FIG. 7D is a high level schematic illustration of composite anode material particles 115 with porous graphite shell 120, according to some embodiments of the invention. Graphite particles 121A may be milled (105B) with carbohydrate particles 121B such as sugar crystals to yield graphite-sugar particles 121C (as a non-limiting example for graphite-carbohydrate particles). Non-limiting examples may comprise mixing (105B) graphite 121A and sucrose 121B at 1:1 weight ratio, or between 3:7 and 8:2 weight ratios (respectively).

Graphite-sugar particles 121C may then be milled (105A) with anode material particles 110 to form graphite-sugar layer 121C over anode material particles 110, having native oxide layer 111 over at least part of the surface of anode material particles 110. Then, a carbonization step 105C is carried out to form porous graphite shell 120 and yield de-oxidized anode material particles with composite porous carbon-graphite coating 115. It is emphasized that illustrated process 105B, 105A, 105C may be carried out in dry environment, avoiding agglomeration of composite anode material particles 115.

Carbonization step 105C may be carried out at 600-900° C. in neutral atmosphere (e.g., Ar, N, $CO_2$, and their mixtures) and be fine-tuned to carry out simultaneously at least partial reduction of native oxide layer 111 and evaporation of water and gasses from graphite-sugar layer 121C to make graphite coating (or shell) 120 porous. For example, carbonization step 105C may be configured for any of the following reactions to take place. First, carbonization of the carbohydrate component of graphite-sugar layer 121C occurs, namely $C_m(H_2O)_n \rightarrow mC+nH_2O$ (e.g., for sucrose, $C_{12}H_{22}O_{11} \rightarrow 12C+11H_2O$), releasing water vapor and leaving behind carbon and pores in graphite shell 120. Second, multiple reduction reactions remove at least part of the anode material native oxide, due to its interactions with carbon and CO released by the carbonization of the carbohydrates and interactions of the water vapor with carbon (for example, in the non-limiting case of Ge with $GeO_2$, $GeO_2 + 2C \rightarrow Ge+2CO$, $GeO_2+2CO \rightarrow Ge+2CO_2$, $GeO_2+2H_2 \rightarrow Ge+2H_2O$, with $H_2$ formed by $C+2H_2O \rightarrow CO_2+2H_2$ and so forth). Carbonization step 105C may be configured to remove at least part of native oxide layer 111, provide a predefined level of porosity in graphite shell 120 and strengthen the binding of graphite shell 120 to anode material particle 110 by the multitude of reduction and other reactions occurring in carbonization step 105C.

Advantageously, de-oxidized anode material particles with porous graphite coating 115 provide multiple advantages, both in anode operation aspects and with respect to anode preparation processes 105.

In anode 100, porous graphite shell 120 may enhance ionic conductivity, as lithium (e.g., $Li^+$ and/or $Li^{\delta+}$) may diffuse at least partly through the formed pores, while maintaining electronic conductivity through the graphite. Removal, or partial removal, of native oxide layer 111 may further improve ionic and electronic conductivity. Moreover, porous graphite shell 120 may be configured to stabilize anode material particles 110 and possibly reduce their expansion 101 due to the mechanical stability of porous graphite shell 120 and/or due to the stronger binding between anode material particles 110 and porous graphite shell 120 which is formed during carbonization step 105C. Reduction of anode material expansion increases the mechanical stability of anode 100 and its cycle lifetime. Moreover, porous graphite shell 120 may be configured to regulate the formation of SEI in an advantageous way such as on the surface of porous graphite shell 120 and away from reactive anode material particles 110, thereby possibly reducing lithium consumption in the SEI, providing some flexibility to the formed SEI, and maintaining good ionic and/or electronic conductivity of composite particles 115. In certain embodiments, additional coatings such as polymer coatings and/or lithiated coatings disclosed herein may be applied on top of porous graphite shell 120 to further enhance any of these advantages and/or provide buffering zone(s) 110B. In certain embodiments, porous graphite shell 120 may be configured to provide at least part of buffering zone(s) 110B.

With respect to anode preparation process 105, porous graphite shell 120 may be configured to prevent aggregation of composite particles 115, in the milling processes and particularly when processed in water-based slurries, due to lower surface energy thereof. Advantageously, composite particles 115 with porous graphite shell 120 also exhibit less aggregation in organic solvents, such as NMP (N-Methyl-2-pyrrolidone). Dry processes 105B, 105A, 105C provide fine powder composite particles 115, which is beneficial for anode preparation process 105.

In any of the disclosed embodiments, electronic conductive material and/or fibers 130 may extend to the surface of anode 100. Electronic conductive material 130 may comprise electronic conductive fibers and/or non-fibrous electronic conductive material.

Cores 110 may comprise any of anode active material particles 110, 110A disclosed above. Cores 110 may comprise alloy-type materials such as any of single elements Sn, Si, Ge, Pb, P, Sb, Bi, Al, Ga, Zn, Ag, Mg, As, In, Cd and Au, and/or mixtures and/or alloys of these elements. In some embodiments, cores 110 may comprise any of the above materials, mixed with a carbon matrix.

Various pre-coatings 120 and coatings 130 may be applied to core-shell particles 115 and/or anode 100, e.g., at least partially filling gaps 140, coating shells 120 and/or coating regions of anode 100. Example for various pre-coatings 120 and coatings 130 are disclosed above and may be implemented in this context. Carbon-based material may be configured to form coatings 120 around cores 110 and/or cores 110 may be embedded in carbon matrix forming a composite structure. For example, carbon coatings may be applied in a thickness range of 5 nm to 5 μm, in a concentration range of 5% to 95% of anode 100, and possibly be made of soft carbon, hard carbon and/or graphitic carbon. In certain embodiments, pre-coatings 120 and/or coatings materials 130 may be configured to provide at least part of the shell material of shells 120.

Conductive fibers 130 may comprise carbon-based material, such as specifically designed fibers e.g., carbon fibers and/or carbon nanotubes, and/or carbon-based coating material which is modified into conductive fibers 130 during preparation of anode 100. For example, conductive fibers 130 may comprise any of nanofibers structures CNT (carbon nanotubes), carbon fibers and/or graphene nano-sheets/ plates structures at an amount in a range of 0.0001%-15% with respect to the total anode material, possibly embedded, at least initially, in the carbon-based coating.

In certain embodiments, anode 100 may comprise weight ranges of 50-95% active material, at least partly as core-shell particles 115, 1-40% of conductive fibers 130 (e.g., as conductive agent material, possibly including coating material) and 1-40% of binder material.

Advantageously, disclosed core-shell particles 115 and the composite anode material enable use of metalloid (e.g., Si, Ge, Sn, mixtures and/or alloys thereof) particles (or cores made of other materials, listed above) as anode material, in spite of their lower electronic conductivity and larger mechanical expansion upon lithiation with respect to graphite as anode material, and thereby enable taking advantage of their remarkably high capacity. In particular, disclosed core-shell particles 115 and composite anode material may be especially advantageous for fast charging lithium ion cells, to accommodate the mechanical stresses and maintain high electronic and ionic conductivities to metalloid cores 110 (or cores made of other materials, listed above).

Conductive Fibers and Core-Shell Particles

In various embodiments, the anode material of anode 100 may comprise composite anode material particles 115 which may be configured as core shell particles, e.g., with anode material particles 110 and/or 110A as cores and coating(s) 120 or parts thereof as shells. Active material particles 110, possibly pre-coated 120 (in one or more layers 120, e.g., by conductive polymers, lithium polymers, etc., $B_2O_3$, $P_2O_5$, etc.) and possibly with various nanoparticles (e.g., $B_4C$, WC etc.) 112 attached thereto, may provide at least part of cores 110 of core-shell particle 115, while shell 120 may be at least partly be provided by coating(s) 120, and may be configured to provide a gap 140 for anode active material 110 to expand 101 upon lithiation. In some embodiments, gap 140 may be implemented by an elastic or plastic filling material and/or by the flexibility of coating(s) 120 which may extend as anode active material cores 110 expand (101) and thereby effectively provide room for expansion 101 (see e.g., high-level schematic illustration in FIG. 8D).

Figure 8A:
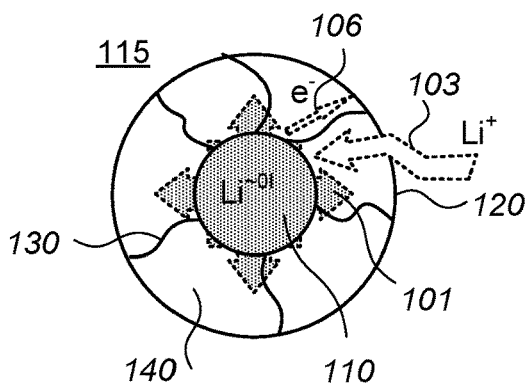
FIG. 8A is a high level schematic illustration of a core-shell particle, according to some embodiments of the invention.

FIG. 8A is a high level schematic illustration of core-shell particle 115, according to some embodiments of the invention. Core-shell particle 115 comprises at least one core 110 and shell 120 which may be in direct contact and/or may be connected by electronic conductive material 130 such as conductive fibers 130 (in non-limiting examples). One or more cores 110 are configured to receive and release lithium ions ($Li^+$) in the charging and discharging process, respectively, and shell 120 is configured to allow for, or accommodate core expansion 101 upon lithiation in core 110 (see also FIG. 2B). Core(s) 110 may be separated from shell(s) 120 by gap(s) 140 which may be voids, gaseous or at least partly filled with compressible material such as a polymer material or other mechanically compliant material. In some embodiments, core(s) 110 may be in direct contact with respective shell(s) 120, in some of the lithiation states of core(s) 110 and/or in some of core-shell particle 115 in anode 100. Shell 120 is further configured to enable and/or facilitate movement of lithium ions (indicated schematically in a non-limiting manner by arrow 103) to core(s) 110, e.g., have high ionic conductivity, while conductive fibers 130 are configured to conduct electrons (indicated schematically in a non-limiting manner by arrow 106) from core(s) 110 to shell 120, e.g., have high electronic conductivity. It is noted that arrows 103, 106 denote lithium ion and electron movement during charging of the respective lithium cell. Electronic conductive material 130 (such as conductive fibers 130) may be configured to form a network throughout anode material 100 (non-limiting examples for networks are illustrated in FIGS. 1B, 8A, 8C and 8F) and possibly interconnect cores 110 of many core-shell particles 115 to provide conduction pathways between particles 115 and enhance the electronic conductivity of anode 100.

In certain embodiments, shell 120 may be made of an ionic conductive material having a high ionic conductivity only, without electron conductivity, e.g., from an insulating material, while the electronic conductivity is provided by electronic conductive material 130 (such as conductive fibers 130, e.g., carbon fibers or carbon nanotubes). Such configurations may vastly improve upon prior art technology which would have required shell material and structure to possess high conductivity for both electrons and ions. The disclosed ability to provide the electronic conductivity by electronic conductive material 130 opens up a large variety of ionic conductors, including insulators, to be used as shell material for shells 120. Thus, in certain embodiments, shells 120 are made of ionic conductors which are electronic insulators.

Figure 8B:
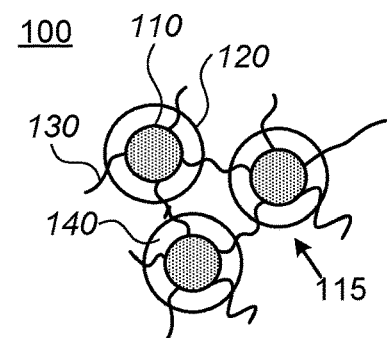
FIGS. 8B and 8C are high level schematic illustrations of composite anode material comprising a plurality of core-shell particles, according to some embodiments of the invention.
Figure 8C:
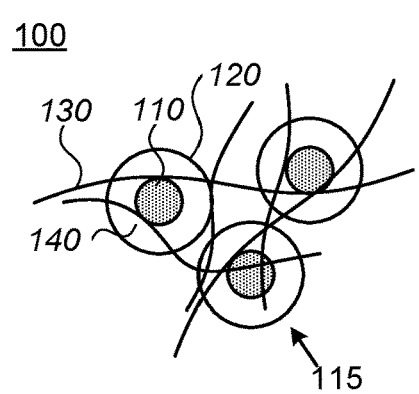

FIGS. 8B and 8C are high level schematic illustrations of composite anode material 100 comprising a plurality of core-shell particles 115, according to some embodiments of the invention. As illustrated schematically in FIG. 8B, particles 115 and/or cores 110 may be interconnected by conductive fibers 130, which may extend beyond shells 120. As illustrated schematically in FIG. 8C, conductive fibers 130 may extend over a plurality of core-shell particles 115, interconnecting their cores 110 along long distances of multiple particles 115.

For example, cores 110 may be made of SnSi, shells 120 may be made of carbon and conductive fibers 130 may comprise carbon nanotubes, e.g., having diameters between 10-20 nm, and/or possibly up to diameters in the order of magnitude of 100 nm and lengths between 3 μm and 100 μm, and/or possibly down to lengths in the order of magnitude of 100 nm. For example, conductive fibers 130 may be grown in a chemical vapor deposition (CVD) process, e.g., using cores 110 as seeds. Cores 110 may comprise any of anode active material particles 110 and/or any of anode active material particles 110A disclosed above. Multiple types and/or sizes of core-shell particles 115 may be used in preparing anode 100.

Figure 8D:
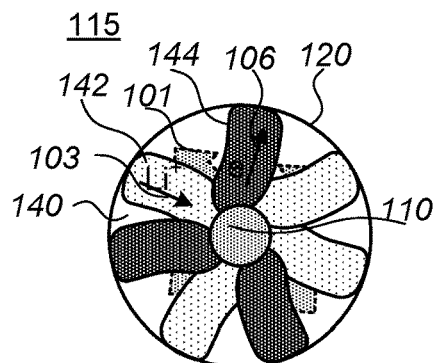
FIG. 8D is a high level schematic illustration of a core-shell particle, according to some embodiments of the invention.

FIG. 8D is a high level schematic illustration of a core-shell particle 115, according to some embodiments of the invention. In certain embodiments, core(s) 110 and shell 120 of core-shell particle 115 may be connected by ionic conductive material 142 (ionic conductivity indicated schematically by arrow 103), by electronic conductive material 144 (electronic conductivity indicated schematically by arrow 106, e.g., conductive fibers 130), with mechanical elements or material (and/or gaps(s)) 140 between core(s) 110 and shell 120 being empty or having compliant material which allows for and/or accommodates mechanical expansion of core(s) 110 (indicated schematically by arrow 101) upon lithiation into core(s) 110. It is noted that arrows 103, 106 denote lithium ion and electron movement during charging of the respective lithium cell.

Figure 8E:
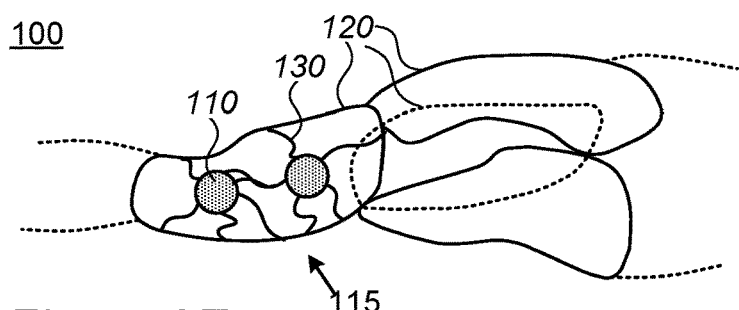
FIG. 8E is a high level schematic illustration of composite anode material comprising a plurality of core-shell particles, according to some embodiments of the invention.

FIG. 8E is a high level schematic illustration of composite anode material 100 comprising a plurality of core-shell particles 115, according to some embodiments of the invention. As illustrated schematically in FIG. 8E, at least some of shells 120 may comprise multiple cores 110 which are interconnected by conductive fibers 130 and together form one or more layers of anode 100. Core-shell particles 115 may extend to regions of anode 100 having assemblies of interconnected cores 110 (interconnected by conductive fibers 130).

Figure 8F:
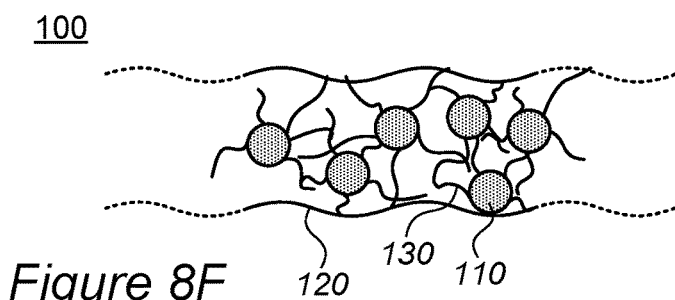
FIG. 8F is a high level schematic illustration of composite anode material, according to some embodiments of the invention.

FIG. 8F is a high level schematic illustration of composite anode material 100, according to some embodiments of the invention. Composite anode material 100 may comprise extended shell 120, possibly even single shell 120 per anode layer, having a large plurality of cores 110, interconnected among themselves and with shell 120 by conductive fibers 130.

Referring back to FIG. 7A it is noted that, in certain embodiments, shells 120 may comprise composite material, such as a brittle, ionic conductive component 120A embedded in a flexible, electronic conductive component 120B, selected to accommodate swelling and contraction (101) of core 110 upon lithiation and de-lithiation, respectively. For example, the shell material may be coated onto cores 110 prior to lithiation and expand with core lithiation (at least during over or a few formation cycles, after which shell 120 may remain expanded). Referring back to FIG. 7D it is noted that, in certain embodiments, shells 120 may comprise porous graphite 120.

Preparation Processes

Examples for preparation stages 105 of the anode material may comprise milling and/or mixing processes. In non-limiting examples, selected anode material(s) may be milled e.g., in a high-energy ball-miller under protective atmosphere or non-protective atmosphere to predefined average particle sizes, e.g., by milling the anode material(s) with graphite powder and using hardened alumina media agitated at e.g., at least at 650 RPM (revolutions per minute), possibly at 1000-1500 RPM, e.g., 1100 RPM, 1200 RPM, 1300 RPM, 1500 RPM etc. for at least 45 hours, possibly for 48 hours, 55 hours, 60 hours or more.

Various additives such as B, W, nanoparticles 112 etc. may be introduced into the ball milling process at specified stages thereof (for example, as WC or $B_4C$ nanoparticles), to reach required particle sizes and aggregation levels, as disclosed herein. Various alloys may be formed in the milling process, such as any combinations of Si, C, B and W alloys.

Specific non-limiting examples for anode compositions may comprise e.g., (in weight percentage from the total weight of the anode): (i) 48% C, 30% Si, 5.5% B, 8.3% binder and 8.2% conductive additives ($C_{0.48}Si_{0.30}B_{0.055}Binder_{0.083}ConductiveAditive_{0.082}$), with the as-milled C/Si/B alloy (active material particles) comprising 57% C, 36% Si and 7% B weight percent of the total weight of the alloy ($C_{0.57}Si_{0.36}B_{0.07}$); (ii) 41.3% C, 30.1% Si, 11.6% W, 8.4% binder and 8.6% conductive additives ($C_{0.413}Si_{0.301}W_{0.116}Binder_{0.084}ConductiveAditive_{0.086}$) with the as-milled C/Si/W alloy (active material particles) comprising 50% C, 36% Si and 14% W in weight percentage of the total weight of the alloy ($C_{0.50}Si_{0.36}W_{0.14}$); (iii) 42% C, 30% Si, 5.0% B, 10.0% W, 10% binder and 3% conductive additives ($C_{0.42}Si_{0.3}B_{0.05}W_{0.1}Binder_{0.1}ConductiveAditive_{0.03}$) with the as-milled C/Si/B/W alloy (active material particles) comprising 48.3% C, 34.5% Si, 5.7% B and 10.5% W in weight percentage of the total weight of the alloy ($C_{0.483}Si_{0.345}B_{0.057}W_{0.105}$); (iv) 57% C, 30% Si, 10% binder and 3% conductive additives ($C_{0.57}Si_{0.3}Binder_{0.1}ConductiveAditive_{0.03}$) with the as-milled C/Si alloy (active material particles) comprising 66% C and 34% Si in weight percentage of the total weight of the alloy ($C_{0.66}Si_{0.34}$); (v) 69% Ge, 3% C, 10% W, 5% B, 10% binder and 3% conductive additives ($Ge_{0.69}C_{0.03}W_{0.10}B_{0.050}Binder_{0.1}ConductiveAditive_{0.03}$) with the as-milled Ge/C/W/B alloy (active material particles) comprising 79% Ge, 3% C, 12% W and 6% B weight percent of the total weight of the alloy ($Ge_{0.79}C_{0.03}W_{0.12}B_{0.06}$).

In certain embodiments, oxide layers (e.g., $GeO_2$, $SiO_2$, $Al_2O_3$, $SnO_2$) on anode material particles 110 may be removed during preparation processes 105 and possibly followed by application of protective coating(s), disclosed e.g., above, which prevent oxidation and maintain electronic and ionic conductivity. For example, removal of oxide layers (de-oxidation) may be carried out by heating particle mixture(s) in a vacuum atmosphere, e.g., before or after ball milling steps. In a non-limiting example, de-oxidation may be carried out in a vacuum atmosphere of $10^{-3}$-$10^{-6}$ mbar for 60-100 hours (removing formed gases such as CO) at a temperature of 150-350° C. Specific temperatures may be selected according to oxide bond strengths, e.g., for Ge a temperature of 200° C. may be adequate to remove oxides without removing Ge; for Al a temperature between 400-600° C. may be adequate and for Sn to a temperature between 600-900° C. may be adequate remove oxides. Borates and/or phosphates 128 may be introduced in the de-oxidation stage to form $B_2O_3$/$P_2O_5$ oxide layer(s) or nanocrystals to yield modified anode active material particles 110A as disclosed above.

In certain embodiments, binder or additives 102, as well as possibly coatings 130, 120 may be selected to de-oxidize and/or contribute to de-oxidation of anode material particles 110. In certain embodiments, alumina may be removed from Al anode material particles 110 chemically, e.g., by immersing the aluminum particles in a dilute solution (for example, 0.05M to 2M) of $H_2SO_4$ solution to form aluminum sulfate ($Al_2O_3+3H_2SO_4 \rightarrow Al_2(SO_4)_3(aq)+3H_2O$), which can then be used to bond various molecules or polymers as disclosed above, e.g., aqueous aluminum sulfate may be aggressively stirred with a lithium polymer to form coating 120.

Examples for preparation stages 105 of coating(s) 120 may comprise preparing lithium polymers by mixing 5 gr of PAA (polyacrylic acid) solution (25% wt) with LiOH solution and with 415 mg of LiOH powder (lithium hydroxide anhydrous), dissolved by adding 3.74 ml DI (distilled water) and stirring until clear solution is reached and/or until complete chemical reaction is achieved (e.g., overnight). In certain embodiments, the pH of the resulting solution may be very basic, e.g., around 13. The Li-PAA solution may then be transferred into evaporation glass according to the solution volume, evaporated in Rotavapor evaporation glass which is then dried in an oven, e.g., overnight at 120° C. The prepared Li-polymer may be placed in the ball miller together with the anode material particles, which may possibly be coated with $B_4C$ (e.g., any of particles 110, 110A, 115) and milled together. A non-limiting example for a ball milling method may include, milling 5% w/w lithium polymer powder with germanium (or with germanium doped with $B_4C$, and/or with Si, Sn, Al alloys and mixtures thereof, possibly doped with B and/or W) for 6 h at 200 rpm. Details of the milling process may be configured to cause the positively charged lithium of the lithium polymer salt to favor the alloy anode material and to react the alloy anode material surface to bind the negatively charged anion of the polymer to the surface of particles 110, 110A, 115, leaving a partly charged entity chemically bound to coating 120.

Cell Configurations

Complementarily or alternatively, electronical properties of cell 150 may be configured to optimize the dynamic charge/discharge and further reduce lithium ion accumulation at the interface. FIG. 9A-9C are high level schematic illustrations of cell configurations 150, according to some embodiments of the invention, compared with prior art configurations 90 illustrated in FIG. 9D. In prior art designs 90, the resistance of cell elements to the movement of lithium ions is denoted $R_E$ for the resistance of electrolyte 85, $R_S$ for the resistance of a cell separator 86, and $R_A$ for the resistance of anode material 95, and generally these resistances are reduced to accommodate fast charging. According to embodiments of the invention, cell configurations 150, as illustrated e.g., in FIG. 9A, may comprise increasing a resistance $r_E$ of a selected electrolyte 160 (and/or optionally a resistance $r_S$ of a selected separator 152) to reduce the rate at which lithium ions reach anode material particles 110 (here and in the following, referring optionally to modified anode material particles 110A and/or to composite anode material particles 115). The increase may be selected to maintain resistance $r_E$ of electrolyte 160 significantly lower than the resistance of anode 100 in order not to reduce the overall rate of lithium ion movement from cathode 87 to anode 100, as the main limiting factor may be the lithiation rate of the lithium ions in anode material particles 110. For example, the inventors have surprisingly found that electrolytes 160 with higher resistance $r_E > R_E$ may be used in cells 150 to improve cell performance at high charging rates. Moreover, as explained above, buffering zones 110B, 110C in anode material particles 110 (shown schematically) may be configured to regulate lithium ion lithiation process to be gradual, e.g., by designing anode 100 to have an initial resistance $r_A$ and resistances $r''_A$, $r'_A$ of buffering zones 110B, 110C, respectively, which control lithium ion movements into anode material particles 110 (e.g., into the lithiation zone) according to the lithiation capacity of the anode material, to prevent lithium accumulation and metallization at the SEI. Clearly, resistance $r_E$ of electrolyte 160 may be selected to diminish lithium ion accumulation at anode 100 to prevent metallization but not too large, in order to still enable fast charging of anode 100 in cell 150. See also FIGS. 2A-2D above depicting ways to optimize the resistances in cell 150, in which buffering zone(s) 110B, 110C may correspond to buffering zone(s) 110B and/or coatings 120 illustrated therein.

As illustrated schematically in FIGS. 9B and 9C, lithium ion cell 150 may comprise modified anode 100 and modified electrolyte 160 comprising up to 20%, up to 5%, and/or ca. 1% ionic liquid additive(s) which may form a mobile SEI (e.g., in place of (static) SEI 122, in addition to SEI 122 or in an interaction with SEI 122, see FIG. 2D) on anode material particles 110, e.g., during charging, as illustrated in FIG. 9B and disclosed above. The ionic liquid additive(s) may comprise nitrogen-based ionic liquid(s) and may be selected to have a melting temperature below 10° C., below 0° C. or below −4° C., in certain embodiments (see examples below).

Layer 120 may be part of anode material particles 110 or coated thereupon (see examples for bonding molecules 180 as part of coating 120, below), and bind at least a part of the ionic liquid additive(s) to hold at least stationary portion 165A of the ionic liquid additive(s) at the anode surface (FIG. 9C, leaving a mobile portion 165B of the ionic liquid additive(s) in electrolyte 160) to support the SEI, prevent decomposition of electrolyte 160 and prevent lithium metallization on anode 100. Layer 120 of bonding molecules 180 and/or layer 165A of bonded ionic liquid additive may also provide some negative electric charge that partly reduces the lithium ions, leaving them with a partial charge $\delta^+$ and preventing full reduction and metallization of lithium on the anode surface, providing, supporting and/or complementing gradient 125 and/or the partial charge in buffering zone 110B (see FIGS. 2C, 2E-2G). Layer 120 of bonding molecules 180 and/or layer 165A of bonded ionic liquid additive may be configured to support an electric charge gradient 125 extending into electrolyte 160.

Bonding Molecules for Electrolyte-Based Buffering Zones

FIGS. 10A-10C and 11A-11C are high level schematic illustrations of electrolyte-based buffering zone(s) 165 which may be used in place or in addition to anode-based buffering zone(s) 110B disclosed above, according to some embodiments of the invention. Coating 120 may be configured to support and stabilize disclosed electrolyte-based buffering zones 165 during charging and/or discharging of cells 150, and further enhance battery safety by preventing metallization, preventing interaction between electrolyte solvents and the anode material, and possibly improving the operation of the lithium ion batteries by increasing the reversibility of lithiation and/or increasing the coulombic efficiency of cells 150. The following disclosure relates to anode active material particles 110 in a non-limiting manner, and may be equally applied in some embodiments to modified anode active material particles 110A and/or to composite anode active material particles 115 as described above.

In certain embodiments, electrolyte 85 may be replaced or modified into an electrolyte 160 which comprises one or more ionic liquid additive 163 having at least one type of cation 162 and at least one kind of anion 161. For example, ionic liquid additive(s) 163 may comprise nitrogen-based ionic liquids and their combinations: 1-butyl-1-methylpyrrolidinium as cation 162 and bis(trifluoromethanesulfonyl)imide as anion 161; 1-butyl-6-methylimidazolium as cation 162 and bis(trifluoromethanesulfonyl)imide as anion 161; 1-butyl-6-methylimidazolium as cation 162 and bis(fluorosulfonyl)imide as anion 161; N,N-Diethyl-N-methyl-N-propylammonium as cation 162 and bis(fluorosulfonyl)imide as anion 161; and N-propyl-N-methylpiperidinium as cation 162 and bis(trifluoromethanesulfonyl)imide as anion 161. Certain embodiments comprise nitrogen-based ionic liquids which are derived from these combinations, e.g., having various substituents. In certain embodiments, ionic liquid additive(s) 163 may be configured for use at room temperature, have a negligible vapor pressure, a wide electrochemical potential window (e.g., up to 5.0 V in nitrogen-based ionic liquids), and structural stability across a large temperature range (e.g., down to any of 20° C., 10° C., 0° C. or lower, and up to one or several hundred ° C.). Ionic liquid additive(s) 163 may contribute to formation of at least one electrolyte-buffering zone 165 in electrolyte 160, at the interface of electrolyte 160 and anode material 110 and/or coating 120, which further prevents contact between the solvent(s) of the electrolyte and reactive anode material 110, while maintaining required lithium ion conductivity between electrolyte 160 and anode material 110. In certain embodiments, coating 120 may comprise bonding molecules 180 which bind at least some of cations 162 and/or anions 161 of ionic liquid additive(s) 163 to stabilize electrolyte-buffering zone(s) 165 during charging and discharging of cell 150. Non-limiting examples for bonding molecules 180 are provided below.

In certain embodiments, coating layer 120 may comprise bonding molecules 180 in a structure as illustrated in FIG. 6, configured to bind at least some of cations 162 and/or anions 161 of ionic liquid additive(s) 163 to stabilize electrolyte-buffering zone(s) 165 during charging and discharging of cell 150.

Figure 10A:
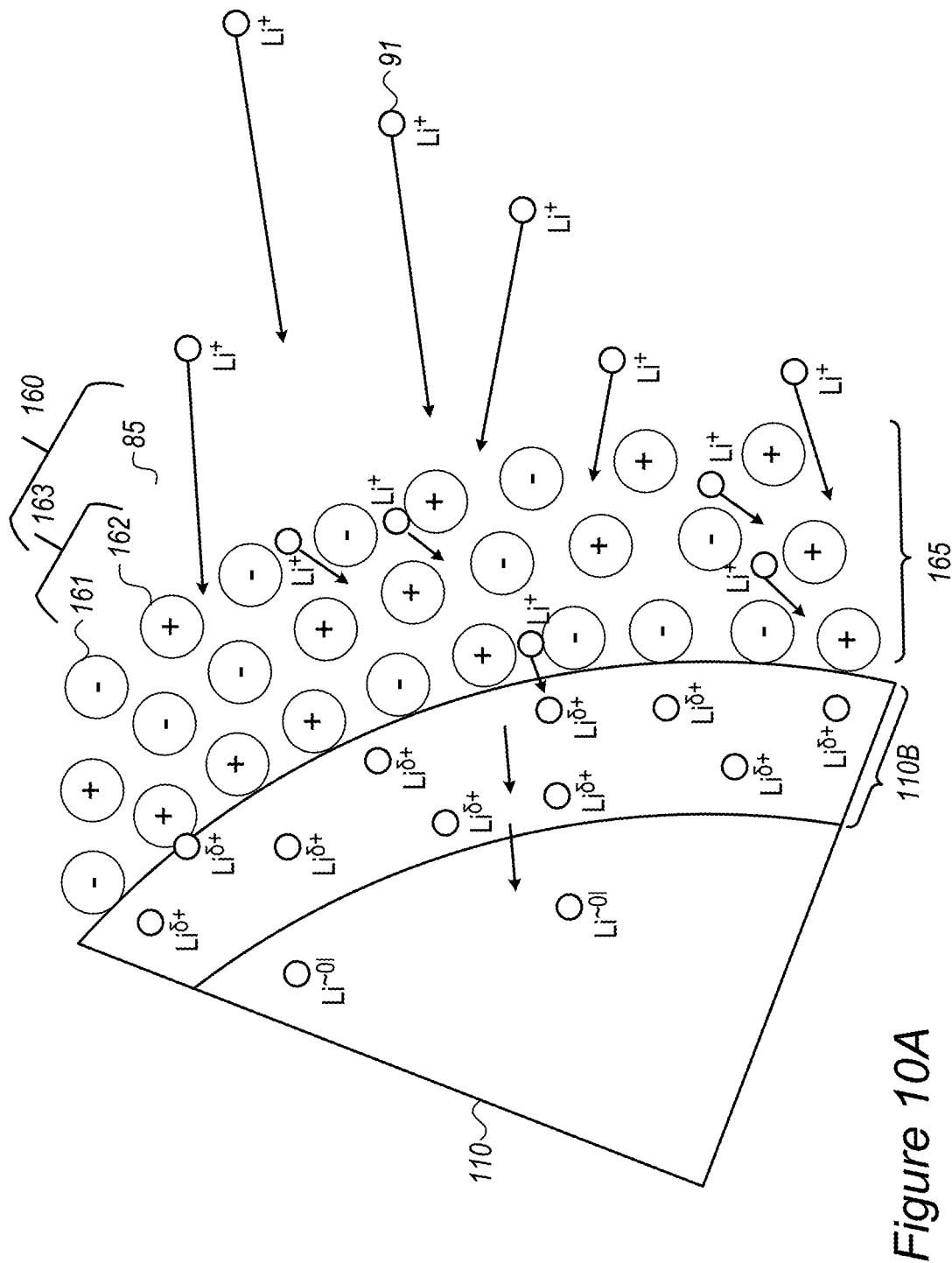
FIGS. 10A-10C and 11A-11C are high level schematic illustrations of electrolyte-based buffering zones which may be used in place or in addition to anode-based buffering zones, according to some embodiments of the invention.

FIG. 10A schematically illustrates at least one electrolyte-buffering zone 165 in an electrolyte 160, according to some embodiments of the invention. Electrolyte-buffering zone(s) 165 is illustrated schematically as an accumulation of anions 161 and cations 162, which provides additional separation between electrolyte 160 and anode active material particles 110 and may be configured to further regulate lithium ion movement between electrolyte 160 and anode active material particles 110. For example, anions 161 and/or cations 162 may be relatively large, e.g., larger than lithium ions 91 and/or significantly larger than lithium ions 91 to establish a gradient in physical and/or chemical characteristics in region 165 and possibly provide an interphase transition between electrolyte 160 and anode active material particles 110 that enhances the stabilization of transition region and prevents lithium ion accumulation and/or metallization and dendrite growth. Anions 161 may be selected to provide negative electric charge in the region of lithium ions 91 moving towards anode active material particles 110, which somewhat, yet not fully, reduces the positive charge of lithium ions 91 to $\delta+$ (e.g., by physical proximity and not by a chemical bond).

In certain embodiments, electrolyte 160 may comprise an ionic liquid additive 163 added to prior art electrolyte 85 (e.g., at 20%, 10%, 5% or any other volume part of electrolyte 160), which is selected to at least partially provide anions 161 and/or cations 162 to build electrolyte-buffering zone(s) 165. For example, ionic liquid additive 163 may comprise acidic groups which are selected to be anionic in the environment of lithium ions 91. Anions 161 and/or cations 162 may be relatively large to form a barrier which reduces the approaching speed of lithium ions 91 and locally increases the resistance of buffering zone(s) 165 to lithium ions 91 to prevent or attenuate accumulation of lithium ions 91 at the surface of anode active material particles 110 (see e.g., $r_A$ in FIG. 9A) and/or achieve any of the effects disclosed below.

Figure 10C:
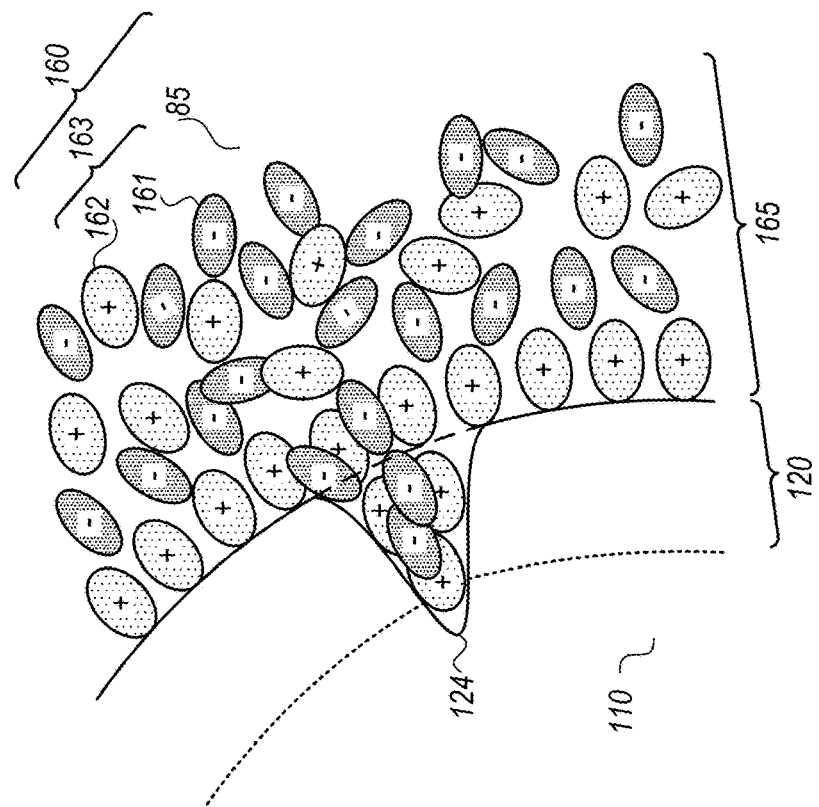
Figure 10B:
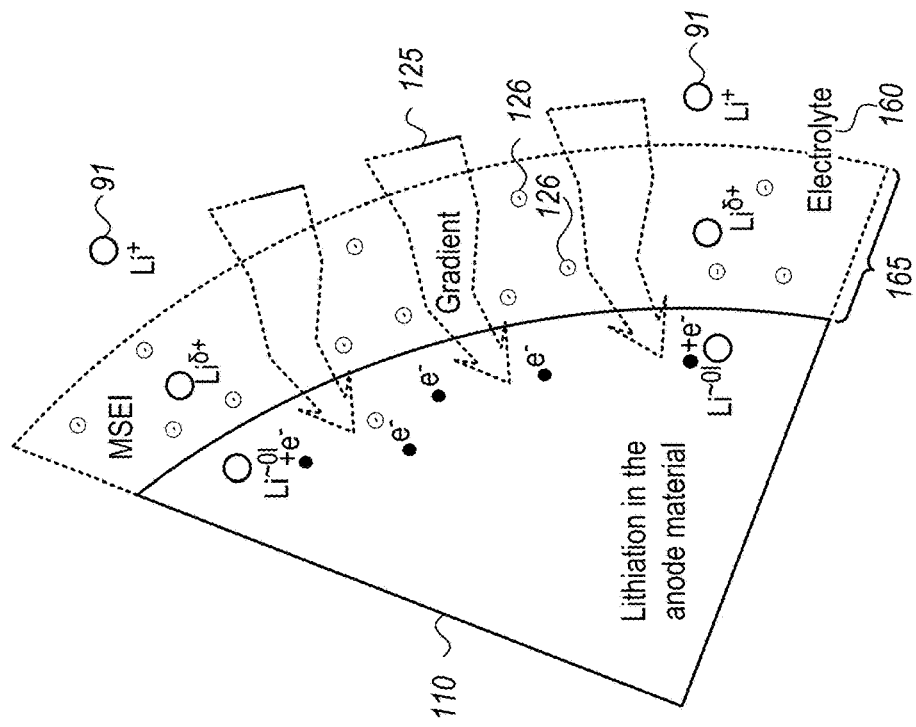

FIG. 10B schematically illustrates at least one electrolyte-buffering zone 165 (MSEI) in an electrolyte 160, which is configured to provide a mobility and charge gradient 125 (indicated schematically by the tapered arrows) having surrounding electric charge 126 (illustrated schematically as a non-specific symbol), according to some embodiments of the invention. Mobility and charge gradient 125 reduces and slows lithium ions 91 entering zone 165 in a gradual manner (indicated schematically by $Li^{\delta+}$, with the partial charge of the lithium ions changing gradually within zone 165) until they reach lithiation in the anode active material. Gradient 125 enables modification of the interface (the area where the two immiscible phase surfaces of anode and electrolyte come into contact with each other) into an interphase region 165 having a gradual change of parameters which gradually reduces the activation energy of the reduction reaction of the lithium ions, and further prevents metallization of lithium and dendrite growth. MSEI zone 165 helps smoothen the lithium ion transport into the active material for full reduction and intercalation (to $Li^{\sim 01}$). The resulting ionic liquid layer 165 reduces the probability of both lithium metallization and de-composition of the organic solvent (electrolyte 85) at the metalloid-lithium surface. Once the electrical field stops (e.g., at the end or interruption of the charging), ionic liquid 163 may slowly diffuse to form homogenous electrolyte 160. It is explicitly noted, however, that ionic liquid additive 163 may be used in cells having metalloid-based and/or graphite-based anodes (either option possibly coated and/or pre-coated).

FIG. 10C schematically illustrates at least one electrolyte-buffering zone 165 (MSEI) in an electrolyte 160, according to some embodiments of the invention. Electrolyte-buffering zone(s) 165 may be configured to fill in possible cracks 124 appearing in composite anode material particles 115, e.g., due to cracking of any of coating 120, anode buffering zone 110B, or SEI layer 122 (see FIGS. 2B-2F) upon expansion and contraction 101 of anode material particles 110.

Filling cracks 124 may prevent renewed contact between the anode active material and/or metal lithium and electrolyte 85 due to exposure of the anode active material (e.g., when coating 120 is cracked) or due to the increase in the surface area available for such contact due to cracks 124. Electrolyte-buffering zone(s) 165 thus prevent further electrolyte decomposition, prevent further SEI growth and thickening, and block possible sites for lithium metallization from solvents of electrolyte 85. Ionic liquid additive 163 may be configured to fill in such cracks 124 (illustrated schematically in FIG. 10C) once an electric field is applied, or possibly also after the electric field is applied, to reduce the extent of, or prevent, cracks 124 from enhancing electrolyte decomposition and lithium metallization. Ionic liquid additive 163 may be configured to fill in cracks or uncoated surface areas as explained above, including possible exposed surfaces in the coating resulting from expansion and contraction 101 during cell cycles. Bonding molecules 180 of any of the disclosed types may be incorporated in coating(s) 120 and/or in coating(s) 130 and be configured to be present in cracks 124 to bond with cations 162 and/or anions 161 of ionic liquid additive 163 and achieve the crack filling and anode active material protection described above.

Figure 11A:
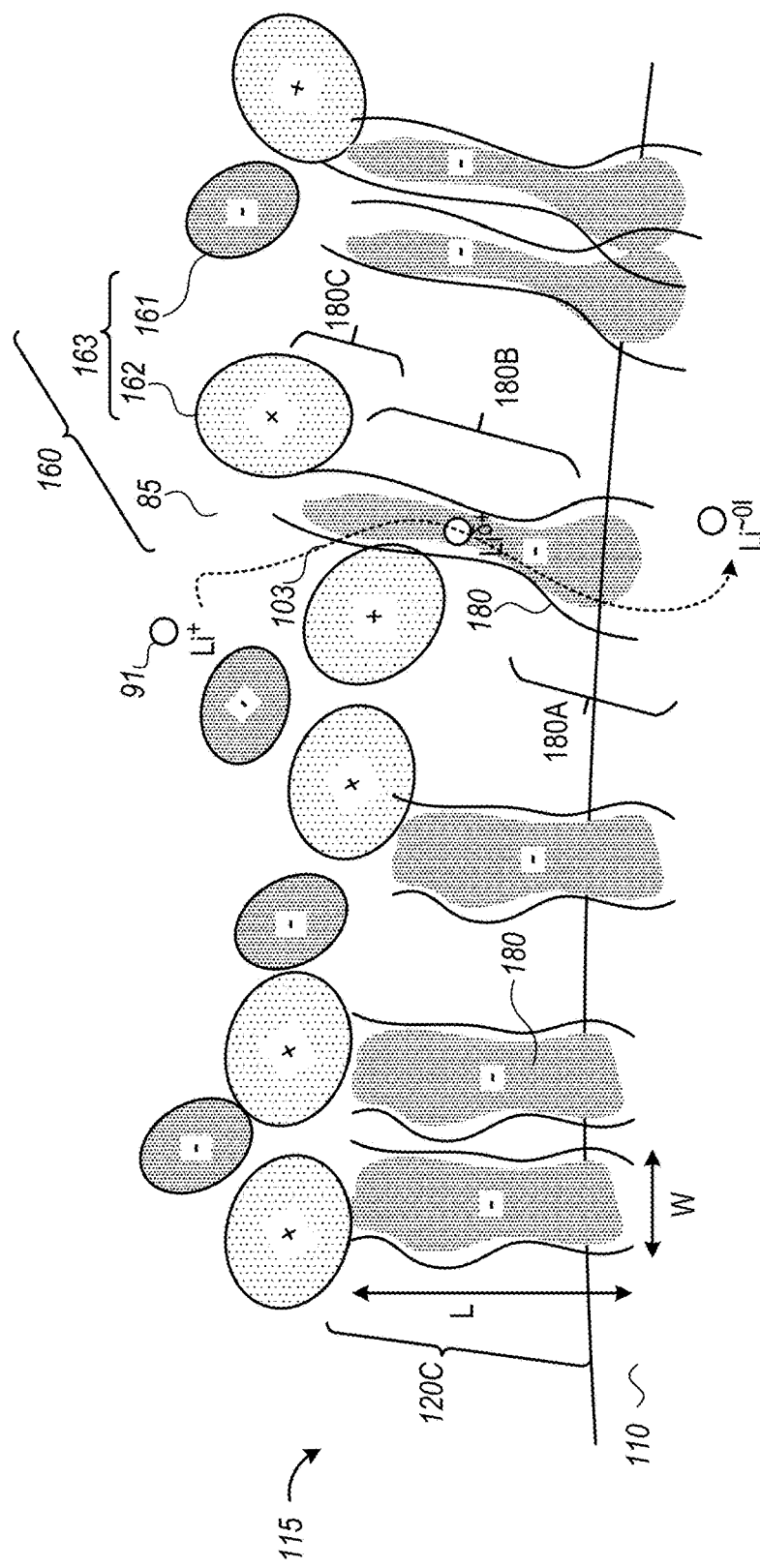

FIG. 11A is a high level schematic illustration of bonding molecules 180 forming a surface molecules layer 120C at least as part of coating 120 on anode 100 and/or on anode active material particles 110, according to some embodiments of the invention. It is emphasized that FIG. 11A is highly schematic and represents principles for selecting bonding molecules 180, according to some embodiments of the invention. Actual bonding molecules 180 may be selected according to requirements, e.g., from bonding molecules 180 represented by any one of formulas I-VII (detailed below), under any of their embodiments. The surface molecules layer may be part of coating 120 and/or associate or bonded thereto.

Surface molecules layer 120C may be configured to prevent contact of electrolyte solvent (of electrolyte 85) with anode active material 110, e.g., through steric hindrance by molecules 180. Non-limiting examples are embodiments represented e.g., by formulas II, IV and V, among others, such as the non-limiting examples lithium 3,5-dicarboxybenzenesulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), etc.

Molecules 180 may be selected and attached onto anode active material 110 in a way that forms a mechanical and/or electrostatic barrier towards electrolyte solvent and prevents it from reaching and interacting with anode active material 110. Bonding molecules 180 may be selected to have electron rich groups that provide mobile electric charge on the surface of molecules layer 120C. Non-limiting examples are embodiments represented e.g., by formulas II, and IV-VII, having conjugated double bonds, acidic groups and benzene groups, among others, such as the non-limiting examples lithium 4-methylbenzenesulfonate, lithium 3,5-dicarboxybenzenesulfonate, lithium 2,6-dimethylbenzene-1, 4-disulfonate, 3,3'-((1,2-dithiane-4,5-diyl)bis(oxy))bis(N-hydroxypropanamide), 3,3'-((4-mercapto-1,2-phenylene)bis(oxy))bis(N hydroxypropanamide), lithium aniline sulfonate, poly(lithium-4-styrenesulfonate) etc.

For example, bonding molecules 180 may be selected to have a width W (anchored in anode 100 and/or anode active material particles 110) of up to three benzene rings and a length L (protruding into electrolyte 160) of up to four benzene rings, as exemplified in a non-limiting manner in embodiments represented e.g., by formulas II and VII having bicyclic or tricyclic structures, e.g., anthracene-based structures and/or in embodiments represented e.g., by formulas IV and V.

In some embodiments, bonding molecules 180 may comprise an anode material anchoring part 180A, configured to bind to or be associated with anode active material 110, e.g., via lithium, thiols, or other functional groups in bonding molecules 180. In some embodiments, anode material anchoring part 180A may be pre-lithiated exemplified in a non-limiting manner in embodiments represented by any of formulas I-VII which include lithium, such as the non-limiting examples illustrated in FIG. 11D. FIG. 11D is a high level schematic illustration of non-limiting examples for bonding molecules 180, according to some embodiments of the invention.

In some embodiments, bonding molecules 180 may comprise an ionic conductive part 180B having an ionic conductivity which is much higher than its electronic conductivity, e.g., by one, two, three or more orders of magnitude. Ionic conductive part 180B may extend through most or all of length L of bonding molecules 180 and provide a conductivity path 103 (illustrated schematically) for lithium ions 91 moving back and forth between electrolyte 160 and anode 110 during charging and discharging cycles. Conductivity paths 103 may be provided e.g., by conjugated double bonds, acidic groups, benzene rings, carbon-fluorine bonds, charged functional groups etc. which are disclosed above. For example, the charge distribution on bonding molecules 180 may be selected to be mobile and support lithium ion movement across molecules layer 120C, possibly reducing the charge of the lithium ion to $Li^{\delta+}$ as explained above, to prevent metallization on the surface of anode 110. Partial charge reduction may be carried out by electron rich groups such as aromatic groups and acidic groups disclosed above.

In some embodiments, bonding molecules 180 may comprise a top, ionic liquid binding part 180C configured to bind cations 162 and/or anions 161 of ionic liquid additive 163 in electrolyte 160. For example, embodiments represented by any of formulas I-VII which involve charged and/or polar functional groups may provide top, ionic liquid binding part 180C, e.g., lithium 3,5-dicarboxybenzenesulfonate, lithium sulfate, lithium phosphate, lithium phosphate monobasic, lithium trifluoromethanesulfonate, lithium 1,1,2,2,3,3,4,4,5, 5,6,6,7,7,8,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate (the sulfonate may be in any of para, meta and ortho positions) as well as poly(lithium-4-styrenesulfonate), as some non-limiting examples. Ionic liquid binding part 180C may be further configured to stabilize electrolyte-buffering zone(s) 165 as described above.

Figures 11B, 11C:
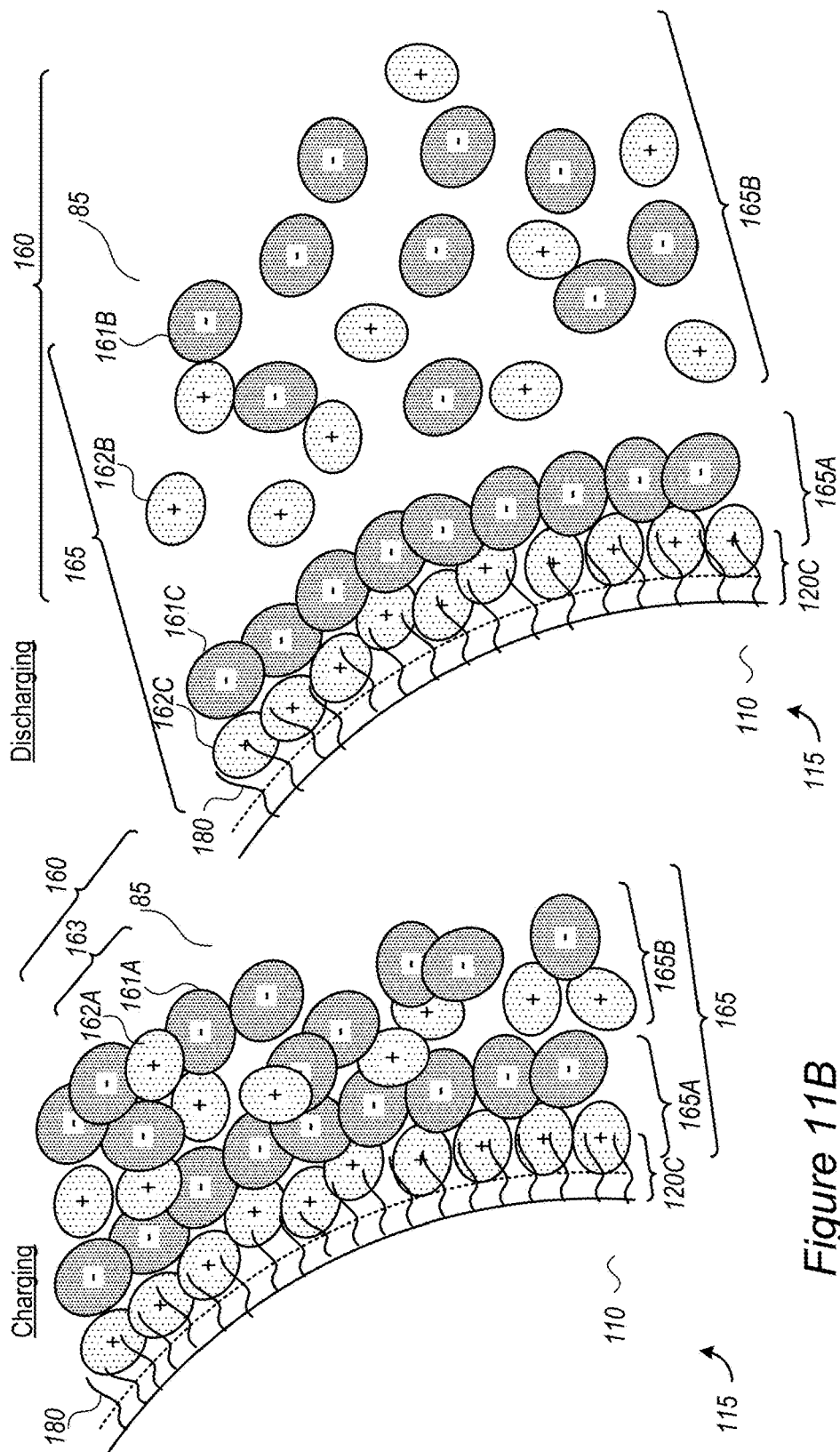

FIGS. 11B and 11C are high level schematic illustrations of an immobilized/mobilized SEI (I/MSEI) during charging and discharging, according to some embodiments of the invention. In certain embodiments, surface functionalization of the anode active material may enhance the functionality of MSEI 165, e.g., by increasing the affinity of ionic liquid additive 163 to the active material—electrolyte interface, and protecting the interface further more from direct interaction with the organic solvent (of electrolyte 85). Surface functionalization may be applied by anode coatings 130 and/or by anode material particle pre-coatings 120 and/or by additional modifications of the surface of anode 100 (e.g., of anode material particles 110) and/or of the active material on the anode surface. For example, chemically bonded layer 120C of bonding molecules 180 (possibly as part of coating 120) such as large volume salt(s) on the active material surface may be used to keep some of ionic liquid 163 on the surface and reduce the probability of the organic solvent de-composition prior to the MSEI re-arrangement at the interface. FIGS. 11B and 11C schematically illustrate this effect by the retainment of at least some of cations 162 bonded to the surface even when cell 150 is not charged. FIGS. 11B and 11C schematically illustrate anode material particles 110 during charging and discharging (or no charging) with ionic liquid additive 163 building MSEI 165 in the charging state, which may comprise an immobilized section 165A and a mobile section 165B, the former remaining in the discharging state, bonded or associated with anode surface while the latter return into electrolyte 160 in the discharging state. Coating 120 may comprise layer 120C in which bonding molecules 180 are associated with anode material particle coating 120 and/or attached to anode 100, possibly as coating 130. Cations 162C and possibly anions 161C which stay bonded to bonding molecules 180 (immobilized section 165A of ionic liquid additive 163) are denoted differently from cations 162B and anions 161B which stay in electrolyte 160 (mobile section 165B of ionic liquid additive 163), to illustrate that a part (or possibly all) of electrolyte additive 163 is immobilized onto layer 120C of anode material particle 110 during operation of cell 150. Immobilized layer 165A at the interface may have a better affinity to ionic liquid 163 and less affinity toward organic solvent of electrolyte 85, and therefore keep the organic solvent away from the interface and reduce the probability for its de-composition.

In some embodiments, the bonding of ions of ionic liquid additive(s) 163 may involve bonding cations 162 or possibly anions 161 by bonding molecules 180 as the layer closest to the surface of anode active material particles 110. The bonding may be carried out during one or more first charging and discharging cycles of cell 150. In certain embodiments, the bonding of cations 162 and/or anions 161 may be carried out, at least partially, on active material particles 110 themselves, even before the first charging cycle. The bonding of ionic liquid additive 163 to bonding layer 120C of coating 120 may be electrostatic and/or salt-like (ionic). In certain embodiments, the bonding may be at least partly covalent. The bonding may involve any number of ionic layers, typically a few layers, possibly providing a salt layer which isolates the organic solvent used for electrolyte 85 at least from active material 110 of anode 100.

Bonding molecules 180 may be ionic or have electron rich groups such as sodium aniline sulfonate. Bonding molecules 180 may comprise lithium cations and/or possibly magnesium cations, the latter possibly when the anode material is graphite. In case of aluminum as anode material, bonding molecules 180 may comprise lithium cations and/or aluminum cations. The lithium in the following examples may thus be replaced in some embodiments by magnesium and/or aluminum. In case of graphite anodes, a wide range of activation techniques which yield oxidized graphite may be used to enhance chemical bonding of molecules 180 (e.g., using halides or alkoxides).

Non-limiting examples for bonding molecules 180 comprise lithium alkylsulfonate, poly(lithium alkylsulfonate), lithium sulfate, lithium phosphate, lithium phosphate monobasic, alkylhydroxamate salts and their acidic forms (e.g., lithium sulfonic acid, $LiHSO_4$, instead of lithium sulfonate, $Li_2SO_4$). The chemical bonding of molecules 180 to anode 100 (e.g., to anode material particles 110) may be carried out, for example, in the anode slurry solution and/or in dry ball milling with anode material particles (in process 105). The bonding mechanism may comprise, e.g., reaction(s) of the lithium sulfonates and/or salts with metal oxides, releasing the oxide and creating a direct chemical bond to the anode material (e.g., Si, Ge, Sn, Al, mixture and alloys thereof) surface of anode material particles 110, where the lithium cation remain partly charged ($Li^{\delta+}$) in the anode material. For example, using a large volume salt with an additional anion group as bonding molecules 180 may create a salt surface 120C on anode active material particles 110, which can both protect the interface and co-operate with ionic liquid additive 163 in electrolyte 160. Layer 120C may bind a stationary portion of ionic liquid additive 163 on the surface of anode active material particles 110 while the rest of ionic liquid additive 163 is mobilized in electrolyte 160, providing a hybrid ionic liquid additive which is partly bonded and partly free in electrolyte 160. Stationary portion 165A may increase the re-ordering rate of ionic liquid additive 163 on the surface during charging, help repel organic electrolyte 85 from the interface and hence reduce the probability for the de-composition of the organic solvent. Non-limiting examples for bonding molecules 180 include large anionic salts or their acids which may be selected to sterically repel the smaller organic carbonates solvents (of electrolyte 85) from the active material surface. Layer 120C and stationary portion 165A of ionic liquid additive 163 on surface of anode active material particles 110 may be highly effective during the initial charging, and enable or support the building of a stable SEI during the formation cycle(s) which protects the surface of anode active material particles 110 and of anode 100 during later operation, and prevent decomposition of electrolyte on anode 100 as well as lithium metallization thereupon.

The resulting SEI may be modified toward enhanced stability and be possibly provided with self-healing mechanisms through layer 120C and stationary portion 165A of ionic liquid additive 163.

Non-limiting examples for bonding molecules 180 include any of the following, illustrated below: lithium 4-methylbenzenesulfonate, lithium 3,5-dicarboxybenzenesulfonate, lithium sulfate, lithium phosphate, lithium phosphate monobasic, lithium trifluoromethanesulfonate, lithium 4-dodecylbenzenesulfonate, lithium propane-1-sulfonate, lithium 1,1,2,2,3,3,4,4,5,5,6,6,7,7,8,8-heptadecafluorooctane-1-sulfonate, lithium 2,6-dimethylbenzene-1,4-disulfonate, lithium 2,6-di-tert-butylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate (the sulfonate may be in any of para, meta and ortho positions) as well as poly(lithium-4-styrenesulfonate) applied in coating the anode material particles as disclosed herein. It is noted that in cases of coatings that contain lithium (e.g., metallic lithium), ionic liquid additive(s) 163 may be selected to be non-reactive toward it.

For example, various coatings of the anode active material may be used to bond or enhance bonding of molecules 180 to anode material 110, as disclosed above. The size(s) of molecules 180 may be selected to provide good lithium ion conductivity therethrough. In certain embodiments, molecules 180 may be selected (e.g., some of the disclosed salts) to form channels configured to enable fast lithium ion movement therethrough.

In a more generalized sense, bonding molecules 180 may be selected from any of the following sets of molecules, according to Formulas I-IV.

In some embodiments, surface layer 120C may comprise bonding molecules 180 represented by the structure of formula I:

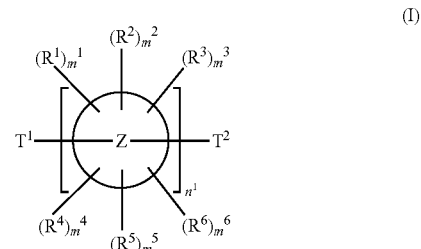

(I)

wherein:
each Z is independently selected from aryl, heterocycloalkyl, crown etheryl, cyclamyl, cyclenyl, 1,4,7-Triazacyclononanyl, hexacyclenyl, cryptandyl, naphtalenyl, anthracenyl, phenantrenyl, tetracenyl, chrysenyl, triphenylenyl pyrenyl and pentacenyl;
$R^1$ is $[C(L^1)_2]_q{}^1{-}R^{101}$;
each $L^1$ is independently selected from H, F and $R^{101}$;
$R^2$, $R^3$, $R^4$, $R^5$, $R^6$ and $R^{101}$ are each independently selected from $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)$ NH$_2$, halide, tosylate, mesylate, SO$_2$NHR, triflate, isocyanate, cyanate, thiocyanate, isothiocyanate, R, cyano, CF$_3$, and Si(OR)$_3$;

each R is independently selected from methyl, ethyl, isopropyl, n-propyl, alkyl, haloalkyl, cycloalkyl, heterocycloalkyl, aryl, and benzyl;

each M$^1$ is independently Li, Na, K, Rb or Cs;

each M$^2$ is independently Be, Mg, Ca, Sr or Ba;

T$^1$ and T$^2$ are each independently absent, or selected from H, CO$_2$H, CO$_2$M$^1$, CO$_2$R, SO$_3$H, SO$_3$M$^1$, PO$_3$H$_2$, PO$_3$M$^1{}_2$. PO$_3$M$^1$H, PO$_4$H$_2$, PO$_4$M$^1{}_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano, CF$_3$, and Si(OR)$_3$;

m$^1$, m$^2$, m$^3$, m$^4$, m$^5$, and m$^6$ are each independently an integer between 0-6;

n$^1$ is an integer between 1-10;

q$^1$ is an integer between 0-10; and

Z is connected to any of R$^1$-R$^6$, T$^1$-T$^2$ or to any neighboring repeating unit in any possible substitution position and via one or more atoms.

In some embodiments, surface layer 120C may comprise bonding molecules 180 represented by the structure of formula II:

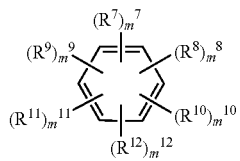

(II)

wherein:

R$^7$ is [C(L$^2$)$_2$]$_q{}^2$—R$^{102}$;

each L$^2$ is independently selected from H, F and R$^{102}$;

R$^8$, R$^9$, R$^{10}$, R$^{11}$, R$^{12}$ and R$^{102}$ are each independently selected from CO$_2$H, CO$_2$M$^1$, CO$_2$R, SO$_3$H, SO$_3$M$^1$, PO$_3$H$_2$, PO$_3$M$^1{}_2$. PO$_3$M$^1$H, PO$_4$H$_2$, PO$_4$M$^1{}_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano and Si(OR)$_3$;

each R is independently selected from methyl, ethyl, isopropyl, n-propyl, alkyl, haloalkyl, cycloalkyl, heterocycloalkyl, aryl, and benzyl;

each M$^1$ is independently Li, Na, K, Rb or Cs;

each M$^2$ is independently Be, Mg, Ca, Sr or Ba;

m$^7$, m$^8$, m$^9$, m$^{10}$, m$^{11}$ and m$^{12}$ are each independently an integer between 0-6; and q$^2$ is an integer between 0-10.

In some embodiments, surface layer 120C may comprise bonding molecules 180 represented by the structure formula III:

(L$^3$)$_3$C—R$^{103}$ (III)

wherein:

R$^{103}$ is [C(L$^4$)$_2$]$_q{}^3$—R$^{105}$;

each L$^3$ is independently selected from H, F and R$^{104}$;

each L$^4$ is independently selected from H, F and R$^{106}$;

R$^{104}$, R$^{105}$, and R$^{106}$ are each independently selected from CO$_2$H, CO$_2$M$^1$, CO$_2$R, SO$_3$H, SO$_3$M$^1$, PO$_3$H$_2$, PO$_3$M$^1{}_2$. PO$_3$M$^1$H, PO$_4$H$_2$, PO$_4$M$^1{}_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano, CF$_3$ and Si(OR)$_3$;

each R is independently selected from methyl, ethyl, isopropyl, n-propyl, alkyl, haloalkyl, cycloalkyl, heterocycloalkyl, aryl, or benzyl;

each M$^1$ is independently Li, Na, K, Rb or Cs;

each M$^2$ is independently Be, Mg, Ca, Sr or Ba; and q$^3$ is an integer between 0-10.

In some embodiments, surface layer 120C may comprise bonding molecules 180 represented by the structure of formula IV:

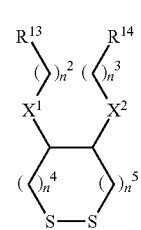

(IV)

wherein:

X$^1$ and X$^2$ are each independently selected from S, O and CH$_2$;

R$^{13}$ and R$^{14}$ are each independently selected from CO$_2$H, CO$_2$M$^1$, CO$_2$R, SO$_3$H, SO$_3$M$^1$, PO$_3$H$_2$, PO$_3$M$^1{}_2$. PO$_3$M$^1$H, PO$_4$H$_2$, PO$_4$M$^1{}_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, SO$_2$NHR, triflate, isocyanate, cyanate, thiocyanate, isothiocyanate, R, cyano, CF$_3$ and Si(OR)$_3$;

each M$^1$ is independently Li, Na, K, Rb or Cs;

each M$^2$ is independently Be, Mg, Ca, Sr or Ba;

each R is independently selected from methyl, ethyl, isopropyl, n-propyl, alkyl, haloalkyl, cycloalkyl, heterocycloalkyl, aryl, or benzyl; and n$^2$, n$^3$, n$^4$ and n$^5$ are each independently an integer between 0-10.

In some embodiments, surface layer 120C may comprise bonding molecules 180 represented by the structure of formula V:

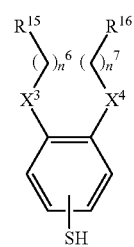

(V)

wherein:

X$^3$ and X$^4$ are each independently selected from S, O and CH$_2$;

R$^{15}$ and R$^{16}$ are each independently selected from CO$_2$H, CO$_2$M$^1$, CO$_2$R, SO$_3$H, SO$_3$M$^1$, PO$_3$H$_2$, PO$_3$M$^1{}_2$. PO$_3$M$^1$H, PO$_4$H$_2$, PO$_4$M$^1{}_2$, PO$_4$M$^1$H, PO$_4$M$^2$, C(O)NHOH, NH$_2$, NHR, N(R)$_2$, NO$_2$, COOR, CHO, CH$_2$OH, OH, OR, SH, SR, C(O)N(R)$_2$, C(O)NHR, C(O)NH$_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg, Ca, Sr or Ba;
each R is independently selected from methyl, ethyl, isopropyl, n-propyl, alkyl, haloalkyl, cycloalkyl, heterocycloalkyl, aryl, or benzyl; and
$n^6$, and $n^7$ are each independently an integer between 0-10.

In some embodiments, surface layer 120C may comprise bonding molecules 180 represented by the structure of formula VI:

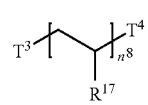

(VI)

wherein:
each $R^{17}$ is independently selected from $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
$T^3$ and $T^4$ are each independently selected from H, $CO_2H$, $CO_2M^1$, $CO_2R$, $SO_3H$, $SO_3M^1$, $PO_3H_2$, $PO_3M^1_2$. $PO_3M^1H$, $PO_4H_2$, $PO_4M^1_2$, $PO_4M^1H$, $PO_4M^2$, C(O)NHOH, $NH_2$, NHR, $N(R)_2$, $NO_2$, COOR, CHO, $CH_2OH$, OH, OR, SH, SR, $C(O)N(R)_2$, C(O)NHR, $C(O)NH_2$, halide, tosylate, mesylate, $SO_2NHR$, triflate, isocyanate, cyanate, thiocyanate, isothiocyanate, R, cyano, $CF_3$ and $Si(OR)_3$;
each $M^1$ is independently Li, Na, K, Rb or Cs;
each $M^2$ is independently Be, Mg. Ca. Sr or Ba;
each R is independently selected from methyl, ethyl, isopropyl, n-propyl, alkyl, haloalkyl, cycloalkyl, heterocycloalkyl, aryl, or benzyl; and
$n^8$ is an integer between 2-10000.

It is explicitly noted that bonding molecules 180 may be combined with any of the the disclosed anode materials and/or with any of the disclosed coatings, and possibly provide at least one coating layer 120, possibly in connection with any of the disclosed polymers (e.g., the lithium polymers).

Methods

Figure 12:
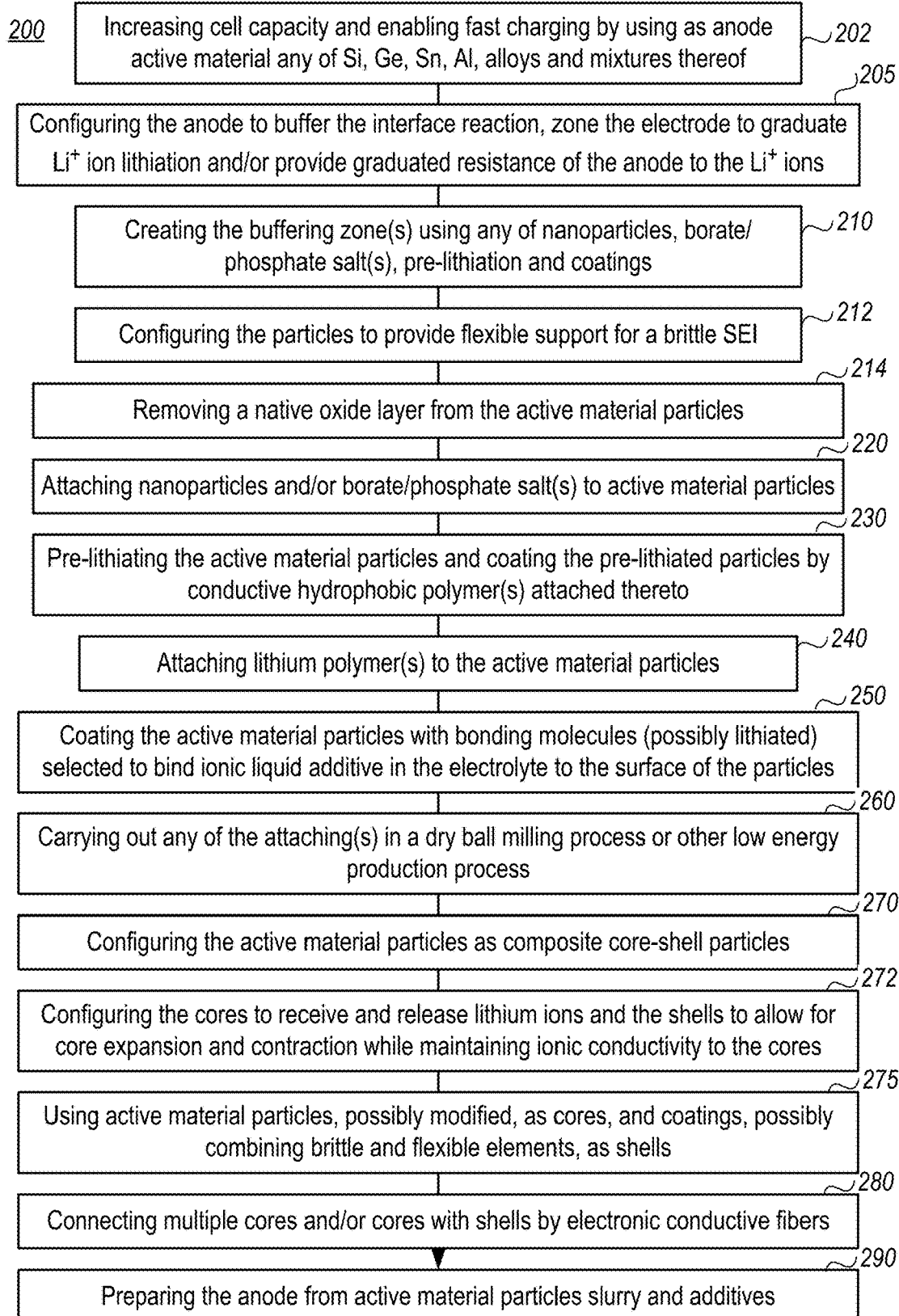
FIG. 12 is a high level flowchart illustrating a method, according to some embodiments of the invention.

FIG. 12 is a high level flowchart illustrating a method 200, according to some embodiments of the invention. The method stages may be carried out with respect to the anode and cell configurations described above, which may optionally be configured to implement method 200. Method 200 may comprise stages for producing, preparing and/or using cells and anodes, such as any of the following stages, irrespective of their order.

Method 200 comprises increasing cell capacity and enabling fast charging by using as anode active material any of Si, Ge, Sn, Al, alloys and mixtures thereof (stage 202) and/or configuring the anode to buffer the interface reaction, zone the electrode to graduate $Li^+$ ion lithiation and/or provide graduated resistance of the anode to the $Li^+$ ions (stage 205). Any of these configuration options may be provided separately or in combination, and be implemented by any of the active materials, modifications and coatings provided above. For example, method 200 may comprise creating the buffering zone(s) using any of nanoparticles, borate/phosphate salt(s), pre-lithiation and coatings disclosed above (stage 210). In certain embodiments, method 200 may further comprise configuring the buffering zone to contain anions which are more mobile than associate cations in the buffering zone and possibly further comprising configuring the buffering zone to provide a mobility gradient for anions in the buffering zone In certain embodiments, method 200 comprises configuring the anode material particles to provide flexible support for a brittle SEI (stage 212), e.g., by attaching flexible polymer coating(s) to the surface thereof. The buffering zone may be configured to comprise a polymer configured to support, mechanically, a solid electrolyte interphase at the interface during expansion and contraction of the solid electrolyte interphase.

Method 200 may comprise removing a native oxide layer from the active material particles (stage 214), e.g., removing any of $GeO_2$, $SiO_2$, $Al_2O_3$, $SnO_2$ at least partially, and protecting the exposed surface of the active material particles, e.g., by disclosed coatings.

Method 200 may comprise attaching nanoparticles and/or borate/phosphate salt(s) to active material particles (stage 220) to stabilize particle structure, prevent or reduce agglomeration, improve lithium conductivity and/or prevent lithium metallization as disclosed above.

Method 200 may comprise lithiating the buffering zone, for example by pre-lithiating the active material particles and coating the pre-lithiated particles by conductive hydrophobic polymer(s) attached thereto (stage 230) and/or by attaching lithium polymer(s) to the active material particles (stage 240).

Method 200 may comprise coating the active material particles with bonding molecules (possibly lithiated) selected to bind ionic liquid additive in the electrolyte to the surface of the particles (stage 250). For example, in certain embodiments, method 200 may comprise forming a surface layer on the anode to bond (e.g., electrostatically and/or ionically) at least some of ionic liquid additive(s) in the electrolyte, e.g., by coating the anode active material by various bonding molecules as disclosed above and/or partly or fully pre-coating and/or coating the active material using corresponding polymers. Method 200 may comprise carrying out the bonding of the ionic liquid to the bonding molecules during at least a first charging cycle of the cell, possibly during several first charging and discharging cycles. In certain embodiments, the bonding of cations and/or anions may be carried out, at least partially, on the active material itself, even before the first charging cycle. The bonding of the ionic liquid to the bonding layer may be electrostatic and/or salt-like (ionic). In certain embodiments, the bonding may be at least partly covalent.

Method 200 may comprise stabilizing the SEI of the cell through the bonded portion of the ionic liquid additive(s) to the surface layer and possibly configuring the bonding molecules to prevent contact of electrolyte solvent with anode active material, e.g., through steric hindrance. Method 200 may further comprise configuring the bonding molecules to have electron rich groups that provide mobile electric charge on the surface of molecules layer, e.g., to provide an ionic conductivity path through the surface molecules layer.

Method 200 may comprise pre-lithiating the anode active material through an anode material anchoring part of the bonding molecules. Method 200 may comprise using anchored and interconnected conductive polymer molecules as the surface layer. Alternatively or complementarily, method 200 may comprise using a thick surface layer that protrudes significantly into the electrolyte.

Any of the examples for the bonding molecules may be at least partially implemented using coating and attaching stages 220, 230, 240, and the bonding molecules may be bonded to or associated to any of the disclosed polymers. The bonded layer of ionic liquid may replace, support or cooperate with any of the buffering zone(s) on the surface of the anode active material particles, provided by stages 205, 210, 212.

Method 200 may comprise carrying out any of the attaching(s) (e.g., any of stages 220, 230, 240, 250) in a dry ball milling process or other low energy production processes (stage 260).

Method 200 may comprise configuring the active material particles as composite core-shell particles (stage 270). For example, method 200 may comprise configuring the cores to receive and release lithium ions and the shells to allow for core expansion and contraction while maintaining ionic conductivity to the cores (stage 272), for example using active material particles, possibly modified, as cores, and coatings, possibly combining brittle and flexible elements, as shells (stage 275), as disclosed herein.

Method 200 may comprise connecting multiple cores and/or cores with shells by electronic conductive fibers (stage 280), e.g., by carbon fibers and/or nanotubes. Method 200 may further comprise forming electric interconnections among multiple core-shell structures. Method 200 may comprise connecting the cores of the core-shell particles to the respective shells by electronic conductive material. In certain embodiments, method 200 may comprise making the shells of the core-shell particles from ionic conducting material which is an electronic insulating material and maintaining electronic conductivity among the cores through the electronic conductive material. In certain embodiments, method 200 may comprise forming anode active material to have cores surrounded by and connected to shells, possibly designing the shells to be ionic conducting and the connections to be electronic conducting and configuring the shells to provide space for expansion of the corresponding cores upon lithiation in the cores.

Method 200 may further comprise interconnecting multiple cores per shell. Method 200 may further comprise interconnecting the cores of the core-shell particles throughout the composite anode material by conductive fibers possibly preparing an anode with conductive fibers that reach its surface. Method 200 may comprise configuring the electronic conductive material (e.g., conductive fibers) to form a network throughout the anode material to provide electron paths between the core-shell particles and to enhance the electronic conductivity of the anode.

In certain embodiments, method 200 may comprise connecting the cores and the respective shells by electronic conducting material(s), ionic conducting material(s), and possibly mechanical element(s) that enable core expansion upon lithiation. In some embodiments, method 200 may comprise forming the shells from brittle, ionic conductive material embedded in flexible electronic conductive material. For example, the flexible electronic conductive material may comprise conductive polymers disclosed above and the brittle ionic conductive material may comprise SEI fragments which result from cracked SEI upon expansion and contraction of the anode material particles and/or any modifications of the anode material particles such as $B_4C$, $WC$, $B_2O_3$, $P_2O_5$ nanoparticles or nanocrystals etc. which may become embedded upon expansion and contraction of the anode material particles in any of the coatings disclosed above.

Method 200 may comprise preparing the anode from active material particles slurry and additives and preparing corresponding lithium ion cells and batteries from the anode(s), cathode(s), electrolyte(s), separator(s) and corresponding enclosure, contacts and current collectors, control circuits and other cell and battery elements (stage 290). In certain embodiments, method 200 may comprise any of the processing stages of processes 105 disclosed above.

In certain embodiments, method 200 may comprise forming an alloy from silicon powder, carbon, and a boron-containing compound to form an active material, and adding the active material to a matrix to form the anode material, wherein the weight percentage of the silicon is between about 4 to about 35 weight % of the total weight of the anode material and the weight percentage of the boron is between about 2 to about 20 weight % of the total weight of the anode material. The active material may comprise carbon at a weight percentage of between about 5 to about 60 weight % of the total weight of the anode material. The active material may comprise tungsten at a weight percentage of between about 5 to about 20 weight % of the total weight of the anode material. The active material may further comprise carbon nanotubes (CNTs) at a weight percentage of between about 0.05 to about 0.5 weight % of the total weight of the anode material. The weight percentage of the silicon may be between about 5 to about 25 weight % of the total weight of the anode material and the weight percentage of the boron between about 5 to about 18 weight % of the total weight of the anode material. The active material may comprise tungsten at a weight percentage of between about 7 to about 13 weight % of the total weight of the anode material. The active material may comprise one or more conductive materials, wherein the weight percentage of the conductive materials may be between about 0.01 to about 15 weight % of the total weight of the anode material. The active material may be milled to a particle size of about 20 to 100 nm.

In certain embodiments, method 200 may comprise forming an alloy from germanium powder, carbon, and a boron-containing compound to form an active material, and adding the active material to a matrix to form the anode material, wherein the weight percentage of the germanium is between about 5 to about 80 weight % of the total weight of the anode material and the weight percentage of the boron is between about 2 to about 20 weight % of the total weight of the anode material. The active material may comprise carbon at a weight percentage of between about 0.5 to about 5 weight % of the total weight of the anode material. The active material may comprise tungsten at a weight percentage of between about 5 to about 20 weight % of the total weight of the anode material. The active material may comprise silicon and a weight ratio of germanium to silicon in the active material is at least 4 to 1. The weight percentage of the germanium may be between about 60 to about 75 weight % of the total weight of the anode material and the weight percentage of the boron is between about 3 to about 6 weight % of the total weight of the anode material.

In certain embodiments, method 200 may comprise forming an alloy from tin powder, carbon, and a boron-containing compound to form an active material, and adding the active material to a matrix to form the anode material, wherein the weight percentage of the tin is between about 5 to about 80 weight % of the total weight of the anode material and the weight percentage of the boron is between about 2 to about 20 weight % of the total weight of the anode material. The active material may comprise carbon at a weight percentage of between about 0.5 to about 5 weight % of the total weight of the anode material. The active material further comprises tungsten at a weight percentage of between about 5 to about 20 weight % of the total weight of the anode material. The active material may further comprise silicon, and method 200 may comprise adding the silicon to provide a weight ratio between the tin and the silicon is at least 4 to 1. The active material may further comprise germanium.

In certain embodiments, method 200 may comprise forming an alloy from aluminum powder, carbon, possibly boron and/or tungsten containing compounds, and possibly any of Si, Ge, Sn, their alloys and/or mixtures. Method 200 may comprise at least partially removing (and/or thinning) a native alumina (oxide) layer from aluminum particles to form aluminum particles having no more than a 1-5 nm thick alumina layer and coating the (at least partially exposed and/or having thinned alumina layer thereupon) aluminum particles with lithium based polymer to replace the oxide surface layer at least partially. Method 200 may comprise removing the alumina layer at least partially through de-oxidation of aluminum particles by mixing aluminum particles with carbon particles to form a mixture and deoxidizing the aluminum particles in the mixture by heating the mixture in a vacuum atmosphere in a range of $10^{-3}$ to $10^{-6}$ mbar for 60-100 hours at a temperature in a range of 600 to 750° C. to form aluminum particles at least partially exposed and/or having an alumina layer in a thickness of no more than 5 nm. Method 200 may further comprise coating the de-oxidized aluminum particles with lithium based polymer, e.g., by ball milling the deoxidized aluminum particles with the lithium polymer in an inert atmosphere and/or possibly applying lithium polymers as disclosed above. In certain embodiments, method 200 may comprise removing at least part of the alumina layer from aluminum particles chemically, e.g., by immersing the aluminum particles in a dilute solution of $H_2SO_4$ to yield the reaction $Al_2O_3 + 3H_2SO_4^- \rightarrow Al_2(SO_4)_3(aq) + 3H_2O$, and aggressively stirring the solution with lithium polymer.

In certain embodiments, method 200 may comprise mixing anode material particles (e.g., any of Ge, Sn, Si or any other anode material disclosed herein, their alloys and combinations) with carbon particles to form a mixture, deoxidizing the anode material particles in the mixture by heating the mixture in a vacuum atmosphere in a range of $10^{-3}$ to $10^{-6}$ mbar for 60-100 hours at a temperature in a range of 150 to 350° C. to form a deoxidized mixture, adding a binder material to the deoxidized mixture and consolidating the deoxidized mixture and binder material to form the anode. The mixing may comprise milling the anode material particles and carbon particles in a ball mill, possibly adding $B_4C$ particles to the anode material particles and carbon particles prior to mixing and/or adding WC particles to the deoxidized mixture. Method 200 may further comprise adding conductive additives to the deoxidized mixture. The mixture may be held in a stainless steel container during deoxidation of the metal particles and evolved CO may be removed from the container during deoxidation of the anode material particles.

In certain embodiments, method 200 may comprise preparing lithium polymers and attaching them to the anode material particles (stage 240) as disclosed above (e.g., mixing LiOH with respective polymers and then with respective anode material), adjusting the process conditions to bind the polymer at least partly by the lithium to the anode material, achieving thereby also pre-lithiation (stage 230).

In certain embodiments, method 200 may comprise pre-lithiating the anode by introducing and/or preparing anode material particles to contain lithium (possibly through a prior process of pre-lithiation, possibly through attaching lithium polymers 240, direct lithium doping, milling processes, etc.) and then coating the anode material particles, which contain lithium ions, by a hydrophobic polymer layer (stage 230), and preparing the anode from a slurry comprising the coated anode material particles, wherein the coating and the hydrophobic polymer layer are configured to prevent the lithium ions from chemically reacting with water molecules in the slurry, and wherein the hydrophobic polymer layer is configured to conduct electrons and ions. In certain embodiments, the coating may be carried out mechanically, e.g., by ball milling configured to maintain a structure of the anode material particles and a composition of the hydrophobic polymer. In certain embodiments, the coating may be carried out chemically in a suspension. The hydrophobic polymer layer may comprise conjugated aromatic compounds and/or lithium ions which are bonded to the hydrophobic polymer.

In certain embodiments, method 200 may comprise attaching borate and/or phosphate salts (stage 220) by ball milling, under protective atmosphere, the anode material particles with nanoparticles comprising $B_2O_3$ or other borate oxides or salts and/or $P_2O_5$ or other phosphate oxides or salts, and mixing the milled modified anode material particles with conductive additives and binder to form the anode.

Experimental Data

In the following, experimental data, graphs and images are provided to exemplify some non-limiting embodiments. FIGS. 13A-13C indicate the functioning of buffering zone 110B, FIGS. 14A-14K are examples modified anode active material particles 110A, FIG. 15 illustrates borates formed in the surface of anode active material particles 110 as at least partial coating 120, and FIGS. 16A-B illustrate effects of in-situ polymerized polyaniline polymer coating on anode 100 according to non-limiting embodiments of the invention Graphs—Buffering Zone FIGS. 13A-13C are examples for charging/discharging cycles of anodes 110 with respect to lithium (half cells), according to some embodiments of the invention. Illustrated are cyclic voltammetry measurements at a scanning rate of 0.05 mV/s of potential windows −50 mV to 1.3V (FIG. 13A), −100 mV to 1.3V (FIG. 13B) and −250 mV to 1.3V (FIG. 13C), wherein in the first two cases anode 110 maintains its operability in spite of negative voltages −50 mV and −100 mV applied to it, and in the third cases in breaks down. The repeatability of the cycles in FIG. 13A indicates no lithium metallization process is taking place, the peak at 90 mV in FIG. 13B indicates the buffering reaction $Li^+ \rightarrow Li^{\delta+}$ suggested above (see FIG. 2C) is taking place without dendrite growth, and the process reversibility demonstrates the low probability of dendrite formation. It is noted that the anode breakdown illustrated in FIG. 13C after application of −250 mV is characteristic of prior art graphite anodes 90 at 0V. FIGS. 13A and 13B indicate the ability of disclosed cells to overcome negative voltages applied to them and remain operative, in stark contrast to prior art cells which are severely damaged by negative voltages. The illustrated examples show the robustness and stability of cells prepared according to embodiments of the invention, and the low probability of dendrite growth on anodes 110, indicating thereby their enhanced safety. Anodes 110 in different configurations may be used in disclosed embodiments, such as anode configurations described herein.

Data and Images—B$_4$C Nanoparticles

Figure 14A:
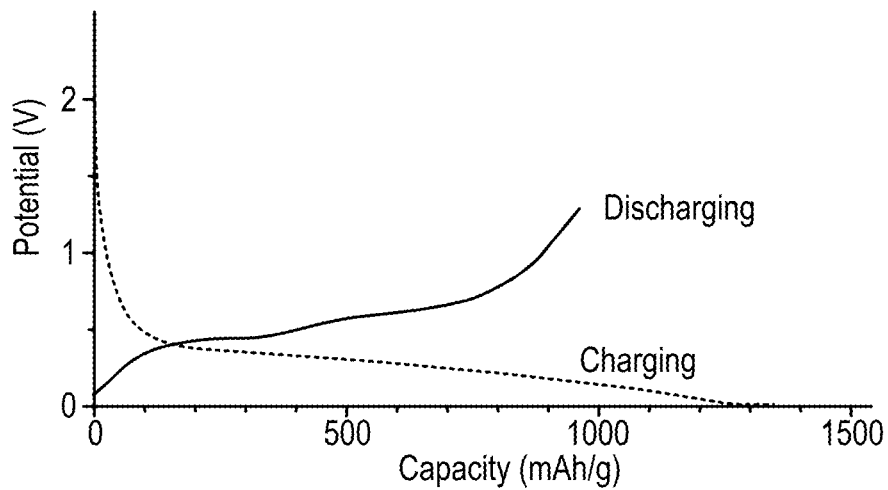
FIGS. 14A-14F are examples for performance of anodes made of modified anode active material particles, according to some embodiments of the invention.
Figure 14B:
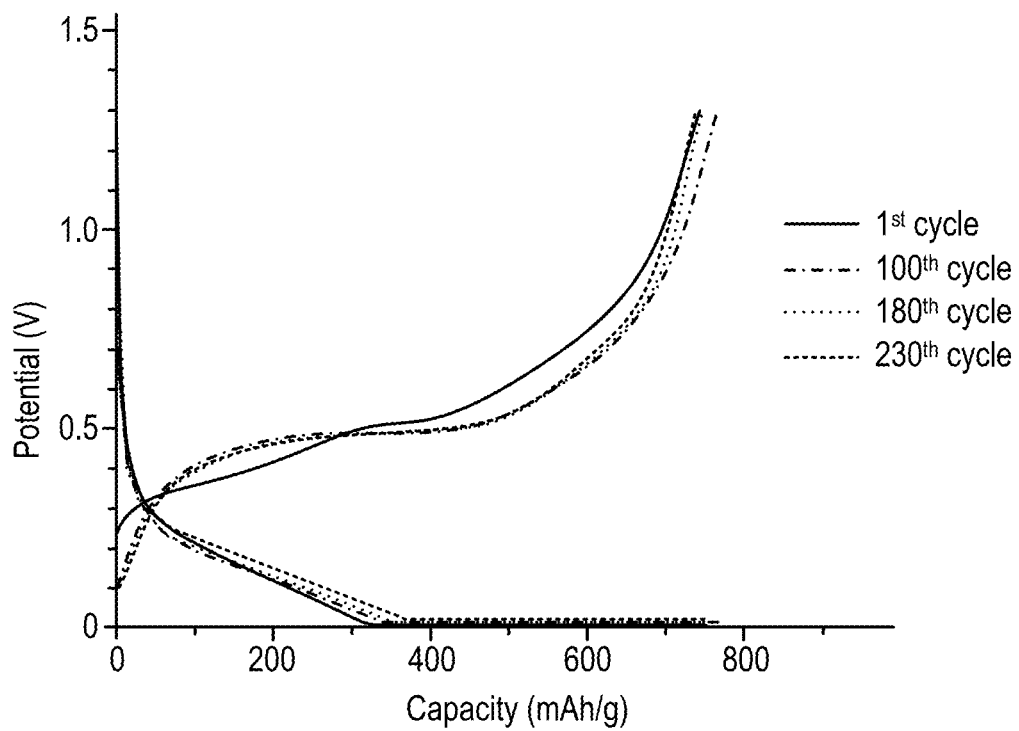
Figure 14C:
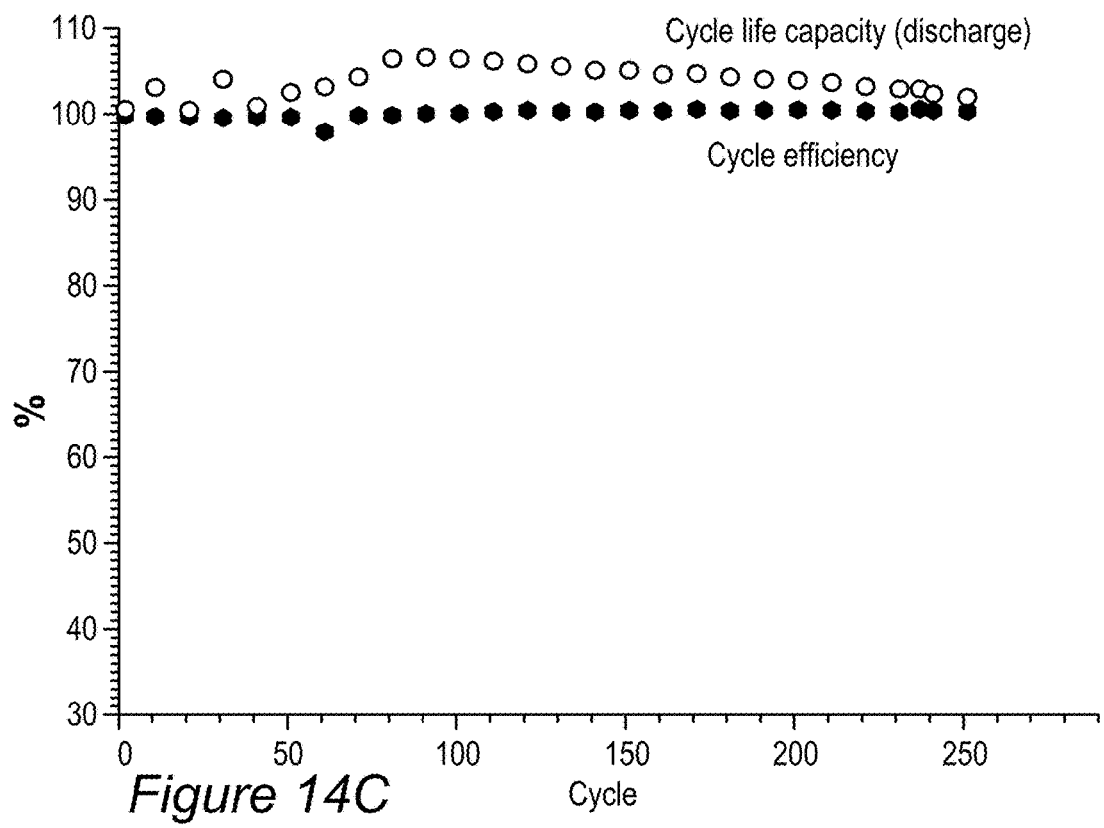
Figure 14D:
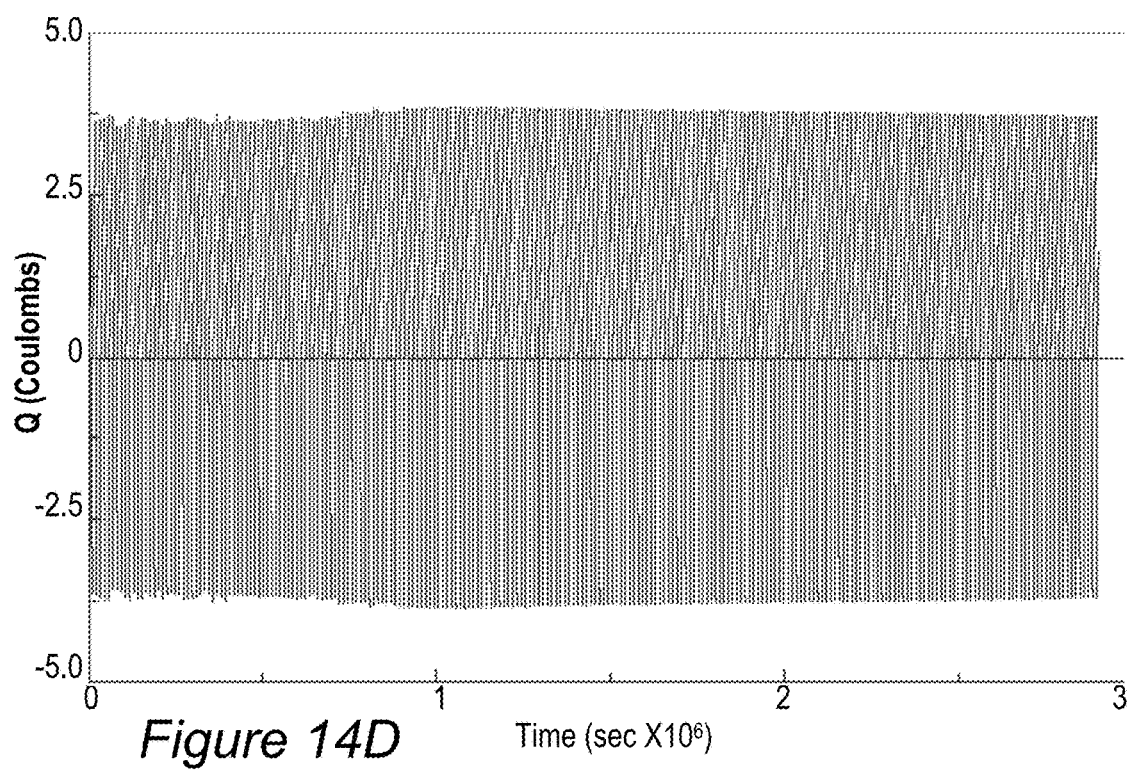
Figure 14E:
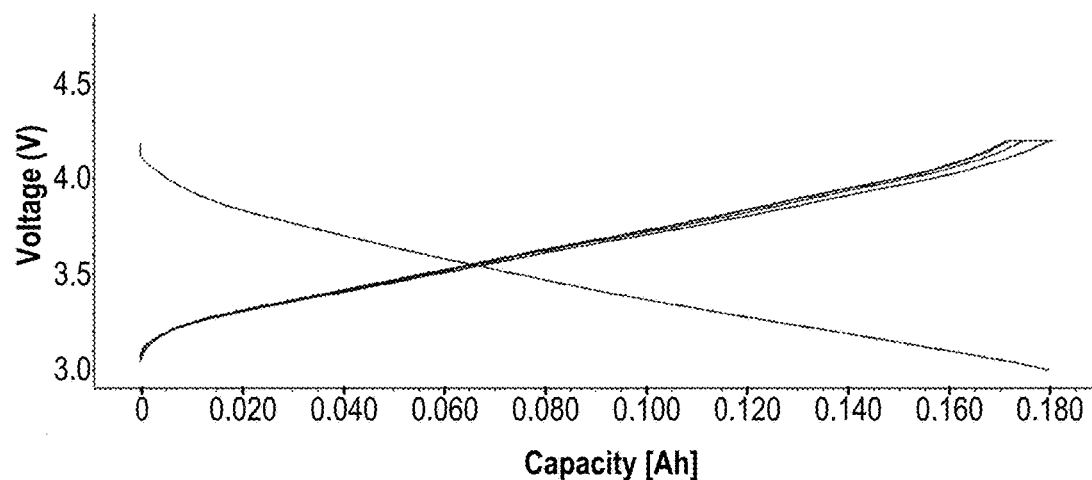
Figure 14F:
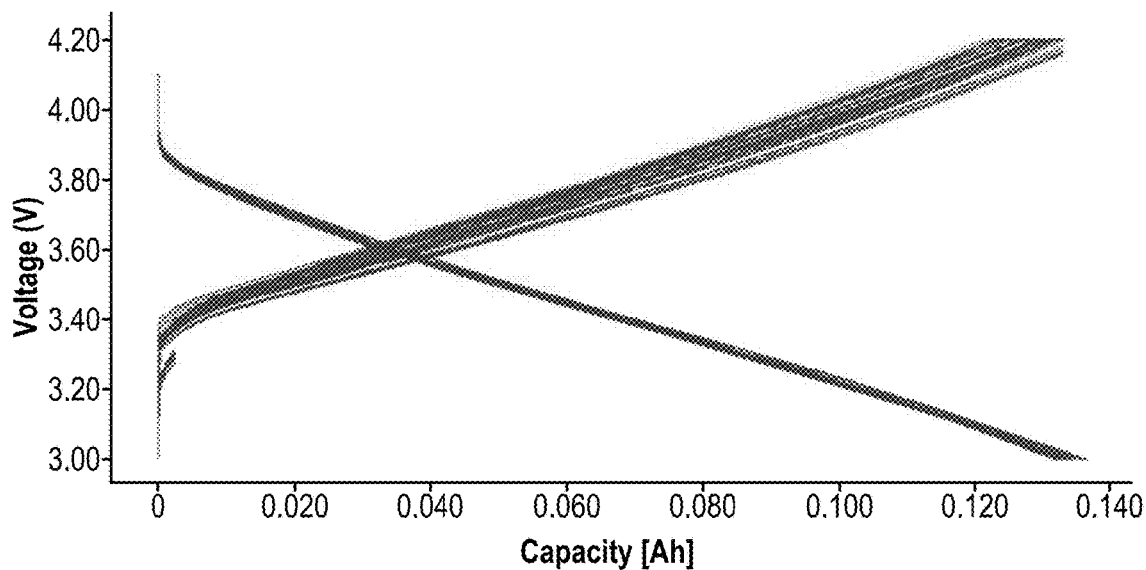

FIGS. 14A-14F are examples for performance of anodes 100 made of modified anode active material particles 110A, according to some embodiments of the invention. Non-limiting examples relate to anodes 100 made of modified anode material particles 110A comprising Ge anode material with B$_4$C nanoparticles 112, anodes 100 further comprising (in weight %) 6% conductive additive 130, 10% tungsten carbide (WC), 9% mixture of binder and plasticizer 102 and 75% of the active material nano-powdered Ge—B$_4$C). FIG. 14A is an example for charge/discharge curves of anode 100 in an anodic half cell (with lithium as cathode 87), with first cycle efficiency of ca. 75%, which may be increased by any of the pre-lithiation methods and coatings disclosed below. FIG. 14B is an example for charge/discharge curves of anode 100 at $1^{st}$, $100^{th}$, $180^{th}$ and $230^{th}$ cycles, with charging carried out at 5C (12 minutes) and discharging carried out at 0.2C. FIG. 14C is an example for cycle life capacity (discharge) and cycle efficiency of anode 100 and FIG. 14D is an example for the stability of anode 100, in terms of its energy (charge) over cycling time. FIGS. 14E and 14F are corresponding examples for full cells 150 with anodes 100, NCA cathode 87, electrolyte 85 being IM LiPF$_6$ in EC:DMC (1:1) with 10% FEC (EC denoting ethylene carbonates, DMC denoting dimethyl carbonate and FEC denoting fluorinated ethylene carbonates) and separator 86 being a 12 microns polypropylene separator. FIG. 14E presents charging and discharging during the formation cycles at low C rate while FIG. 14F demonstrates the operation of cell 150 in fast charging at 10C (six minutes per charging) and discharged at low C rate, in the first 50 cycles. The graph shows very small deviations and a remarkable stability during the charge/discharge process.

In a non-limiting example for a preparation process, 139 g of Ge nanoparticles having an average particle size of 200 nm were milled together with 12.8 g B$_4$C having average particle size of 45 nm APS (aerodynamic particle size) in a planetary ball miller (a 500 ml sintered Al$_2$O$_3$ jar with approximately 200 ml of 5 mm grinding balls made of Al$_2$O$_3$, filled with 120 ml acetone up to full volume coverage of the powders and grinding balls). The powder was milled for 6 hours at 400 rpm. Due to the hardness of the boron carbide B$_4$C nanoparticles 112 may become embedded in the surface of germanium nanoparticles 110. It is emphasized that the ball milling technique is given as an example only, and any other available method such as vapor techniques or others may be used for making a powder comprising modified anode material particles 110A having nanoparticles 112 attached to anode material particles 110.

Figure 14G:
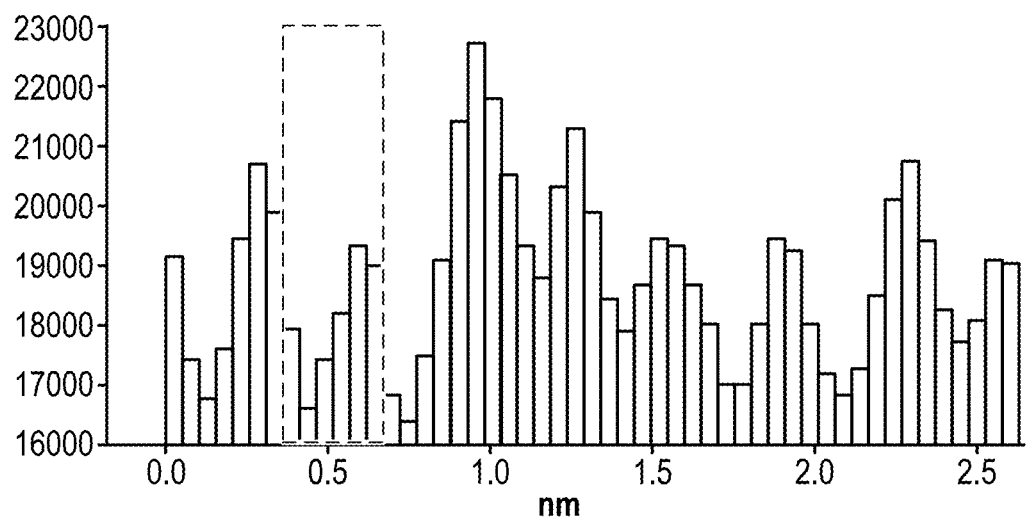
Figure 14H:
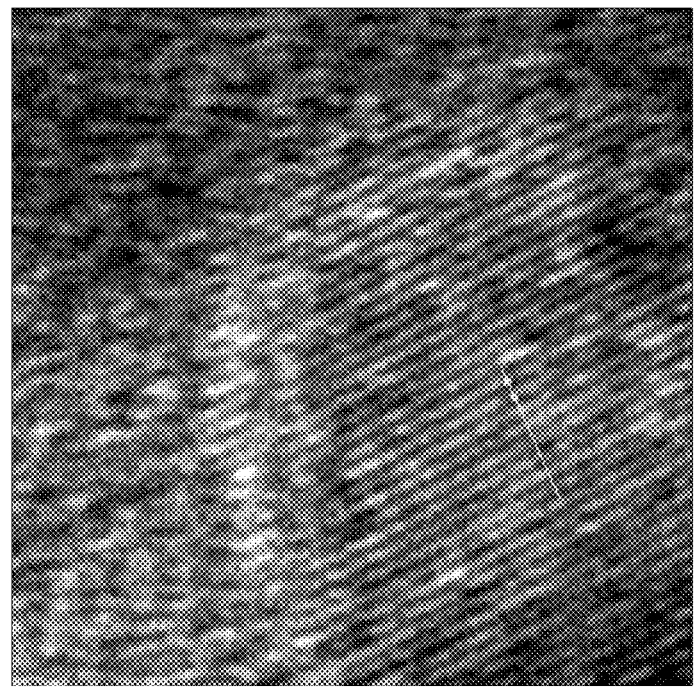
Figure 14I:
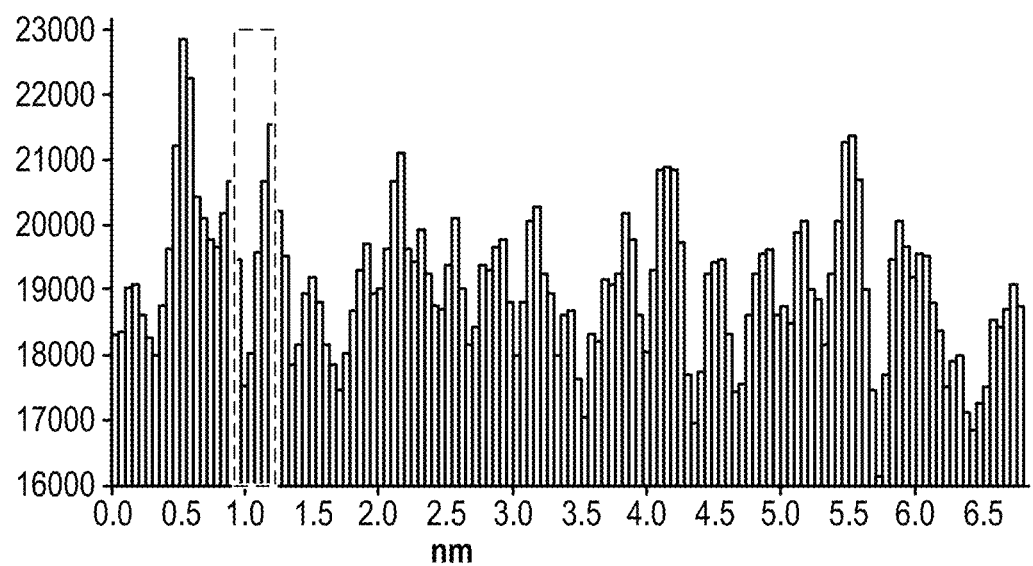
Figure 14J:
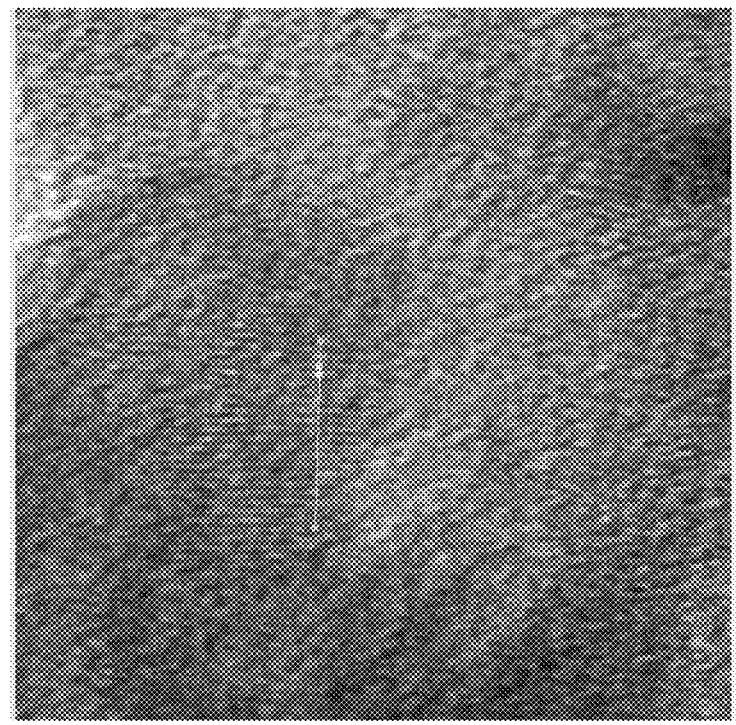

FIGS. 14G-14K are examples for modified anode active material particles 110A, according to some embodiments of the invention. The illustrated non-limiting examples comprise TEM (transmission electron microscope) images of modified anode active material particles 110A prepared as indicated above (Ge—B$_4$C particles), and analysis data thereof. The Ge—B$_4$C particles (e.g., the tested powders) were made using the ball milling technique disclosed above. The TEM micrograph of FIG. 14K shows a plurality of B$_4$C nanoparticles 112 (marked in circles) of approximately 10 nm in diameter on a surface of a Ge particle 110 surrounded by carbon. FIGS. 14G, 14H and FIGS. 14I, 14J show lattice structure images of B$_4$C embedded in a Ge lattice (FIGS. 14H, 14J) and diffraction profiles thereof (FIGS. 14G, 14I, respectively). From all the TEM images it may be concluded that the B$_4$C particles (e.g., grains or crystals) are at least partially embedded on the surface of the Ge particle (e.g., grain or crystal).

Image—Borates

FIG. 15 presents an example for formation of LTB in modified anode material particles 110A, according to some embodiments of the invention. The TEM micrograph of FIG. 15 shows the formation of B$_2$O$_3$ from Li$_2$B$_4$O$_7$ (lithium tetra-borate salt—LTB) on the Ge active material, as described above. In the micrograph a clear image lattice of several LTB nanocrystals that forms a non-continuous LTB layer on a germanium particle.

Image and Graphs—Polyaniline Coating

FIG. 16A is an example for the surface of anode 100 produced with in situ polyaniline polymerization disclosed herein, compared to FIG. 16B showing an example of a cracked anode surface prepared under similar conditions without polyaniline. In the illustrated example, anode material particles 110 comprise Si and Sn, which were milled in desired ratio by ball milling at 300 rpm for 6 hours. 1.4 gr of milled solid was placed into an Erlenmeyer flask with 180 ml HCl (0.1 M) and 20 ml ethanol, and sonicated for 5 minutes to disperse the powder. 400 μl aniline was added and then 0.785 gr of (NH$_4$)$_2$S$_2$O$_8$ dissolved in 20 ml HCl 0.1 M. The suspension was stirred with a magnetic stirrer overnight. The next day, NaOH 1 M was added until the pH reached 9-10 (~30 ml). The product was washed with water and collected by centrifuge, and dried in an oven at 85° C. for 2 hours prior to use, to form anode 100 of FIG. 16A. FIG. 16B is an example of an anode prepared by a similar process, without adding the aniline monomers, with the anode material particles lacking a polyaniline coating. Evidently, using polyaniline has improved the consistency, uniformity and stability of anode 100 significantly. In-situ polymerization of polyaniline created an even dispersion of the active material which results in a homogeneous electrode. Advantageously, provided matrices 130 was found to overcome cracking and adhesion problems found in prior art examples, with polyaniline reducing the amount of cracking drastically—as illustrated in FIG. 16A with respect to prior art FIG. 16B.

Figure 17A:
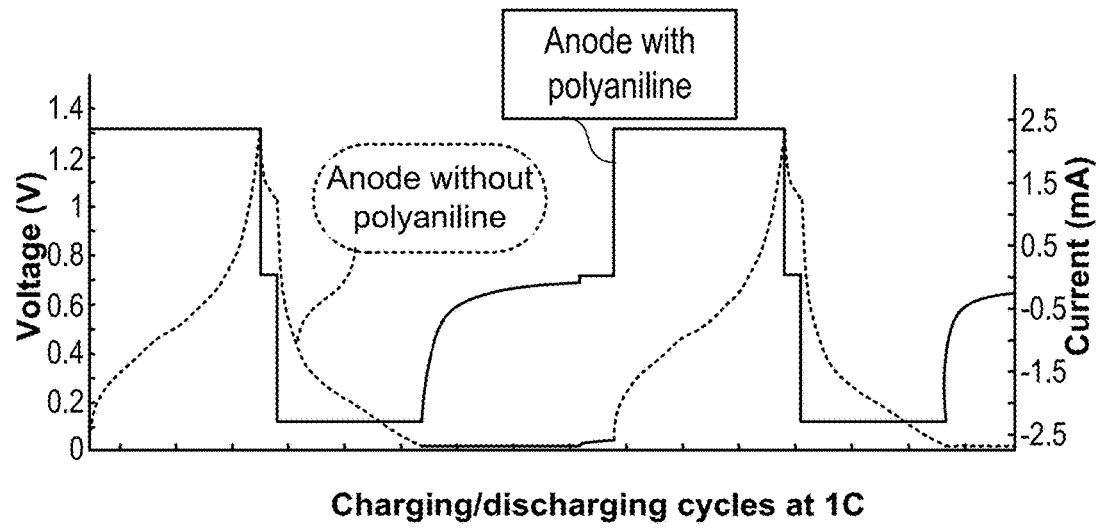
FIGS. 17A and 17B are examples for improved performance of Sn:Si anodes produced with in situ polyaniline polymerization, according to some embodiments of the invention.
Figure 17B:
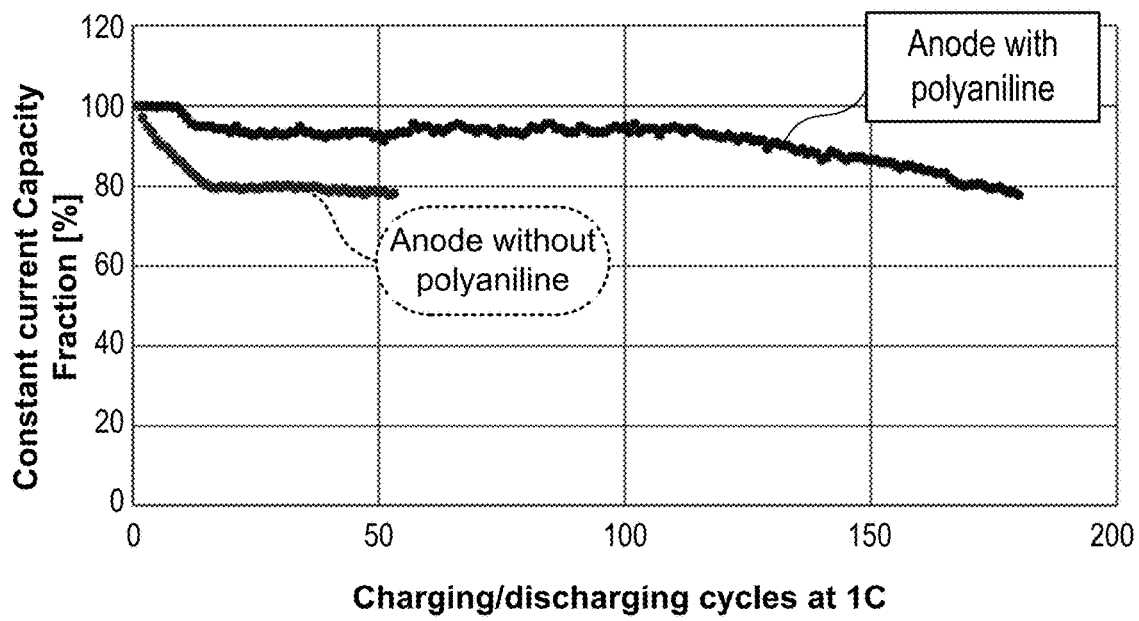

FIGS. 17A and 17B are examples for improved performance of Sn:Si anodes 100 produced with in situ polyaniline polymerization, according to some embodiments of the invention. FIG. 17A illustrates 1C cycles of charging and discharging of half cells with anode 100 (Sn:Si with polyaniline) with respect to an anode without polyaniline. FIG. 17B illustrates the capacity fraction in the constant current stage of charging of half cells with anode 100 (Sn:Si with polyaniline) with respect to an anode without polyaniline. Both FIGS. 17A, 17B indicate higher capacity and lower resistance of anodes 100.

Advantageously, disclosed anodes, cells and batteries mitigate or eliminate the operational risks posed by lithium ion batteries, especially as relates to intercalation of Li at the anode. Mitigated or eliminated operational risks may comprise the potential flammability of prior art lithium ion batteries due to high reactivity of the active materials, particularly when in contact with humidity and when batteries are overheated and/or overcharged, which may result in thermal runaway, cell breakdown, and sometimes fire and explosion. A short circuit or design defect may also bring about prior art battery failure resulting in fire and safety risks. Disclosed anodes, cells and batteries may overcome these risks, as explained above.

Advantageously, the disclosed novel anode materials with improved lithium storage and charge/discharge characteristics overcome inherent limitations in prior art graphite anode material in lithium-ion batteries, such as the theoretical specific capacity and volumetric capacity which are limited by the layer structure of the graphite. Moreover, due to the intercalation mechanism of lithium ions in graphite, charging and discharging rates are limited, and tied to metallization of lithium, especially during fast charging followed by slow discharging. Disclosed anodes, cells and batteries may overcome these limitations, as explained above.

Advantageously, disclosed anodes, cells and batteries provide novel anode materials and anode alloying materials and techniques that enable productive use of new materials such as silicon, germanium, tin, lead and aluminum—utilizing their potentially high gravimetric and volumetric capacity for lithium, while overcoming the disadvantageous discussed in the prior art concerning the high volumetric changes during charging/discharging cycles which may cause low cyclability—that these materials suffer from. Disclosed anodes, cells and batteries may overcome these limitations, as explained above.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for preparing a lithium ion cell, comprising:
   replacing a native oxide on a surface of anode active material particles that comprise at least one of Si, Ge, Sn and Al, by a layer of $B_2O_3$,
   coating the anode active material particles by at least one coating that comprises at least one of a boron oxide, a phosphorus oxide, a borate, a phosphate and/or salts thereof,
   preparing an anode from the anode active material particles, and
   preparing a lithium ion cell using the prepared anode.

2. The method of claim 1, wherein the layer of $B_2O_3$ is part of and/or is derived from the at least one coating.

3. The method of claim 1, wherein the at least one coating comprises crystals of borate salt and/or phosphate.

4. The method of claim 1, further comprising configuring the at least one coating to provide a buffering zone that receives lithium ions from an interface of the anode active material particles with an electrolyte, wherein the buffering zone partially reduces the received lithium ions, and enables the partially reduced lithium ions to move into an inner zone of the anode active material particles for lithiation therein.

5. The method of claim 1, wherein the coating is carried out by milling and the anode preparation is carried out by mixing the milled coated particles with at least one conductive filler and at least one binder.

6. The method of claim 1, wherein the anode active material particles are 20-500 nm in diameter and the at least one coating is 2-200 nm thick.

7. The method of claim 1, wherein the at least one coating further comprises a layer of at least one of: an amorphous carbon, graphene, graphite, a transition metal and a lithiated polymer.

8. A method of making an anode for a lithium-ion energy storage device, comprising milling anode active material particles selected from Si, Ge, Sn, Al, mixtures thereof, and/or alloys thereof—in a non-oxidizing atmosphere with at least one boron oxide compound and/or phosphorus oxide compound to form milled particles having a coating on the particles selected from the group consisting of a boron oxide, a phosphorus oxide, a borate and/or a phosphate, having a thickness in a range of 2 nm to 200 nm.

9. The method of claim 8, wherein said at least one boron oxide compound or phosphorous oxide compound contains lithium.

10. The method of claim 9, further comprising bonding a hydrophobic polymer layer to said anode active material particles by ball milling the hydrophobic polymer with the anode active material particles.

11. The method of claim 8, further comprising mixing the milled particles with at least one conductive filler and at least one binder to prepare an anode for a lithium-ion energy storage device.

12. The method of claim 8, further comprising coating the anode active material particles with a layer of lithiated conductive polymer.

13. The method of claim 8, further comprising coating the anode active material particles with a layer of carbon or transition metal oxide having a thickness of 1-10 nm.

14. The method of claim 8, wherein the coating further comprises a layer of at least one of:
   an amorphous carbon, graphene, graphite, a transition metal and a lithiated polymer.

15. A method for making a lithium ion cell comprising:
   coating anode active material particles that comprise at least one of Si, Ge, Sn and Al—by at least one coating that comprises at least one of a boron oxide, a phosphorus oxide, a borate, a phosphate and/or salts thereof, at least one lithiated conductive polymer, and/or a hydrophobic conductive polymer which has conjugated aromatic groups and is ionic conductive,
   preparing an anode from the coated anode active material particles, and
   preparing a lithium ion cell using the prepared anode.

16. The method of claim 15, further comprising configuring the at least one coating to provide a buffering zone that receives lithium ions from an interface of the anode active material particles with an electrolyte, wherein the buffering zone partially reduces the received lithium ions, and enables the partially reduced lithium ions to move into an inner zone of the anode active material particles for lithiation therein.

17. The method of claim 15, wherein the anode active material particles are 20-500 nm in diameter and the at least one coating is 2-200 nm thick.

18. The method of claim 15, wherein the at least one coating further comprises a layer of at least one of: an amorphous carbon, graphene, graphite, a transition metal and a lithiated polymer.

19. The method of claim 15, further comprising carrying out the anode preparation by forming a slurry with the active material particles, a solvent, and at least one additive selected from the group consisting of conductive particles, binder and plasticizer; and removing the solvent and consolidating the slurry to form the anode.

* * * * *